US010873741B2

(12) United States Patent
Hayasaka et al.

(10) Patent No.: US 10,873,741 B2
(45) Date of Patent: Dec. 22, 2020

(54) IMAGE PROCESSING APPARATUS AND METHOD

(71) Applicant: SONY CORPORATION, Tokyo (JP)

(72) Inventors: Kengo Hayasaka, Kanagawa (JP); Hironori Mori, Tokyo (JP); Katsuhisa Ito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/518,331

(22) Filed: Jul. 22, 2019

(65) Prior Publication Data

US 2019/0342544 A1 Nov. 7, 2019

Related U.S. Application Data

(63) Continuation of application No. 14/916,418, filed as application No. PCT/JP2014/073053 on Sep. 2, 2014, now Pat. No. 10,440,352.

(30) Foreign Application Priority Data

Sep. 11, 2013 (JP) ................................. 2013-188408

(51) Int. Cl.
*H04N 13/282* (2018.01)
*H04N 13/246* (2018.01)
(Continued)

(52) U.S. Cl.
CPC ............ *H04N 13/282* (2018.05); *G06T 1/20* (2013.01); *G06T 5/003* (2013.01); *G06T 5/50* (2013.01);
(Continued)

(58) Field of Classification Search
CPC .. H04N 13/239; H04N 13/246; H04N 13/275; H04N 13/278; H04N 13/282;
(Continued)

(56) References Cited

U.S. PATENT DOCUMENTS

2005/0031192 A1* 2/2005 Sieckmann .......... G02B 21/367
382/154
2009/0225076 A1 9/2009 Vlietinck
(Continued)

FOREIGN PATENT DOCUMENTS

CN 102257824 A 11/2011
EP 2360930 A1 8/2011
(Continued)

OTHER PUBLICATIONS

Jun. 1, 2017, EP communication issued for related EP application No. 14844543.0.
(Continued)

*Primary Examiner* — Ke Xiao
*Assistant Examiner* — Jed-Justin Imperial
(74) *Attorney, Agent, or Firm* — Paratus Law Group, PLLC

(57) ABSTRACT

The present disclosure relates to an image processing apparatus and method, and specifically relates to an image processing apparatus and method which can improve convenience of a service using a multi-viewpoint image. An image processing apparatus includes a virtual captured image generation unit which generates, by using multi-viewpoint image data, depth data showing a distance to a photographic subject in the multi-viewpoint image, and profile information including a parameter which reproduces an optical effect by a virtual optical system, a virtual captured image obtained by capturing the photographic subject of the multi-viewpoint image by using the virtual optical system. The present disclosure can be applied, for example, to the image processing apparatus.

16 Claims, 47 Drawing Sheets

(51) Int. Cl.
*G06T 1/20* (2006.01)
*G06T 5/00* (2006.01)
*G06T 5/50* (2006.01)
*G06T 15/20* (2011.01)
*H04N 13/239* (2018.01)

(52) U.S. Cl.
CPC ......... *G06T 15/205* (2013.01); *H04N 13/239* (2018.05); *H04N 13/246* (2018.05); *G06T 2207/10052* (2013.01); *G06T 2207/20221* (2013.01)

(58) Field of Classification Search
CPC ......... G06T 1/20; G06T 5/003; G06T 15/205; G06T 2207/10052; G06T 2207/20221
See application file for complete search history.

(56) References Cited

U.S. PATENT DOCUMENTS

| | | | |
|---|---|---|---|
| 2011/0188778 A1 | 8/2011 | Wiesenfarth | |
| 2011/0242278 A1 | 10/2011 | Yang et al. | |
| 2013/0077880 A1* | 3/2013 | Venkataraman | G06T 9/00 |
| | | | 382/232 |
| 2013/0108181 A1 | 5/2013 | Wey et al. | |
| 2014/0071297 A1* | 3/2014 | Yu | G06T 5/003 |
| | | | 348/175 |
| 2014/0168371 A1 | 6/2014 | Chang | |
| 2015/0020025 A1* | 1/2015 | Fish | G06F 3/147 |
| | | | 715/802 |

FOREIGN PATENT DOCUMENTS

| | | |
|---|---|---|
| JP | H07-296195 | 11/1995 |
| JP | 2008-034892 | 2/2008 |
| JP | 2009-211335 | 9/2009 |
| JP | 2011-171858 | 9/2011 |
| JP | 2013-121050 | 6/2013 |

OTHER PUBLICATIONS

Hideo Saito et al., Appearance-Based Virtual View Generation From Multicamera Videos Captured in the 3-D Room, IEEE Transactions on Multimedia, vol. 5, No. 3, Sep. 2003, pp. 303-316.
Aug. 2, 2018, Chinese Office Action issued for related CN application No. 201480049014.0.
Sep. 25, 2018, Japanese Office Action issued for related JP application No. 2015-536534.
Mar. 12, 2020, Korean Office Action issued for related KR Application No. 10-2016-7002828.

* cited by examiner

FIG. 2
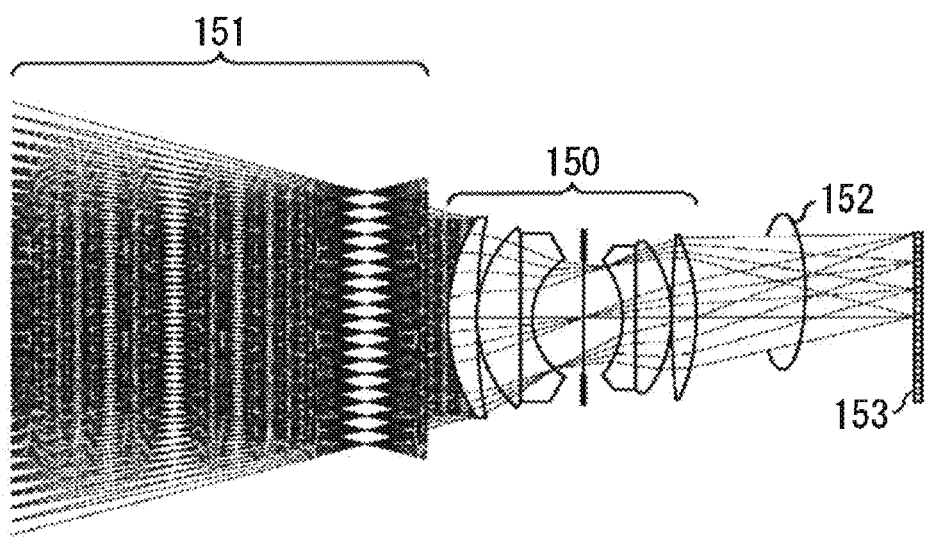
A
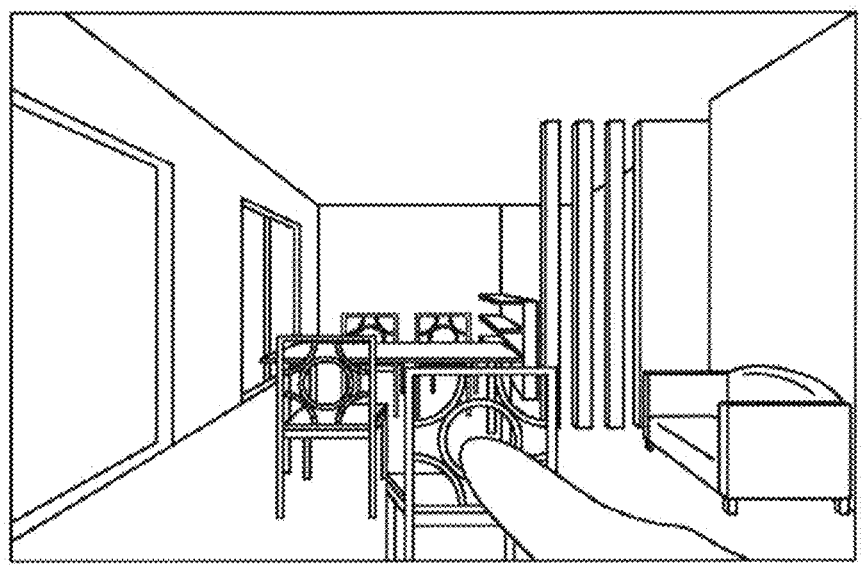
B

FIG. 10
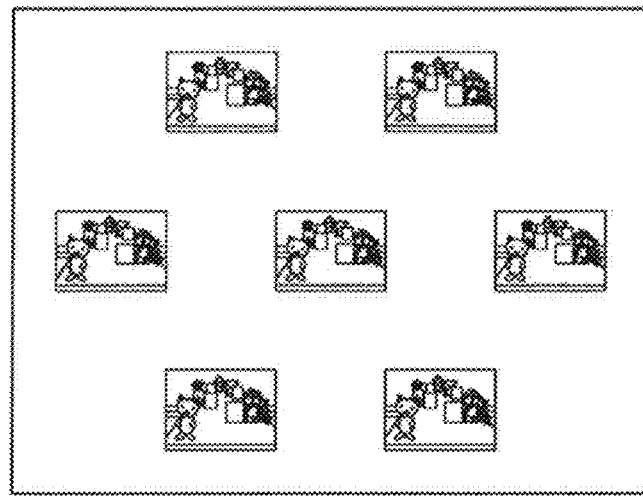
A
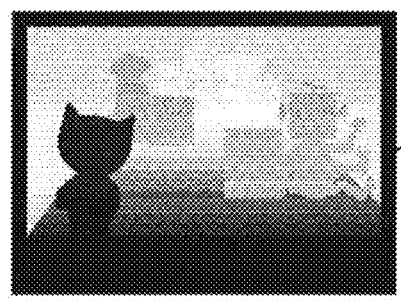
B

FIG. 19
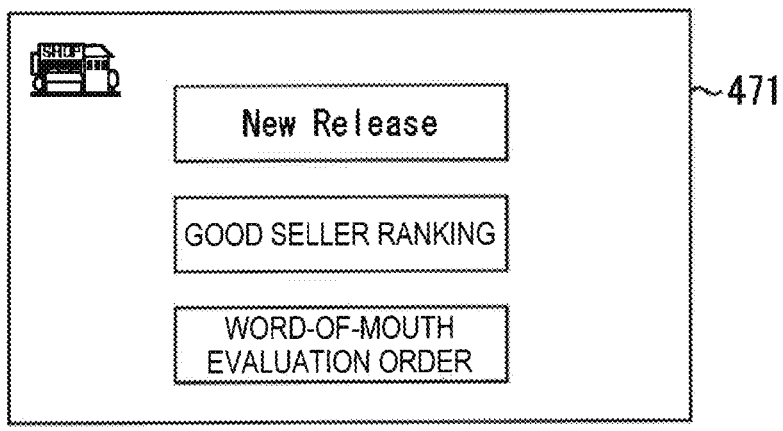
A
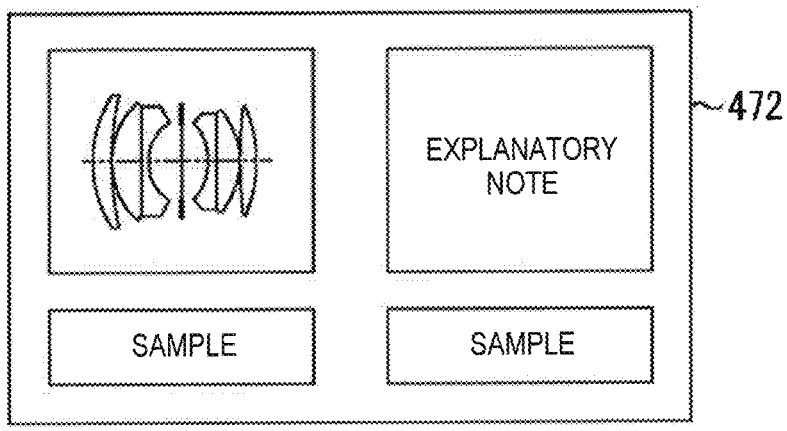
B
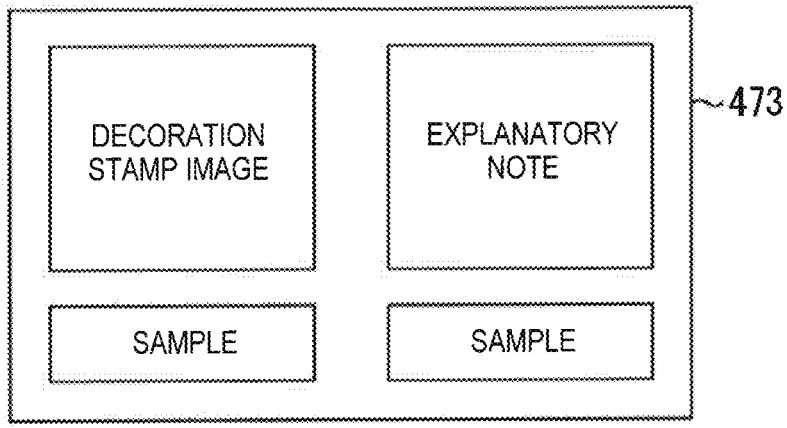
C

FIG.29
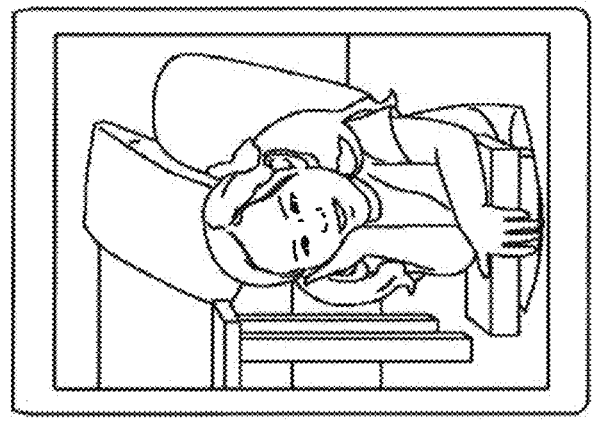
A
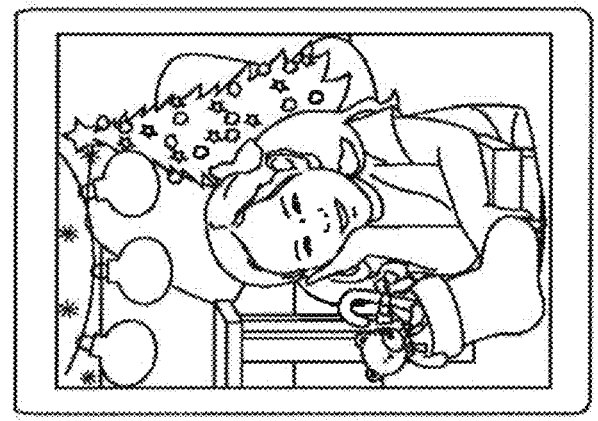
B

IMAGE PROCESSING APPARATUS AND METHOD

CROSS REFERENCE TO PRIOR APPLICATION

This application is a continuation of U.S. patent application Ser. No. 14/916,418 (filed on Mar. 3, 2016), which is a National Stage Patent Application of PCT International Patent Application No. PCT/JP2014/073053 (filed on Sep. 2, 2014) under 35 U.S.C. § 371, which claims priority to Japanese Patent Application No. 2013-188408 (filed on Sep. 11, 2013), which are all hereby incorporated by reference in their entirety.

TECHNICAL FIELD

The present disclosure relates to an image processing apparatus and method, and specifically relates to an image processing apparatus and method which can improve convenience of a service using a multi-viewpoint image.

BACKGROUND ART

Technology is known which measures a distance to a measurement target (photographic subject) by using a plurality of images with different viewpoints. For example, a distance calculation method has been proposed which uses a technique called stereo matching (for example, refer to Patent Literature 1).

Also, by using such a technique of stereo matching, from a multi-viewpoint image composed of a plurality of images with mutually different viewpoints, it can be considered to obtain depth data showing a distance to a photographic subject in this multi-viewpoint image, generate an image which overlaps the multi-viewpoint image by using this depth data, and provide this image to a user.

CITATION LIST

Patent Literature

Patent Literature 1: JP 2011-171858A

SUMMARY OF INVENTION

Technical Problem

However, further improvement of convenience is desired, as a service using such a multi-viewpoint image.

The present disclosure is performed by considering such a situation, and can improve convenience of a service using a multi-viewpoint image.

Solution to Problem

An image processing apparatus according to the present technology includes: a virtual captured image generation unit which generates, by using multi-viewpoint image data, depth data showing a distance to a photographic subject in the multi-viewpoint image, and profile information including a parameter which reproduces an optical effect by a virtual optical system, a virtual captured image obtained by capturing the photographic subject of the multi-viewpoint image by using the virtual optical system.

The virtual captured image generation unit can generate interpolation images specified in number by the profile information based on the multi-viewpoint image, and generates the virtual captured image by using the multi-viewpoint image and the interpolation images.

The virtual captured image generation unit can generate the interpolation images in accordance with sequence information showing a relative position relationship of each viewpoint of the multi-viewpoint image, eye number information showing a number of viewpoints of the multi-viewpoint image, and the depth data.

The sequence information can include information showing a distance from a viewpoint serving as a reference to each viewpoint, and information showing an orientation of each viewpoint from the viewpoint serving as a reference.

The virtual captured image generation unit can determine an image serving as a reference, a matching axis, and an interpolation method based on the sequence information and the eye number information.

The virtual captured image generation unit can generate the interpolation images by overlapping images specified by the interpolation method in accordance with the depth data by using the determined image serving as a reference and matching axis.

The virtual captured image generation unit can determine a mixture ratio of each overlapping image in accordance with a position of an interpolation image to be generated.

The virtual captured image generation unit can generate the virtual captured image by overlapping the multi-viewpoint image and the interpolation image.

The profile information can include PSF data of a virtual lens included in the virtual optical system, diaphragm shape information showing a virtual diaphragm shape included in the virtual optical system, and interpolation image number information showing a number of the interpolation images.

At a time when overlapping the multi-viewpoint image and the interpolation image, the virtual captured image generation unit can cause PSF data of the virtual lens corresponding to the depth data to be reflected.

At a time when overlapping the multi-viewpoint image and the interpolation image, the virtual captured image generation unit can cause the virtual diaphragm shape shown by the diaphragm shape information to be reflected in the multi-viewpoint image and the interpolation image.

The virtual captured image generation unit can generate the virtual captured image in accordance with a user specification parameter which is a parameter related to the virtual optical system specified by a user.

The user specification parameter can include focal position specification information which specifies a focal position within the virtual captured image, photographic field depth specification information which specifies a photographic field depth of the virtual captured image, and super-resolution specification information which performs a specification for a super-resolution process at a time when generating the virtual captured image.

The virtual captured image generation unit can obtain a depth value of a focal position specified by the focal position specification information based on the depth data, and sets a focal distance of the virtual captured image to the depth value.

The virtual captured image generation unit can set a photographic field depth of the virtual captured image to a photographic field depth specified by the photographic field depth specification information.

The virtual captured image generation unit can perform a super-resolution process for the virtual captured image in accordance with a specification of the super-resolution specification information.

The virtual captured image generation unit can perform a super-resolution process for only a portion of the virtual captured image where a depth value is the same as or close to a depth value of a focal position specified by the focal position specification information.

The virtual captured image generation unit can acquire, from a storage unit, profile information unique to a virtual optical system selected by a user.

The virtual captured image generation unit can acquire the profile information from another apparatus.

An image processing method according to the present technology includes: generating, by using multi-viewpoint image data, depth data showing a distance to a photographic subject in the multi-viewpoint image, and profile information including a parameter which reproduces an optical effect by a virtual optical system, a virtual captured image obtained by capturing the photographic subject of the multi-viewpoint image by using the virtual optical system.

In the present disclosure, by using multi-viewpoint image data, depth data showing a distance up until a photographic subject in a multi-viewpoint image, and profile information including a parameter which reproduces an optical effect by a virtual optical system, a virtual captured image obtained by capturing a photographic subject of the multi-viewpoint image by using the virtual optical system is generated.

Advantageous Effects of Invention

According to the present disclosure, images can be processed. Further, according to the present disclosure, convenience of a service using a multi-viewpoint image can be improved.

BRIEF DESCRIPTION OF DRAWINGS

FIG. 2 is a figure which describes an example of an application which uses a multi-viewpoint image.

FIG. 10 is a figure which shows an example of a multi-viewpoint image and depth data.

FIG. 19 is a figure which shows an information display example.

FIG. 29 is a figure which describes another example of a layout.

DESCRIPTION OF EMBODIMENTS

Hereinafter, the modes for executing the present disclosure (hereinafter called the embodiments) will be described. Note that, the description will be given in the following order.

1. First embodiment (multi-viewpoint image use service platform)
2. Second embodiment (management of the multi-viewpoint image)
3. Third embodiment (application sales)
4. Fourth embodiment (virtual lens process)
5. Fifth embodiment (product sales support)
6. Other 1. First Embodiment <Multi-Viewpoint Image Use Service Platform>

Figure 1:
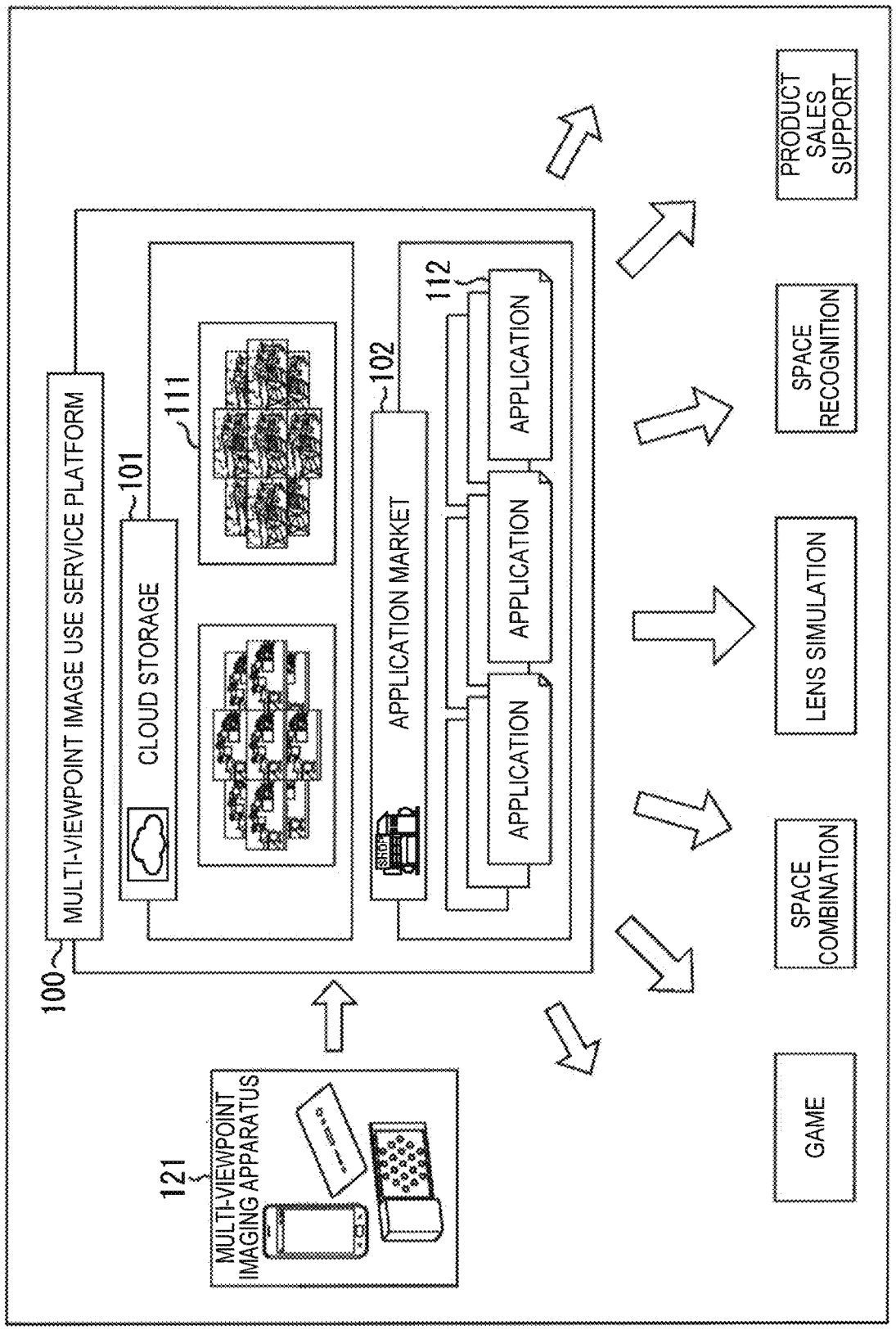
FIG. 1 is a figure which describes an example of a multi-viewpoint image use service platform.

FIG. 1 is a figure which describes an example of a multi-viewpoint image use service platform. A multi-viewpoint image use service platform 100 shown in FIG. 1 is a basic structure/environment which provides, to a user, a service using a multi-viewpoint image composed of a plurality of images with mutually different viewpoints. The multi-viewpoint image use service platform 100 has, for example, functions of a cloud storage 101, an application market 102 or the like.

The cloud storage 101 is a service which stores and manages multi-viewpoint image data 111, which is data of a multi-viewpoint image. For example, a photographic subject is captured, by having a user who has finished registration in a multi-viewpoint image use service platform operate a multi-viewpoint imaging apparatus 121, and a plurality of captured images with mutually different viewpoints are obtained as a multi-viewpoint image. Also, this multi-viewpoint image data is supplied to the multi-viewpoint image use service platform 100, by having this user operate the multi-viewpoint imaging apparatus 121. The cloud storage 101 stores this supplied multi-viewpoint image data, and performs management for each user.

Further, the cloud storage 101 can generate data related to this multi-viewpoint image data, based on the multi-viewpoint image data or the like, as necessary. In addition, the cloud storage 101 can provide this managed multi-viewpoint image data to a terminal apparatus operated by a user, or an application which will be described below, in accordance with a request from a user or the like.

The application market 102 is a service which performs some type of process by using the multi-viewpoint image data, and provides, sells, or executes, to a user, an application 112 which provides a service using a multi-viewpoint image to the user. Namely, this application 112 may be executed by the multi-viewpoint image use service platform 100, or may be executed in a terminal apparatus.

Various services with a high convenience, such as a game, space combination, lens simulation, space recognition, and product sales support using a multi-viewpoint image, are provided to a user, by having such the application 112 executed.

The service provided by the application 112 may be anything if it uses a multi-viewpoint image. For example, lens simulation is a service which simulates (imitated appearance) a virtual optical system, and by using a multi-viewpoint image, generates virtual captured images capturing a photographic subject by using this virtual optical system. In this case, as shown in A of FIG. 2, for example, the application 112 sets a virtual lens 150, and stimulates (imitated appearance) an optical ray vector 151 which is incident light from the photographic subject incident on this virtual lens 150, an optical ray vector 152 which is incident light after permeating the virtual lens 150, a virtual image sensor 153 which obtains a virtual captured image from the optical ray vector 152 or the like. Also, the application 112 generates a virtual captured image from a multi-viewpoint image, based on a simulation such as described above, and provides it to a user. Further, the application 12 can perform a selection, a sale or the like of the set virtual lens 150.

Since lens simulation can set a virtual lens, an optical system of an arbitrary specification can be simulated. That is, lens simulation can perform simulation even if it is an actual optical system or an unrealistic optical system. Therefore, by having such a service provided, a user can reproduce captured images obtained by various optical systems. For example, by such a lens simulation, a user can easily obtain captured images using an optical system of a larger aperture than an optical system obtaining each of the captured images constituting a multi-viewpoint image. For example, by such a lens simulation, a user can more easily obtain images with a higher resolution, images with a wider angle, images with a narrower viewing angle and further focal distance or the like than each of the images of a multi-viewpoint image. In addition, for example, by such a lens simulation, a user can easily obtain captured images using a high-grade lens, or captured images using an unrealistic optical system. That is, a user can cheaply obtain various captured images.

Further, for example, product sales support is a service which supports a sale of a product, by using a multi-viewpoint image. The method of selling a product or support may be anything. For example, it may be a service in which a product to be sold is set to furniture, and as shown in B of FIG. 2, an image of the furniture is virtually arranged in a captured image. In this case, the application 112 generates a captured image by overlapping each of the captured images of a multi-viewpoint image, arranges an image of the furniture on this captured image by using this 3-dimensional modelling data (also called 3D modelling data) and depth data showing a distance to a photographic subject in the multi-viewpoint image, and provides this combined image to a user. Further, the application 112 sets the furniture to be arranged and this position based on an operation of the user.

By such a service, a user can capture his or her own room, for example, and can arrange an image of furniture at a desired position on this captured image (that is, an image of his or her own room). Therefore, a user can more accurately assume a layout prior to a purchase. Namely, by such a service, uncertainty prior to a purchase of a user, such as "whether purchased furniture is not able to be installed in his or her own room", or "whether purchased furniture does not match with his or her own room", can be reduced, and a buying intention of the user can be improved. That is, the application 112 can support a sale of furniture.

As described above, since not only can 1 image be generated and provided from a multi-viewpoint image, but also data related to a user or a multi-viewpoint image can managed, and a sale of an application or a provision of a service using an application can be performed, the multi-viewpoint image use service platform 100 can provide various services, with a higher convenience for a user. Namely, the multi-viewpoint image use service platform 100 can improve convenience of a service using a multi-viewpoint image.

While a description has been made heretofore in which a multi-viewpoint image is composed of a plurality of captured images, the number of images which constitute a multi-viewpoint image is arbitrary. Further, a part or all of the images which constitute the multi-viewpoint image, or a part of all of each of the images, may be unrealistic images such as computer graphic images artificially drawn (namely, a multi-viewpoint image may include images other than captured images).

Further, a terminal apparatus to which the multi-viewpoint image use service platform 100 provides a service may be the multi-viewpoint imaging apparatus 121 operated by a user who is the owner of the multi-viewpoint image, may be a terminal apparatus other than the multi-viewpoint imaging apparatus 121 operated by this user, or may be a terminal apparatus operated by another user who is permitted to use the multi-viewpoint image by this user.

In addition, the physical configuration of the multi-viewpoint image use service platform 100 is arbitrary. For example, it may be constituted by 1 server, or may be constituted by a plurality of servers. Further, for example, a part or all of the functions of the multi-viewpoint image use service platform 100 may take a configuration of cloud computing which performs allotting and joint processing with a plurality of apparatuses via a network. In addition, a part or all of the functions of the multi-viewpoint image use service platform 100 may be executed in a terminal apparatus.

Hereinafter, the details of examples of the services provided by the multi-viewpoint image use service platform 100 will be described.

2. Second Embodiment

<Management of the Multi-Viewpoint Image>

As described in the first embodiment, the multi-viewpoint image use service platform 100 can have functions of the cloud storage 101, for example, can store multi-viewpoint image data, and can provide a service to be managed. In the present embodiment, the management of this multi-viewpoint image will be described.

<Multi-Viewpoint Image Use Service Provision System>

Figure 3:
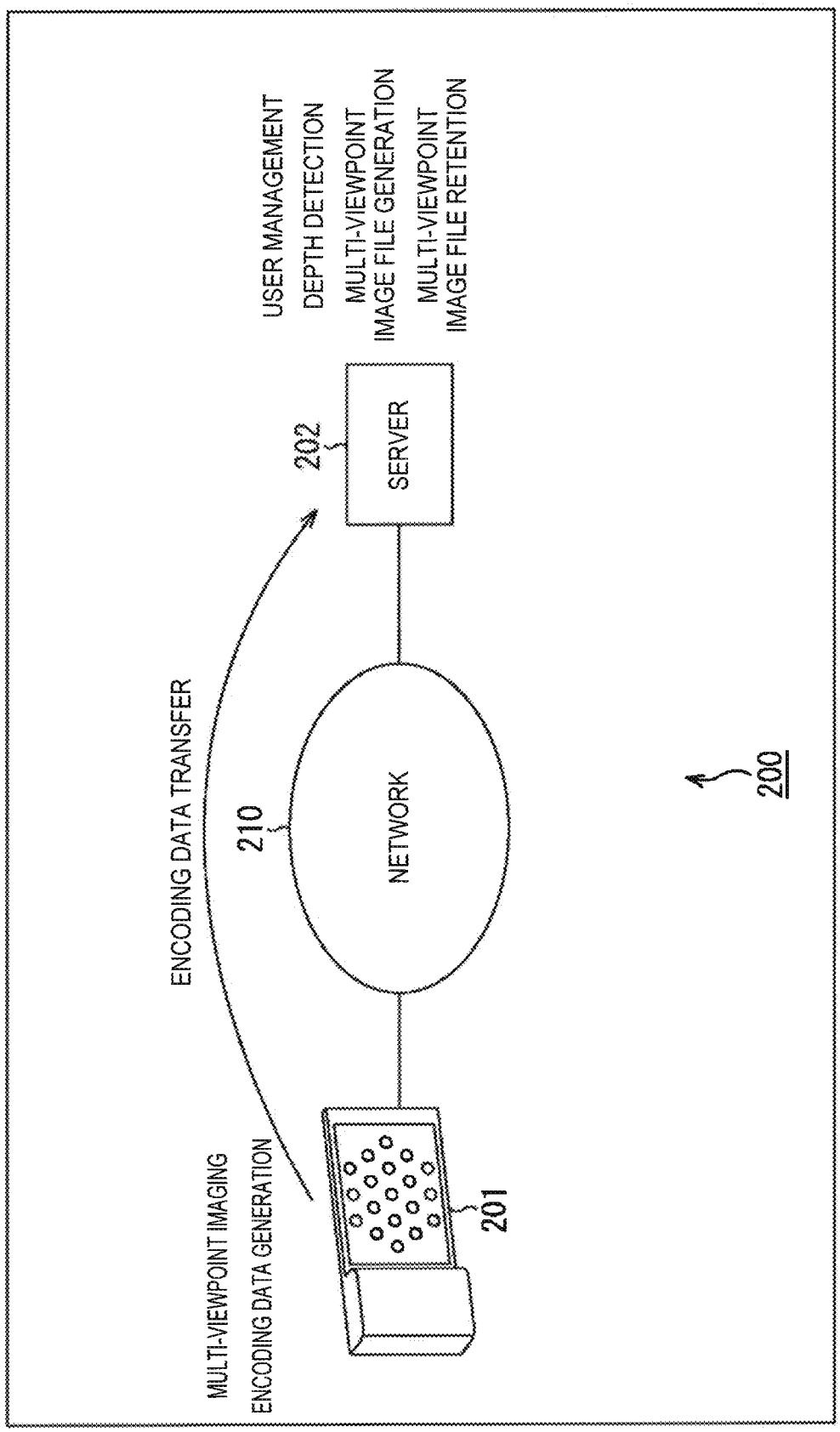
FIG. 3 is a figure which shows a main configuration example of a multi-viewpoint image use service provision system.

FIG. 3 is a figure which shows a main configuration example of a multi-viewpoint image use service provision system. A multi-viewpoint image use service provision system 200 shown in FIG. 3 is an example of a system to which the present disclosure is applied, and is a system in which a server 202 provides a service using a multi-viewpoint image to a terminal apparatus 201 connected via a network 210. Namely, the multi-viewpoint image use service provision system 200 is an example of a configuration which implements the multi-viewpoint image use service platform 100.

FIG. 3 shows an example of a configuration related to the provision of a service related to the management of a multi-viewpoint image, from among the services provided by the multi-viewpoint image use service platform 100. In FIG. 3, the multi-viewpoint image use service provision system 200 has the terminal apparatus 201 and the server 202 connected to the network 210.

The network 210 is, for example, an arbitrary network such as the Internet or a local area network. The network 210 is constituted of 1 or a plurality of networks constituted by wires, wirelessly, or both. The terminal apparatus 201 and the server 202 are respectively connected to this network 210 by wires or wirelessly.

The terminal apparatus 201 performs multi-viewpoint imaging which obtains a multi-viewpoint image composed of a plurality of captured images with mutually different viewpoints by capturing a photographic subject. Also, the terminal apparatus 201 encodes this multi-viewpoint image data, and generates multi-viewpoint encoding data. The terminal apparatus 201 transfers the generated multi-viewpoint encoding data to the server 202.

The server 202 manages users who have been registered beforehand. Further, the server 202 acquires the transferred multi-viewpoint image encoding data, detects a depth of this multi-viewpoint image, and generates depth data. In addition, the server 202 makes into a file data related to these multi-viewpoint images, and generates a multi-viewpoint image file. Also, the server 202 stores (retains) and manages the generated multi-viewpoint image file. The multi-viewpoint image file managed by this server 202 is provided to the terminal apparatus 201, or an executed application, as necessary.

<Terminal Apparatus>

Figure 4:
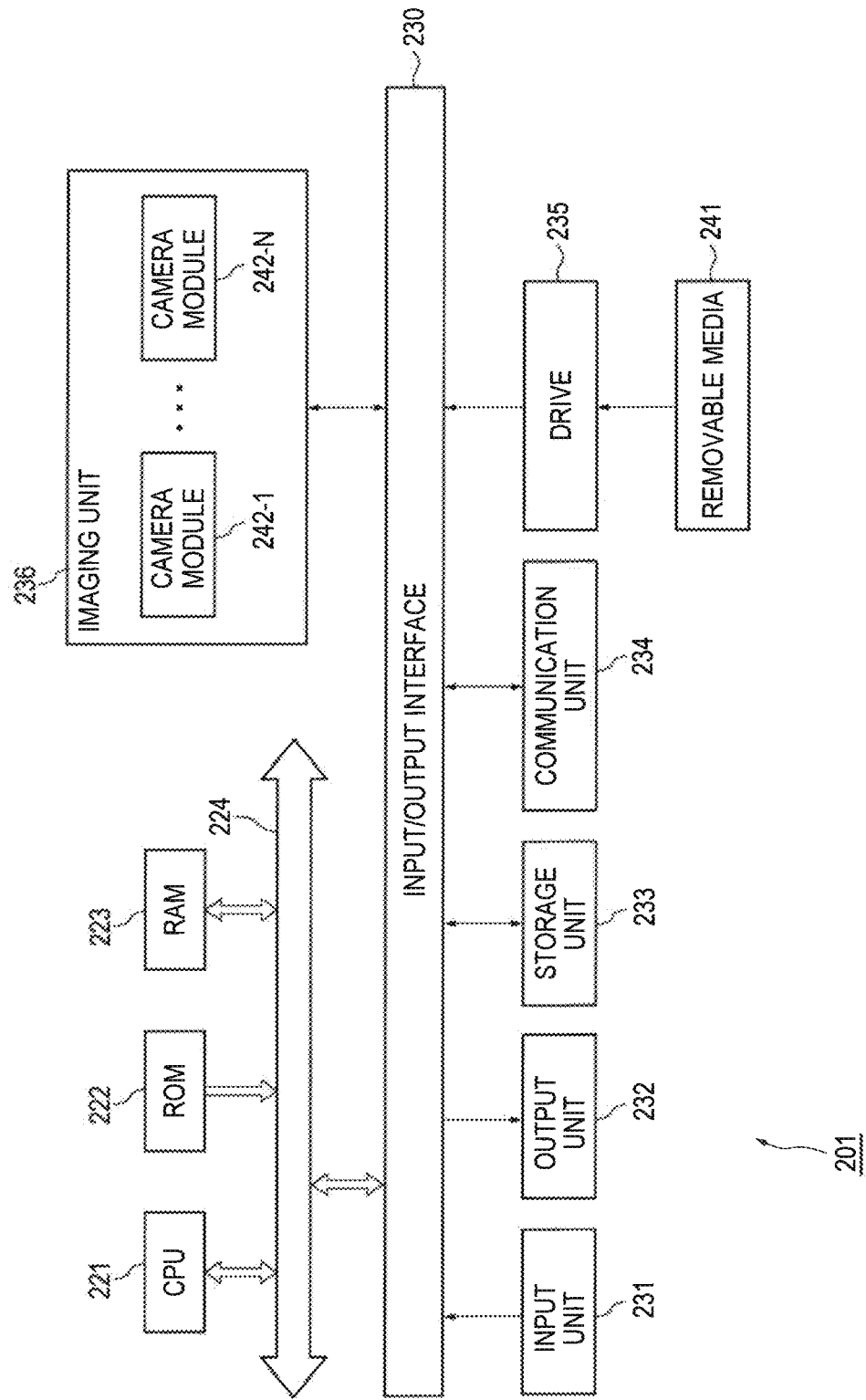
FIG. 4 is a figure which shows a main configuration example of a terminal apparatus.

FIG. 4 is a block diagram which shows a main configuration example of the terminal apparatus 201. As shown in FIG. 4, in the terminal apparatus 201, a Central Processing Unit (CPU) 221, a Read Only Memory (ROM) 222, and a Random Access Memory (RAM) 223 are mutually connected via a bus 224.

An input/output interface 230 is also connected to the bus 224. An input unit 231, an output unit 232, a storage unit 233, a communication unit 234, and a drive 235 are connected to the input/output interface 230.

The input unit 231 is constituted by an input device which receives information of the outside such as a user input. For example, operation buttons, a touch panel, a microphone, an input terminal or the like are included in the input unit 231. Further, various types of sensors such as an acceleration sensor, an optical sensor, and a temperature sensor may be included in the input unit 231. The output unit 232 is constituted by an output device which outputs information such as an image or audio. For example, a display, a speaker, an output terminal or the like are included in the output unit 232.

The storage unit 233 is constituted, for example, by a hard disk, a RAM disk, a nonvolatile memory or the like. The communication unit 234 is constituted, for example, by a network interface. The drive 235 drives, for example, a removable media 241 such as a magnetic disk, an optical disk, a magneto-optical disk, or a semiconductor memory.

The CPU 221 performs various types of processes, for example, by executing a program stored in the storage unit 233 by loading in the RAM 223, via the input/output interface 230 and the bus 224. Data or the like necessary from the viewpoint of executing various types of processes by the CPU 221 is also suitably stored in the RAM 223.

The program executed by the CPU 221 can be provided, for example, to the terminal apparatus 201 by recording to the removable media 241 as a package media or the like. In this case, the program can be installed in the storage unit 233, via the input/output interface 230, by mounting the removable media 241 in the drive 235.

Further, this program can be provided to the terminal apparatus 201 via a wired or wireless transfer medium, such as a LAN, the Internet, or a digital satellite broadcast. In this case, the program can be received by the communication unit 234, via the wired or wireless transfer medium, and can be installed in the storage unit 233.

Other than this, this program can be installed beforehand in the ROM 222 or the storage unit 233.

An imaging unit 236 is additionally connected to the input/output interface 230. The imaging unit 236 is controlled by the CPU 221, for example, and performs multi-viewpoint imaging which obtains a multi-viewpoint image composed of a plurality of captured images with mutually different viewpoints by capturing a photographic subject. The imaging unit 236 has a camera module 242-1 through to a camera module 242-N. N is an arbitrary integer of 2 or more. The camera module 242-1 through to the camera module 242-N are modules which have mutually the same configuration, and perform similar processes. Hereinafter, in the case where it may not be necessary to perform a description by mutually distinguishing the camera module 242-1 through to the camera module 242-N, they will be simply called a camera module 242.

Figure 5:
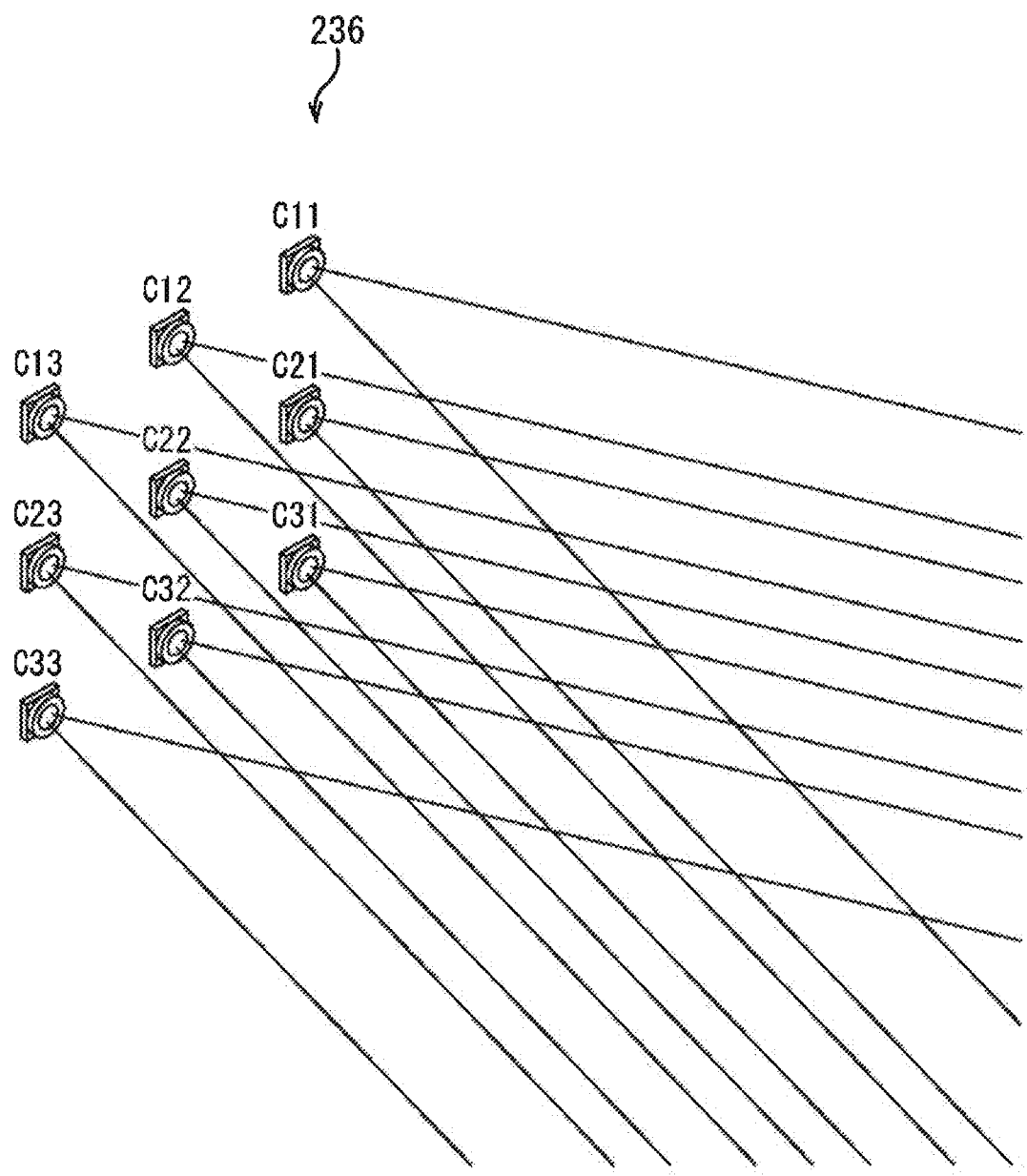
FIG. 5 is a figure which describes an outline of an imaging unit.

The camera module 242 is a module which has an optical system including an image sensor (imaging sensor), and obtains captured images by capturing a photographic subject. Each of the camera modules 242 are arranged at mutually different positions on a flat surface or a curved surface, and have mutually different viewpoints, such as C11, C12, C13, C21, C22, C23, C31, C32, and C33 shown in FIG. 5. Namely, the camera module 242-1 through to the camera module 242-N capture a photographic subject, and obtain captured images with mutually different viewpoints.

The imaging unit 236 is controlled by the CPU 221 or the like, captures a photographic subject by using such a camera module 242-1 through to camera module 242-N, and obtains N (a plurality of) captured images with mutually different viewpoints. The imaging unit 236 obtains this plurality of captured images as a multi-viewpoint image (multi-viewpoint image data). That is, the imaging unit 236 performs multi-viewpoint imaging, by using each of the camera modules 242.

The imaging unit 236 is controlled by the CPU 221 or the like, and has the obtained multi-viewpoint image data supplied to the CPU 221 or the RAM 223 via the input/output interface 260, the bus 224 or the like, supplied to and stored in the storage unit 233 via the input/output interface 260, supplied and output to the output unit 232, or supplied to the outside by supplying to the communication unit 234.

The viewing angle or imaging direction of each of the camera modules 242 may be mutually the same, or may not be the same. For example, in a part of the camera modules 242, the viewing angle, the imaging direction, or both of these may be different to those of the other camera modules 242. Further, for example, the viewing angle or the imaging direction of all of the camera modules 242 may be mutually different. However, since multi-viewpoint captured images such as will be described below are used for generating a mutually overlapping image, it is desirable for the range of imaging of each of the camera modules 242 (that is, the photographic subject of each of the camera modules 242) to have at least a part of this overlapping.

Note that, in multi-viewpoint imaging, the imaging conditions such as the imaging timing, the exposure, or the diaphragm of each of the camera modules 242 may be mutually the same, or may not be the same. Further, a multi-viewpoint image obtained by multi-viewpoint imaging (each of the captured images constituting a multi-viewpoint image) may be a still image, or may be a moving image.

Further, the imaging unit 236 may be installed at the time of manufacture as this 1 configuration in a housing of the terminal apparatus 201, or may be constituted as a module connectable to the terminal apparatus 201, of a different body to the terminal apparatus 201. For example, the imaging unit 236 may be connected to an external terminal or the like of the terminal apparatus 201, or may be an externally attached part operated by a control of the terminal apparatus 201. In addition, the imaging unit 236 may be an independent terminal of a different body to the terminal apparatus 201. For example, the imaging unit 236 may be an imaging apparatus different to the terminal apparatus 201 such as a camera, may be connected to the terminal apparatus 201 by wired or wireless communication, and may supply a multi-viewpoint image obtained by multi-viewpoint imaging to the terminal apparatus 201.

<Server>

Figure 6:
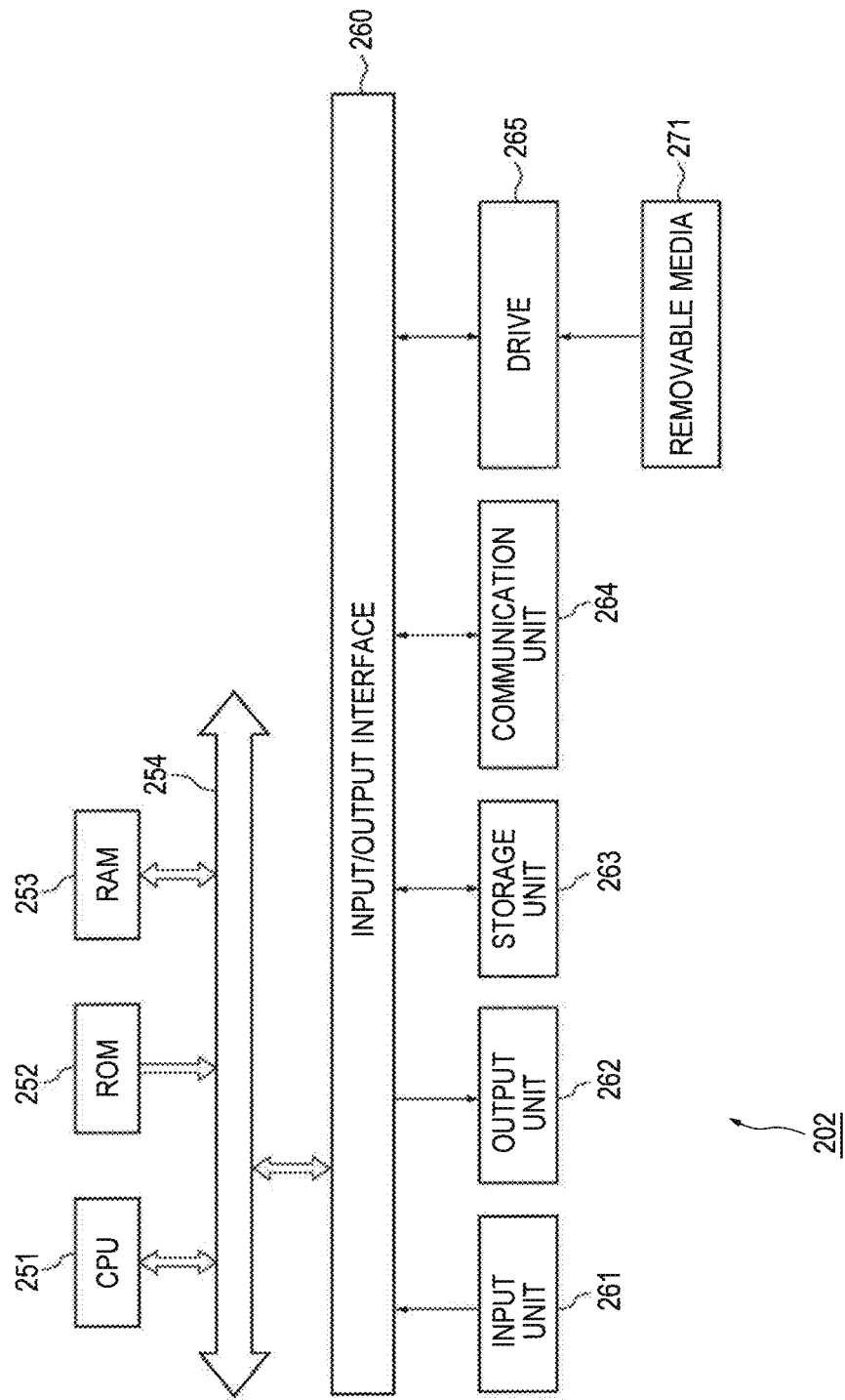
FIG. 6 is a figure which shows a main configuration example of a server.

FIG. 6 is a block diagram which shows a main configuration example of the server 202. As shown in FIG. 6, in the server 202, a CPU 251, a ROM 252, and a RAM 253 are mutually connected via a bus 254.

An input/output interface 260 is also connected to the bus 254. An input unit 261, an output unit 262, a storage unit 263, a communication unit 264, and a drive 265 are connected to the input/output interface 260.

The input unit 261 is constituted by an input device which receives information of the outside such as a user input. For example, operation buttons, a touch panel, a microphone, a camera, an input terminal or the like are included in the input unit 261. Further, various types of sensors such as an acceleration sensor, an optical sensor, and a temperature sensor may be included in the input unit 261. The output unit 262 is constituted by an output device which outputs information such as an image or audio. For example, a display, a speaker, an output terminal or the like are included in the output unit 262.

The storage unit 263 is constituted, for example, by a hard disk, a RAM disk, a nonvolatile memory or the like. The communication unit 264 is constituted, for example, by a network interface. The drive 265 drives, for example, a removable media 271 such as a magnetic disk, an optical disk, a magneto-optical disk, or a semiconductor memory.

The CPU 251 performs various types of processes, for example, by executing a program stored in the storage unit 263 by loading in the RAM 253, via the input/output interface 260 and the bus 254. Data or the like necessary from the viewpoint of executing various types of processes by the CPU 251 is also suitably stored in the RAM 253.

The program executed by the CPU 251 can be provided, for example, to the server 202 by recording to the removable media 271 as a package media or the like. In this case, the program can be installed in the storage unit 263, via the input/output interface 260, by mounting the removable media 271 in the drive 265.

Further, this program can be provided to the server 202 via a wired or wireless transfer medium, such as a LAN, the Internet, or a digital satellite broadcast. In this case, the program can be received by the communication unit 264, via the wired or wireless transfer medium, and can be installed in the storage unit 263.

Other than this, this program can be installed beforehand in the ROM 252 or the storage unit 263.

<Function Blocks>

Figure 7:
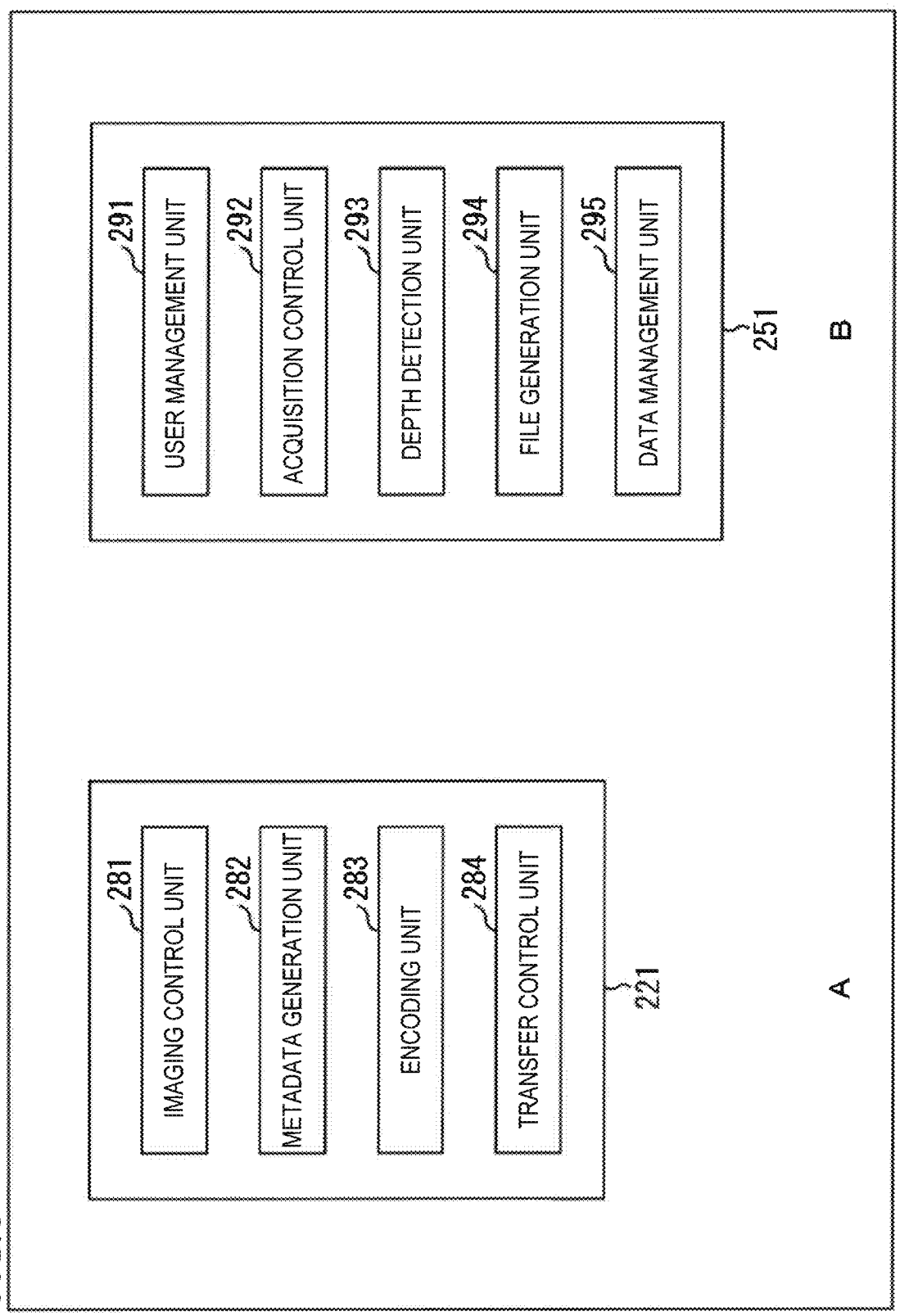
FIG. 7 is a function block diagram which describes the functions of the terminal apparatus and the server.

The terminal apparatus 201 has functions shown as the function blocks in A of FIG. 7, by having the CPU 221 execute a prescribed program. As shown in A of FIG. 7, the CPU 221 has function blocks such as an imaging control unit 281, a metadata generation unit 282, an encoding unit 283, and a transfer control unit 284.

The imaging control unit 281 performs a process related to a control of multi-viewpoint imaging. The metadata generation unit 282 performs a process related to a generation of metadata of a multi-viewpoint image obtained by multi-viewpoint imaging. The encoding unit 283 performs a process related to encoding of a multi-viewpoint image. The transfer control unit 284 performs a process related to a transfer control of multi-viewpoint image data or the like.

Further, the server 202 has functions shown as the function blocks in B of FIG. 7, by having the CPU 251 execute a prescribed program. As shown in B of FIG. 7, the CPU 251 has function blocks such as a user management unit 291, an acquisition control unit 292, a depth detection unit 293, a file generation unit 294, and a data management unit 295.

Figure 8:
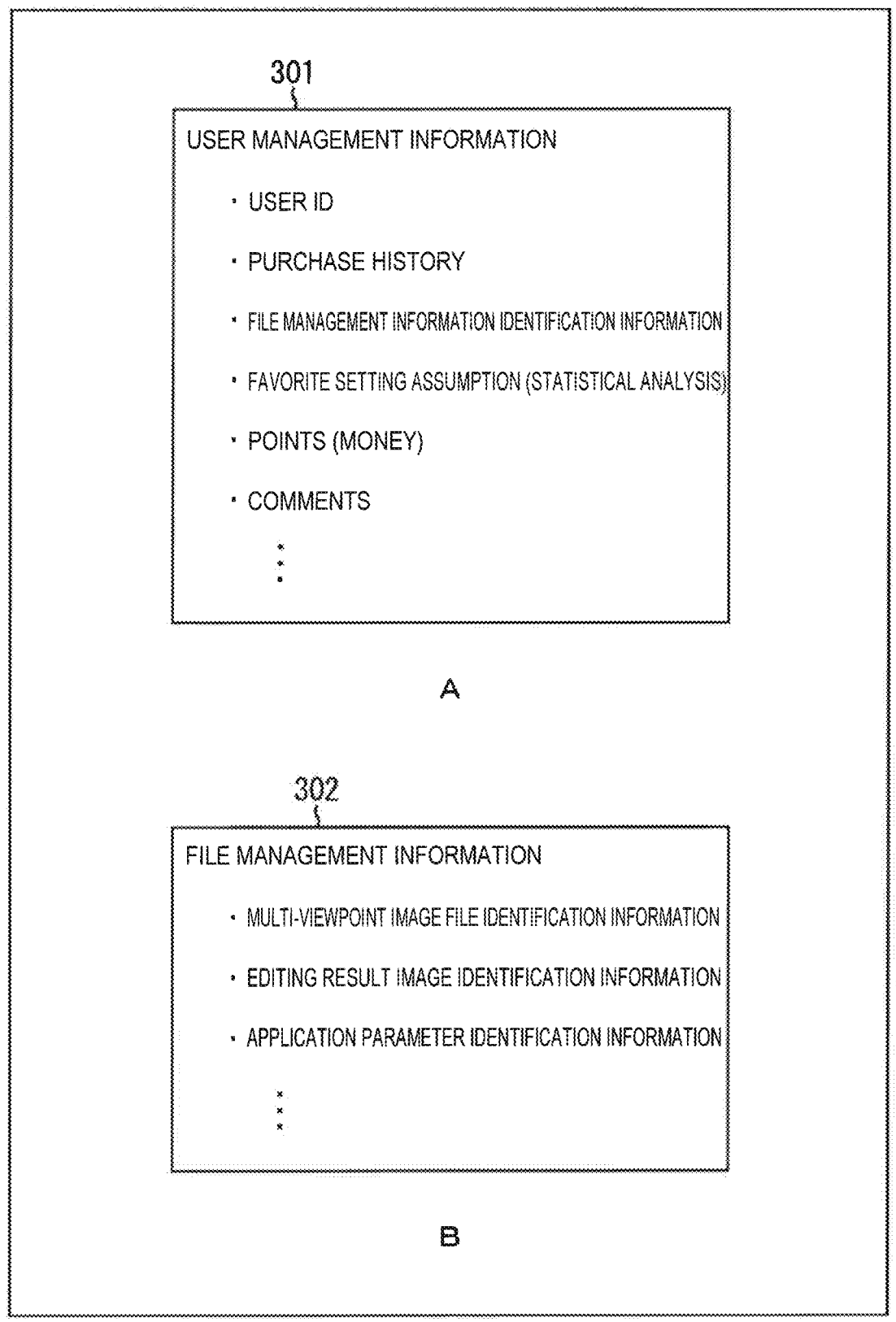
FIG. 8 is a figure which shows an example of information managed by the server.

The user management unit 291 performs a process related to management of a user for whom a multi-viewpoint image use service is to be provided. For example, the user management unit 291 stores user management information 301 such as shown in A of FIG. 8 in the storage unit 263, and performs management, for each user. As shown in A of FIG. 8, for example, a user ID which is identification information of a user, a purchase history of a user, file management information identification information which is identification information of file management information associated with a user (registered to a user), a favorite setting assumption which is information assuming a setting preferred by a user, for example, by statistical analysis or the like, points (or money) of a user, comments sent to other users or sent from other users or the like are included in this user management information 301. It is needless to say that the contents of the user management information 301 are arbitrary, and a part of the above described information may be omitted, or information other than that described above may be included.

The acquisition control unit 292 performs a process related to acquisition control of information such as multi-viewpoint image data transferred from the terminal apparatus 201. The depth detection unit 293 performs a process related to a detection of a depth value of a multi-viewpoint image. The file generation unit 294 performs a process related to a generation of a multi-viewpoint image file in which various types of data including multi-viewpoint image data is made into a file.

The data management unit 295 performs a process related to management of data such as a multi-viewpoint image file. For example, the data management unit 295 stores file management information 302 such as shown in B of FIG. 8 in the storage unit 263, and performs management, for each multi-viewpoint image file. As shown in B of FIG. 8, for example, multi-viewpoint image file identification information which is identification information of a multi-viewpoint image file, editing result image identification information which is identification information of an editing result image for an editing result of a multi-viewpoint image, associated with a multi-viewpoint image file, application parameter identification information which is identification information of an application parameter for a history such as the operation of applications using a multi-viewpoint image, associated with a multi-viewpoint image file, or the like are included in this file management information 302. It is needless to say that the contents of the file management information 302 are arbitrary, and a part of the above described information may be omitted, or information other than that described above may be included.

<Flow of the Multi-Viewpoint Image Use Service Provision Process>

The terminal apparatus 201 and the server 202 of the multi-viewpoint image use service provision system of a configuration such as described above perform a provision of a service which uses a multi-viewpoint image, or in the case of the present embodiment, a provision of a service such as management of a multi-viewpoint image, by executing a multi-viewpoint image use service provision process. An example of the flow of the multi-viewpoint image use service provision process executed by these apparatuses will be described, by referring to the flow chart of FIG. 9.

In step S101, the imaging control unit 281 of the terminal apparatus 201 multi-viewpoint captures a photographic subject, by controlling the imaging unit 236, and obtains a multi-viewpoint image. For example, the imaging control unit 281 obtains a multi-viewpoint image 311 composed of a plurality of captured images with mutually different viewpoints, such as shown in A of FIG. 10, by multi-viewpoint imaging.

Returning to FIG. 9, when multi-viewpoint image data is obtained by multi-viewpoint imaging, in step S102, the metadata generation unit 282 generates metadata of the multi-viewpoint image data. While the details of metadata will be described below, sequence information showing a relative position relationship of each viewpoint of a multi-viewpoint image, and eye number information showing a number of viewpoints of a multi-viewpoint image, for example, are included in the metadata. Namely, the metadata generation unit 282 generates metadata which includes these sequence information and eye number information, and associates these with the multi-viewpoint image data.

In step S103, the encoding unit 283 encodes the multi-viewpoint image data by a prescribed encoding method, and generates multi-viewpoint image encoding data. This encoding method may be any method if it is a method which encodes image data. For example, it may be an existing encoding method such as Joint Photographic Experts Group (JPEG), Moving Picture Experts Group (MPEG) or the like, or may be a new encoding method with a dedicated use for a multi-viewpoint image. Note that, the above described metadata of multi-viewpoint image data (for example, sequence information, eye number information or the like) is associated with this multi-viewpoint image encoding data, by the metadata generation unit 282, after encoding of the multi-viewpoint image data (it becomes metadata of multi-viewpoint image encoding data).

In step S104, the transfer control unit 284 causes the multi-viewpoint image encoding data generated in step S103 to be transferred to the server 202 along with the metadata generated in step S102, by controlling the communication unit 234. For example, the transfer control unit 284 transfers the multi-viewpoint image encoding data and the metadata as a bit steam, or auxiliary information of the bit stream.

In step S111, the acquisition control unit 292 of the server 202 acquires the multi-viewpoint image encoding data and this metadata transferred from the terminal apparatus 201 in step S104, by controlling the communication unit 264.

In step S112, the depth detection unit 293 decodes the multi-viewpoint image encoding data acquired in step S111 by a decoding method corresponding to the encoding method of step S103.

In step S113, the depth detection unit 293 detects a depth of this multi-viewpoint image, by using the multi-viewpoint image data obtained by having the multi-viewpoint image encoding data decoded in step S112, and generates depth data. For example, the depth detection unit 293 generates a depth map 312 in which a distance to a photographic subject is represented by a brightness and color for each pixel, such as shown in B of FIG. 10, as the depth data. Note that, the details of a detection of a depth will be described below.

Returning to FIG. 9, when depth data is generated, in step S114, the depth detection unit 293 encodes the multi-viewpoint image data for which a depth has been detected, and generates multi-viewpoint image encoding data. This encoding method may be any method if it is a method which encodes image data. For example, it may be an existing encoding method such as JPEG, MPEG or the like, or may be a new encoding method with a dedicated use for a multi-viewpoint image. It may be the same as the encoding method of step S103, or it may not be the same. The depth detection unit 293 associates the generated depth data with this multi-viewpoint image encoding data.

Note that, this depth detection (generation of depth data) may be performed in an arbitrary apparatus other than the server 202. For example, it may be performed in the terminal apparatus 201. In this case, the CPU 221 of the terminal apparatus 201 may suitably have necessary function blocks such as the depth detection unit 293. In this case, the depth detection unit 293 may detect a depth, prior to the multi-viewpoint image data being encoded by the encoding unit 283 (prior to the process of step S103 being executed). Then, in step S103, as described above, the encoding unit 283 may encode the multi-viewpoint image data, the depth detection unit 293 may associate the depth data with the multi-viewpoint image encoding data, and the metadata generation unit 282 may associate the metadata (for example, sequence information, eye number information or the like) with the multi-viewpoint image encoding data.

In step S115, the file generation unit 294 generates a multi-viewpoint image file, which includes the multi-viewpoint image encoding data, and this metadata, generated in step S114, and the depth data generated in step S113. Note that, the format form of this multi-viewpoint image file is arbitrary. For example, in the case where the multi-viewpoint image is a still image, it may be made into a file in an Exchangeable Image File Format (EXIF) file format. Further, for example, in the case where the multi-viewpoint image is a moving image, it may be made into a file in an MPEG-4 Part 14 (MP4) file format. It is needless to say that it may be made into a file in a format form other than these.

Figure 11:
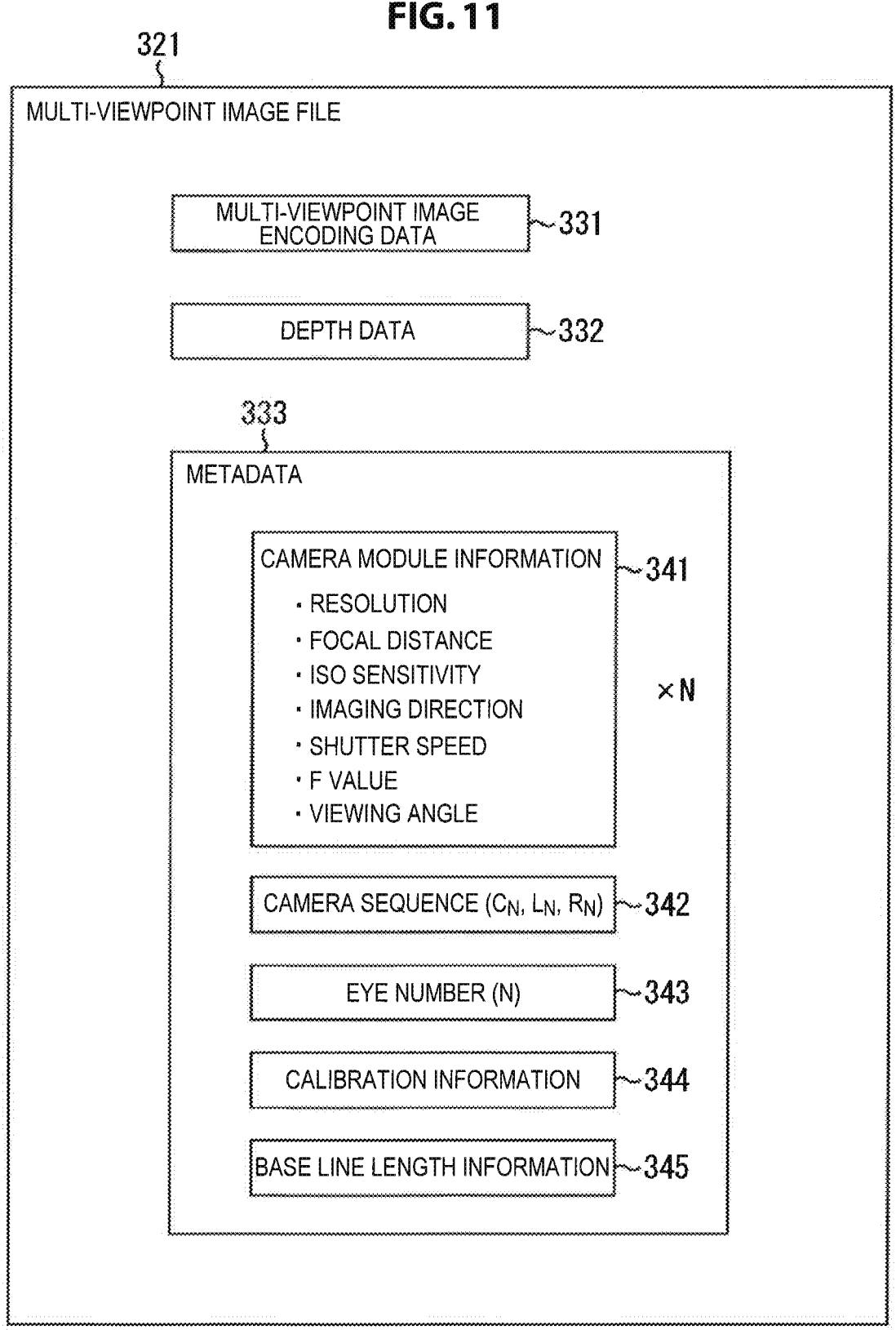
FIG. 11 is a figure which shows a main configuration example of a multi-viewpoint image file.

For example, the file generation unit 294 generates a multi-viewpoint image file 321 of a configuration such as shown in FIG. 11. In the case of the example of FIG. 11, multi-viewpoint image encoding data 331, depth data 332, and metadata 333 are included in the multi-viewpoint image file 321.

The multi-viewpoint image encoding data 331 is the multi-viewpoint image encoding data generated in step S114. The depth data 332 is the depth data generated in step S113, and is depth data of a multi-viewpoint image of the multi-viewpoint image encoding data 331. The metadata 333 is the metadata generated in step S102, and is metadata of the multi-viewpoint image encoding data 331.

For example, as shown in FIG. 11, camera module information 341, camera sequence information 342, eye number information 343, calibration information 344, and base line length information 345 are included in the metadata 333.

The camera module information 341 is information related to imaging which obtains a multi-viewpoint image, that is, information related to each of the camera modules 242 of the imaging unit 236. For example, in the case where N camera modules 242 are installed in the imaging unit 236, N camera module information 341 are included in the metadata 333. For example, as shown in FIG. 11, information such as a resolution, a focal distance, an ISO sensitivity, an imaging direction, a shutter speed, an F value, and a viewing angle are included in the camera module information 341. It is needless to say that the configuration of the camera module information 341 is arbitrary, and one part may be omitted, or information other than these may be included, within these information.

Figure 12:
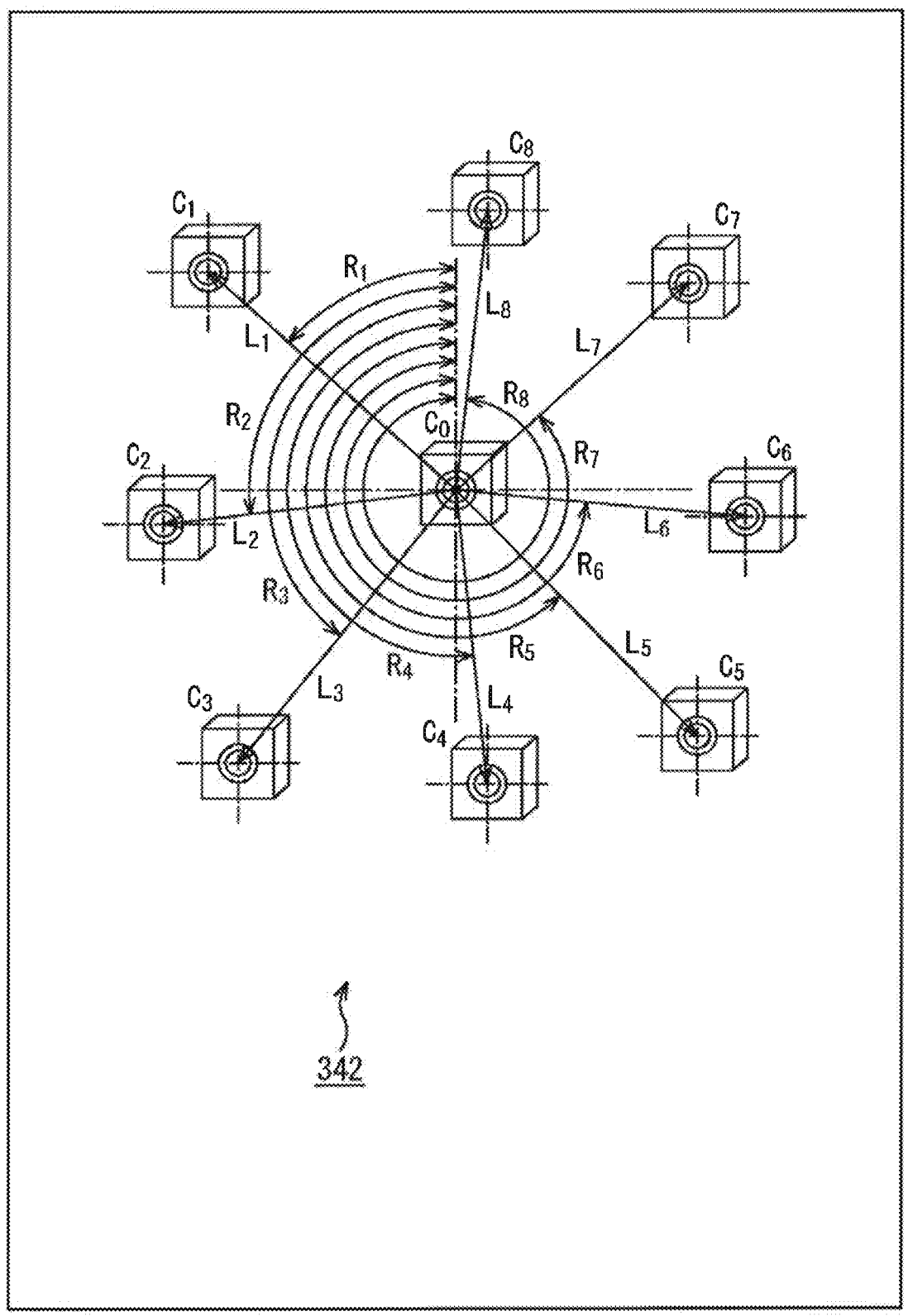
FIG. 12 is a figure which describes an example of a camera sequence.

The camera sequence information 342 is information showing a relative position relationship of each of the camera modules 242. That is, the camera sequence information 342 is information showing a relative position relationship of each of the viewpoints of a multi-viewpoint image. For example, as shown in FIG. 12, the camera sequence information 342 includes a distance $L_x$ from a camera module serving as a reference $C_0$ to a camera module other than this $C_x$ (in the case of the example of FIG. 12, x=1 through to 8) (a distance L from a viewpoint serving as a reference to each of the viewpoints), and an orientation $R_x$ of a camera module other than this $C_x$ from the camera module serving as a reference $C_0$ (an orientation $R_x$ of each of the viewpoints from a viewpoint serving as a reference).

The eye number information 343 is information showing a number (number of viewpoints) of each of the camera modules 242. The calibration information 344 is information showing a dispersion of each of the camera modules 242. The base line length information 345 is information serving as a reference of length in a multi-viewpoint image.

Note that, the configuration of the metadata 333 is arbitrary, and a part may be omitted, or information other than these may be included, within these information.

Figure 13:
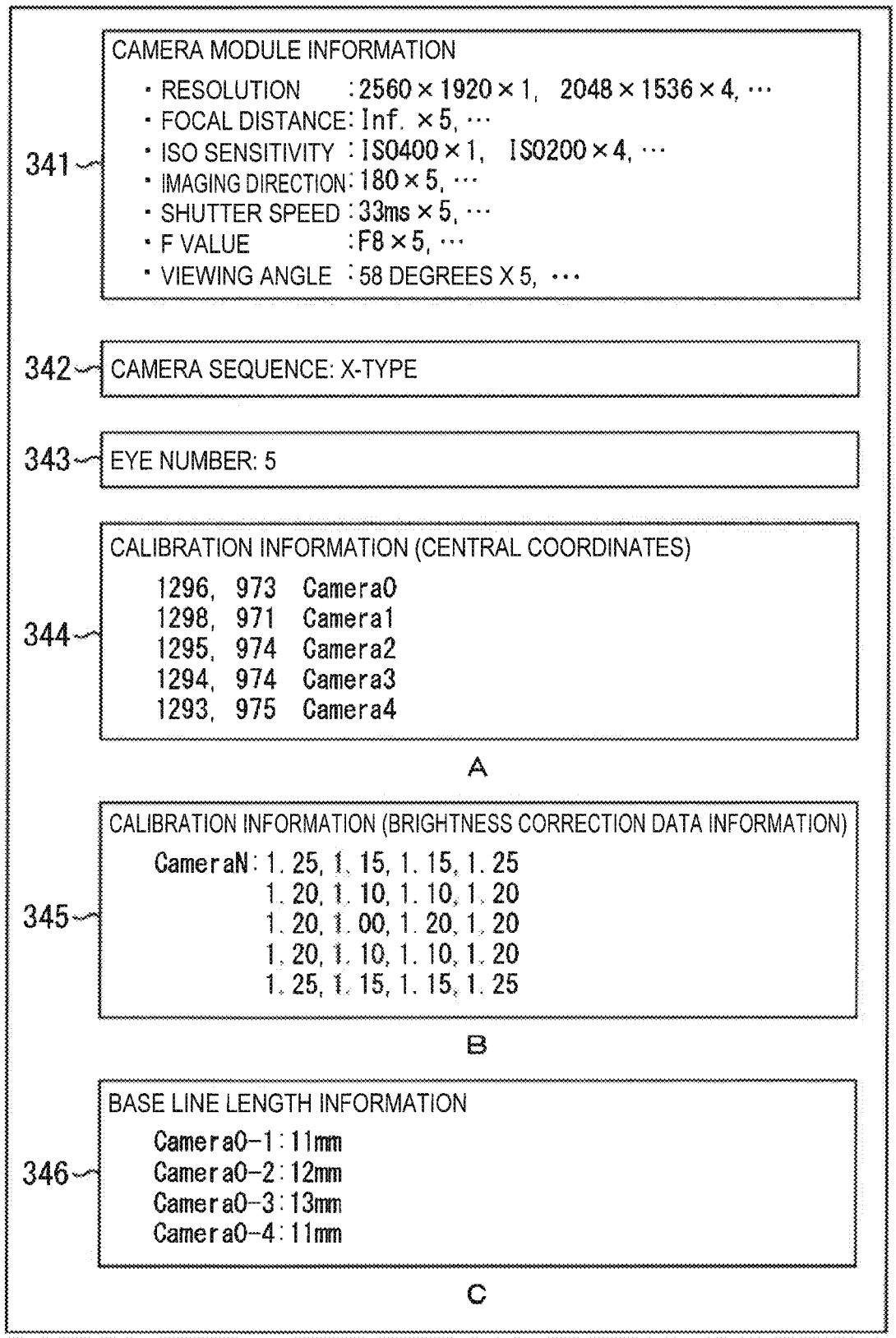
FIG. 13 is a figure which describes an example of metadata.

FIG. 13 is a figure which shows a configuration example of each data of such metadata. As shown in A of FIG. 13, the camera module information 341 may have information, such as a resolution, a focal distance, an ISO sensitivity, an imaging direction, a shutter speed, an F value, and a viewing angle, shown for each of the camera modules 242.

When these parameters of each of the camera modules 242 are set to mutually different values, a higher quality image can be obtained, at the time when each of the captured images of a multi-viewpoint image overlap, for example, by controlling a selection of the overlapping captured images and a mixture ratio of these, in accordance with the values of the parameters. For example, an image in which this parameter is close to a desired value becomes easy to obtain, by overlapping only captured images in which this parameter is close to a desired value, or more strongly overlapping captured images in which this parameter is close to this desired value (this mixture ratio of the captured images is raised). Accordingly, since an unnecessary imaging process for changing a parameter can be reduced, a reduction of the image quality due to an image process can be suppressed (a higher quality image can be obtained).

Further, since each captured image takes various values for these parameters, a captured image close to this desired value can be obtained, by setting a parameter of an image obtained as a result of overlapping to some value. That is, a higher image quality can be obtained, regardless of the value of the parameter.

The camera sequence information 342 may represent a sequence of each of the camera modules 242 such as described above by a relative position relationship ($C_N$, $L_N$, $R_N$), such as in the example of FIG. 11, or may represent it by a sequence type determined in advance, such as "X-type", such as in the example of A of FIG. 13. By setting such as in the example of FIG. 11, the degree of freedom of a sequence can be improved, and by setting such as in the example of FIG. 13, an increase of the information amount of metadata can be suppressed.

Further, the eye number information 343 is shown by a numeral, such as in the example shown in A of FIG. 13.

The calibration information 344 may be constituted, for example, by information showing a position of each viewpoint of a multi-viewpoint image. In the case of the example of A of FIG. 13, the calibration information 344 is constituted by coordinate information of each of the camera modules 242 (information showing the central coordinates of each of the camera modules). Further, the calibration information 344 may be constituted, for example, by information which corrects a brightness of each image of a multi-viewpoint image. In the case of the example of B of FIG. 13, the calibration information 344 is constituted by brightness correction data information of each of the camera modules 242.

The base line length information 345 may include, for example, information showing a distance from a viewpoint serving as a reference of a multi-viewpoint image to each of the viewpoints. In the case of the example of C of FIG. 13, the base line length information 345 includes information showing a distance from the camera module 242 serving as a reference to the other camera modules 242.

Returning to FIG. 9, in step S116, the data management unit 295 supplies the multi-viewpoint image file generated in step S115 to the storage unit 263 to be stored, and generates and manages the file management information 302 of this multi-viewpoint image. Further, the user management unit 291 updates the user management information 301 of this user, stored in the storage unit 263, and registers this multi-viewpoint image file to the user.

When the process of step S116 ends, the multi-viewpoint image use service provision process ends.

By executing such a multi-viewpoint image use service provision process, a user can more easily perform registration to the server 202 of multi-viewpoint image data obtained by multi-viewpoint imaging. Further, since multi-viewpoint image data is managed by making into a file together with related data (depth data, metadata or the like) related to this multi-viewpoint image, a user can more easily use the multi-viewpoint image data registered by himself or herself. Namely, the multi-viewpoint image use service provision system 200 (the multi-viewpoint image use service platform 100) can improve convenience of a service using a multi-viewpoint image.

Note that, while a description has been made heretofore in which multi-viewpoint imaging is performed by using the imaging unit 236 which has a plurality of the camera modules 242, and a multi-viewpoint image (multi-viewpoint image data) is generated, the generation method of a multi-viewpoint image (multi-viewpoint image data) is arbitrary. For example, a multi-viewpoint image may be generated, by performing imaging (may be moving image imaging, or may be a plurality of still image imaging) while causing the imaging position or imaging direction (that is, the viewpoint) to be moved by using an imaging unit which has a single imaging element and optical system (that is, an imaging unit which has a single camera module 242). In this case, it is desirable for information related to a displacement of the imaging position or imaging direction (the viewpoint) to be associated with the multi-viewpoint image data (multi-viewpoint image encoding data), as metadata.

Further, while a description has been made heretofore in which the multi-viewpoint image file generated by the file generation unit 294 is stored and managed in the storage unit 263 of the server 202, the location at which the multi-viewpoint image file is managed is arbitrary. For example, the multi-viewpoint image file may be stored and managed in an apparatus other than the server 202 (for example, a file management server or the like, which is not illustrated). In this case, the file generation unit 294 transfers the generated multi-viewpoint image file to this apparatus, as a bit stream, or auxiliary information of the bit stream, for example, via the communication unit 264. In this case, this apparatus may have a communication unit which acquires a multi-viewpoint image file by communicating with the server 202, a storage unit which stores the acquired multi-viewpoint image file, and a data management unit which is a function block for managing the multi-viewpoint image file stored in this storage unit, updating this multi-viewpoint image file as necessary, and supplying it to another apparatus such as the terminal apparatus 201 or the server 202.

In addition, while a description has been made heretofore in which the multi-viewpoint image file is generated in the server 202, the generation of the multi-viewpoint image file may be performed in an arbitrary apparatus. For example, it may be performed in the terminal apparatus 201. In this case, the CPU 221 of the terminal apparatus 201 may suitably have necessary function blocks such as the file generation unit 294. In this case, the file generation unit 294 may generate the multi-viewpoint image file, after the multi-viewpoint image data has been encoded by the encoding unit 283 (after the process of step S103). Then, in step S104, the transfer control unit 284 may transfer the multi-viewpoint image file to the server 202, as a bit stream, or auxiliary information of the bit stream, and in step S111, the acquisition control unit 292 may acquire this multi-viewpoint image file, by controlling the communication unit 264.

<Flow of the Depth Detection Process>

Figure 14:
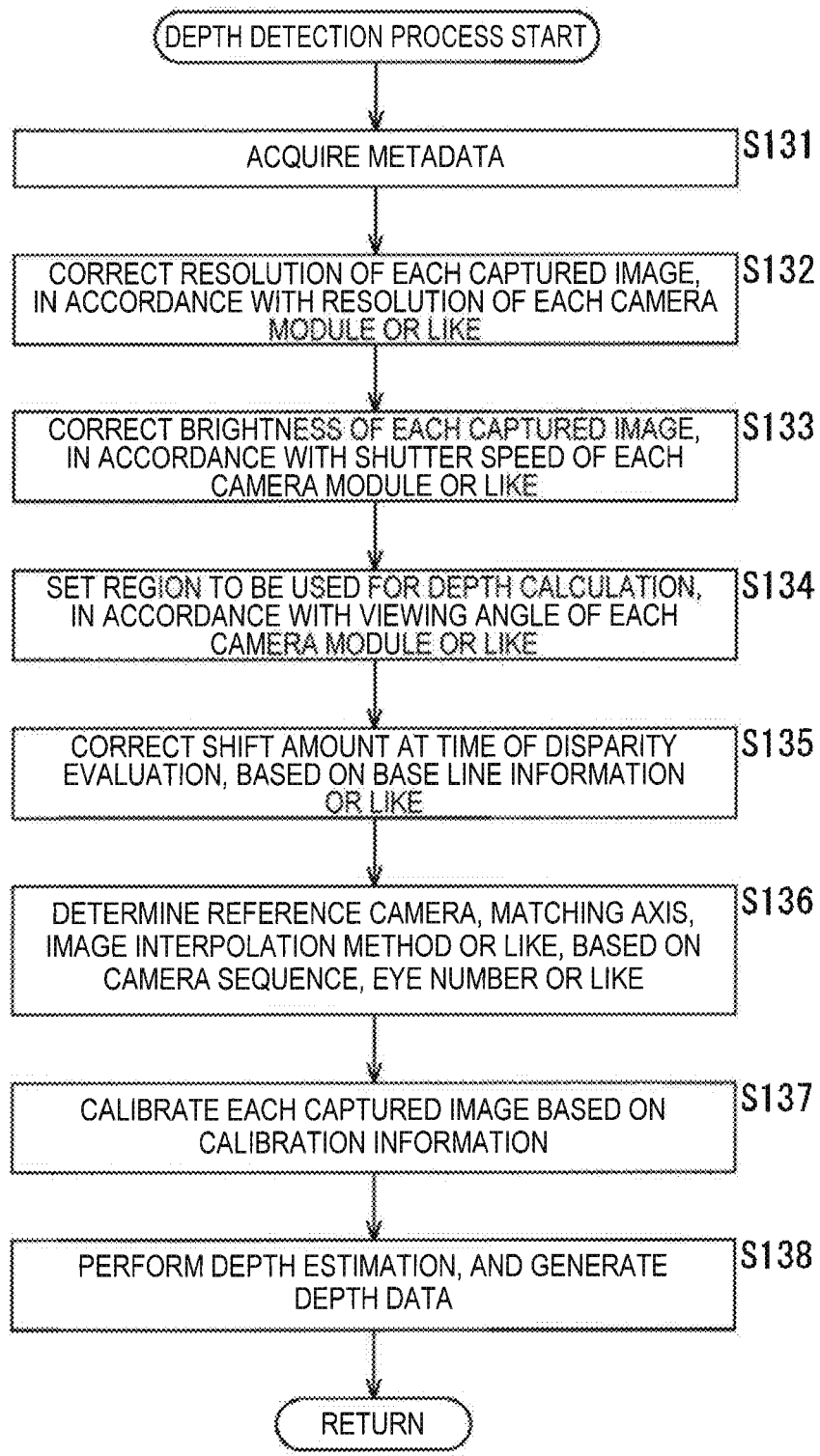
FIG. 14 is a flow chart which shows an example of the flow of a depth detection process.

Next, an example of the flow of the depth detection process executed in step S113 of FIG. 9 will be described, by referring to the flow chart of FIG. 14.

When the depth detection process is started, in step S131, the depth detection unit 293 acquires the metadata 333. In step S132, the depth detection unit 293 corrects the resolution of each captured image, in accordance with the resolution of each of the camera modules 242 or the like.

In step S133, the depth detection unit 293 corrects the brightness of each captured image, in accordance with the shutter speed of each of the camera modules or the like. In step S134, the depth detection unit 293 sets a region to be used for a depth calculation, in accordance with the viewing angle of each of the camera modules or the like.

In step S135, the depth detection unit 293 corrects the shift amount at the time of a disparity evaluation, based on the base line length information 345 or the like. In step S136, the depth detection unit 293 determines a reference camera, a matching axis, an image interpolation method or the like, based on the camera sequence, the eye number or the like.

In step S137, the depth detection unit 293 calibrates each captured image, based on the calibration information 344. In step S138, the depth detection unit 293 performs a depth estimation by repeating stereo matching or the like, and detects depth data.

Figure 9:
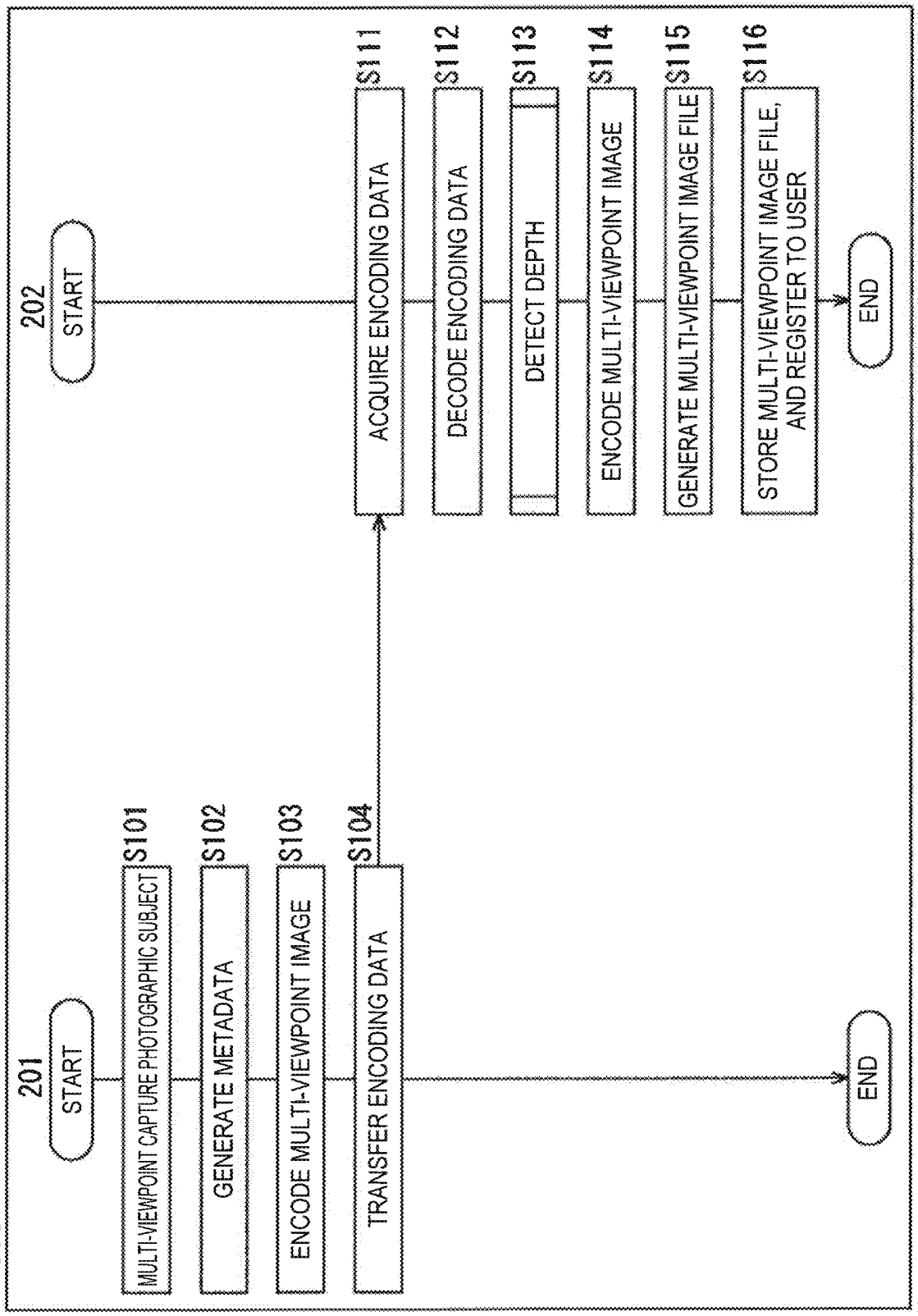
FIG. 9 is a flow chart which shows an example of the flow of a multi-viewpoint image use service provision process.

When depth data is detected, the process returns to FIG. 9.

As described above, by having the depth detection process performed, a user can more easily generate and use depth data.

3. Third Embodiment

<Application Sales>

As described in the first embodiment, the multi-viewpoint image use service platform 100 can provide a service which sells the application 112, for example, in the application market 102. In the present embodiment, a sale of this application will be described.

<The Multi-Viewpoint Image Use Service Provision System>

Figure 15:
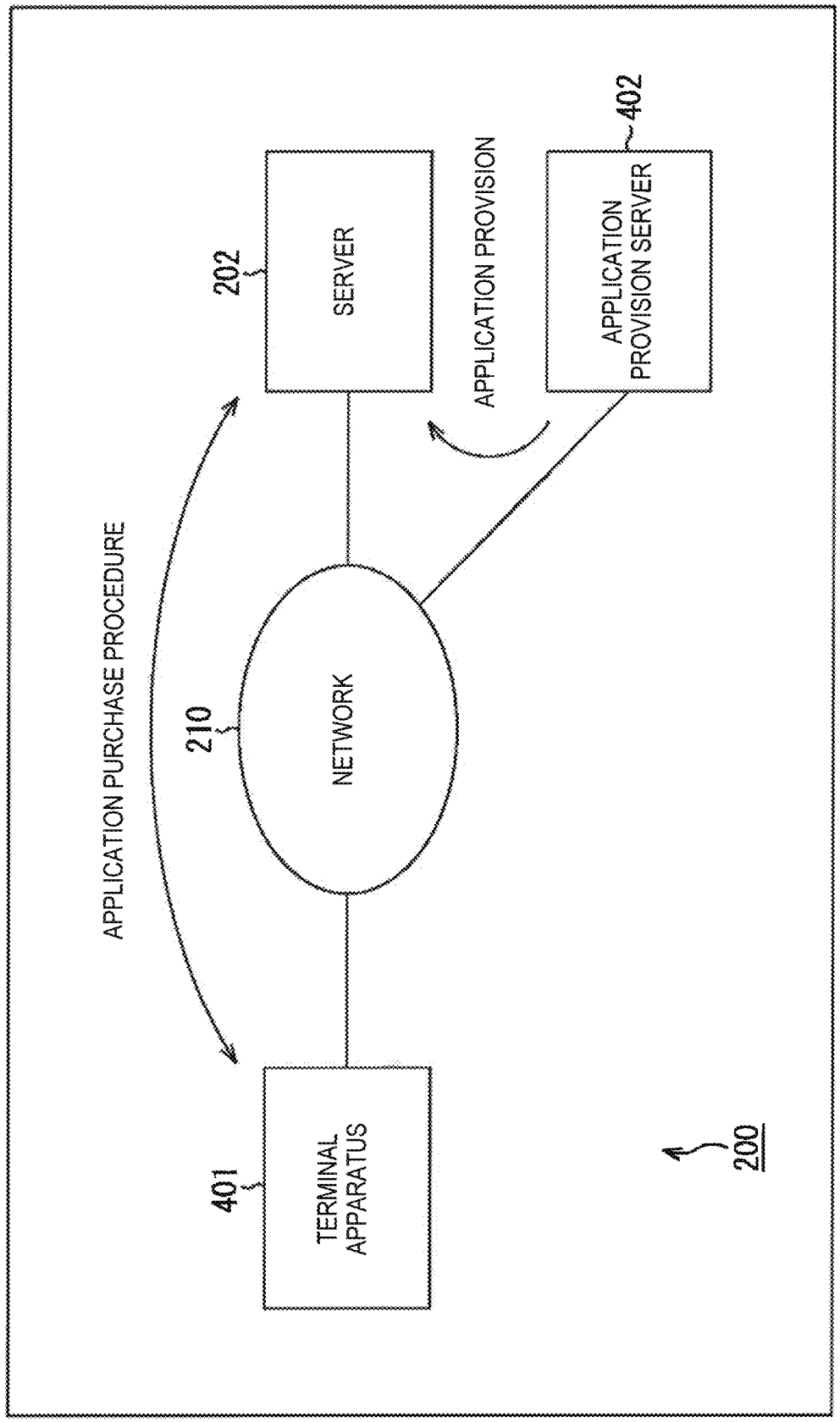
FIG. 15 is a figure which shows another configuration example of a multi-viewpoint image use service provision system.

FIG. 15 is a figure which shows a main configuration example of the multi-viewpoint image use service provision system. The multi-viewpoint image use service provision system 200 shown in FIG. 15 is an example of a system to which the present disclosure is applied, and is a system in which the server 202 provides a service using a multi-viewpoint image to a terminal apparatus 201 connected via the network 210. Namely, the multi-viewpoint image use service provision system 200 is an example of a configuration which implements the multi-viewpoint image use service platform 100.

FIG. 15 shows an example of a configuration related to the provision of a service related to the sale or provision of the application 112, from among the services provided by the multi-viewpoint image use service platform 100. In FIG. 15, the multi-viewpoint image use service provision system 200 has the terminal apparatus 401, the server 202, and an application provision server 402 connected to the network 210.

The terminal apparatus 401 connected by wires or wirelessly to the network 210 performs a procedure related to a purchase of the application 112, by performing communication with the server 202. The terminal apparatus 401 may be the terminal apparatus 201, or may be a terminal apparatus different to the terminal apparatus 201. The terminal apparatus 401 basically has a configuration the same as that of the terminal apparatus 201. Therefore, the configuration shown in FIG. 4 can also be applied to the terminal apparatus 401. However, in the case of the terminal apparatus 401, the function related to imaging may be unnecessary, and so the imaging unit 236 can be omitted.

The application provision server 402 is a server which provides the application 112 to the multi-viewpoint image use service platform 100 (the application market 102). The server 202 sells or provides an application provided by the application provision server 402 towards (a user of) the terminal apparatus 401.

<Server>

Figure 16:
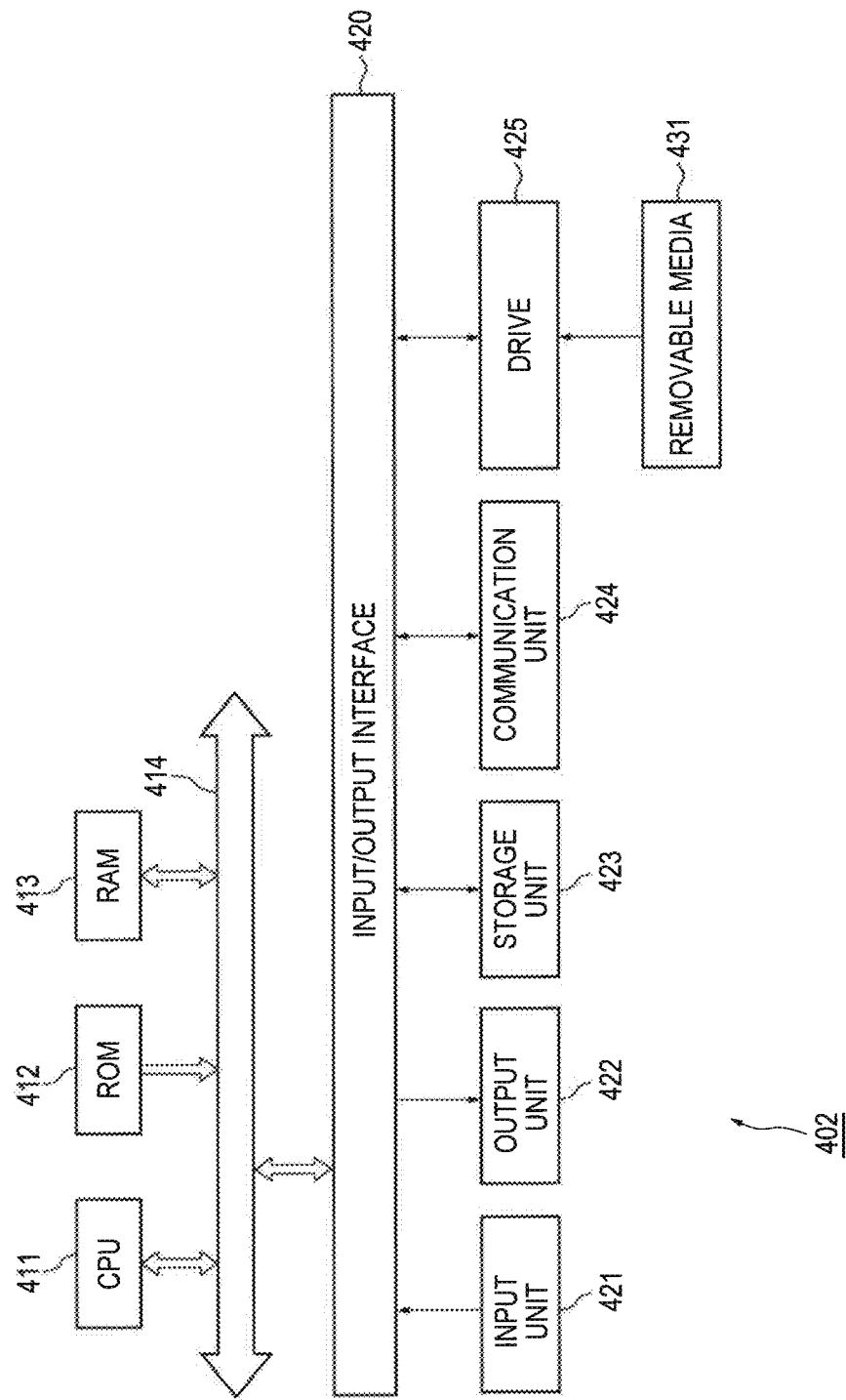
FIG. 16 is a figure which shows a main configuration example of an application provision server.

FIG. 16 is a block diagram which shows a main configuration example of the application provision server 402. As shown in FIG. 16, in the application provision server 402, a CPU 411, a ROM 412, and a RAM 413 are mutually connected via a bus 414.

An input/output interface 420 is also connected to the bus 414. An input unit 421, an output unit 422, a storage unit 423, a communication unit 424, and a drive 425 are connected to the input/output interface 420.

The input unit 421 is constituted by an input device which receives information of the outside such as a user input. For example, operation buttons, a touch panel, a microphone, a camera, an input terminal or the like are included in the input unit 421. Further, various types of sensors such as an acceleration sensor, an optical sensor, and a temperature sensor may be included in the input unit 421. The output unit 422 is constituted by an output device which outputs information such as an image or audio. For example, a display, a speaker, an output terminal or the like are included in the output unit 422.

The storage unit 423 is constituted, for example, by a hard disk, a RAM disk, a nonvolatile memory or the like. The communication unit 424 is constituted, for example, by a network interface. The drive 425 drives, for example, a removable media 431 such as a magnetic disk, an optical disk, a magneto-optical disk, or a semiconductor memory.

The CPU 411 performs various types of processes, for example, by executing a program stored in the storage unit 423 by loading in the RAM 413, via the input/output interface 420 and the bus 414. Data or the like necessary from the viewpoint of executing various types of processes by the CPU 411 is also suitably stored in the RAM 413.

The program executed by the CPU 411 can be provided, for example, to the application provision server 402 by recording to the removable media 431 as a package media or the like. In this case, the program can be installed in the storage unit 423, via the input/output interface 420, by mounting the removable media 431 in the drive 425.

Further, this program can be provided to the application provision server 402 via a wired or wireless transfer medium, such as a LAN, the Internet, or a digital satellite broadcast. In this case, the program can be received by the communication unit 424, via the wired or wireless transfer medium, and can be installed in the storage unit 423.

Other than this, this program can be installed beforehand in the ROM 412 or the storage unit 423.

<Function Blocks>

Figure 17:
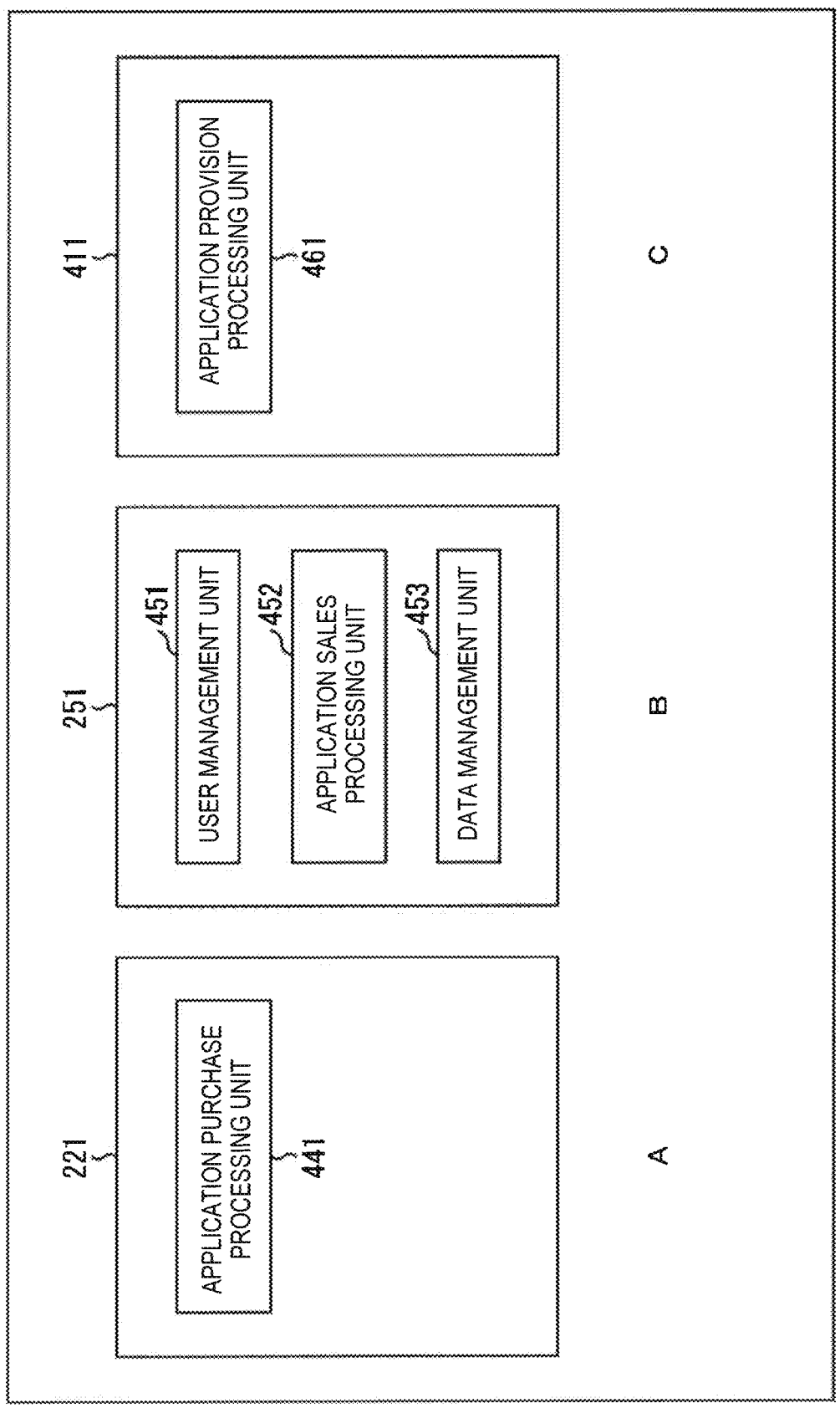
FIG. 17 is a function block diagram which describes the functions of the terminal apparatus, the server, and the application provision server.

The terminal apparatus 401 has functions shown as the function blocks in A of FIG. 17, by having the CPU 221 execute a prescribed program. As shown in A of FIG. 17, the CPU 221 has function blocks such as an application purchase processing unit 441.

The application purchase processing unit 441 controls each of the units of the input unit 231, the output unit 232, the storage unit 233, the communication unit 234 or the like, performs communication with the server 202, and performs a process related to a purchase of an application, by displaying an image or receiving an instruction of a user.

Further, the server 202 has functions shown as the function blocks in B of FIG. 17, by having the CPU 251 execute a prescribed program. As shown in B of FIG. 17, the CPU 251 has function blocks such as a user management unit 451, an application sales processing unit 452, and a data management unit 453.

The user management unit 451 performs a process related to management of a user for whom a multi-viewpoint image use service is to be provided, similar to the user management unit 291. The application sales processing unit 452 performs a process related to a sale of an application, by performing communication with the terminal apparatus 401 or the like by controlling the communication unit 264. The data management unit 453 performs a process related to management of data such as a multi-viewpoint image file, similar to the data management unit 295. Further, for example, the data management unit 295 performs a process related to management of an application supplied from the application provision server 402.

In addition, the application provision server 402 has functions shown as the function blocks in C of FIG. 17, by having the CPU 411 execute a prescribed program. As shown in C of FIG. 17, the CPU 411 has function blocks such as an application provision processing unit 461.

The application provision processing unit 461 performs a process related to a provision to the server 202 of an application, by performing communication with the server 202 or the like by controlling the communication unit 424.
<Flow of the Multi-Viewpoint Image Use Service Provision Process>

Figure 18:
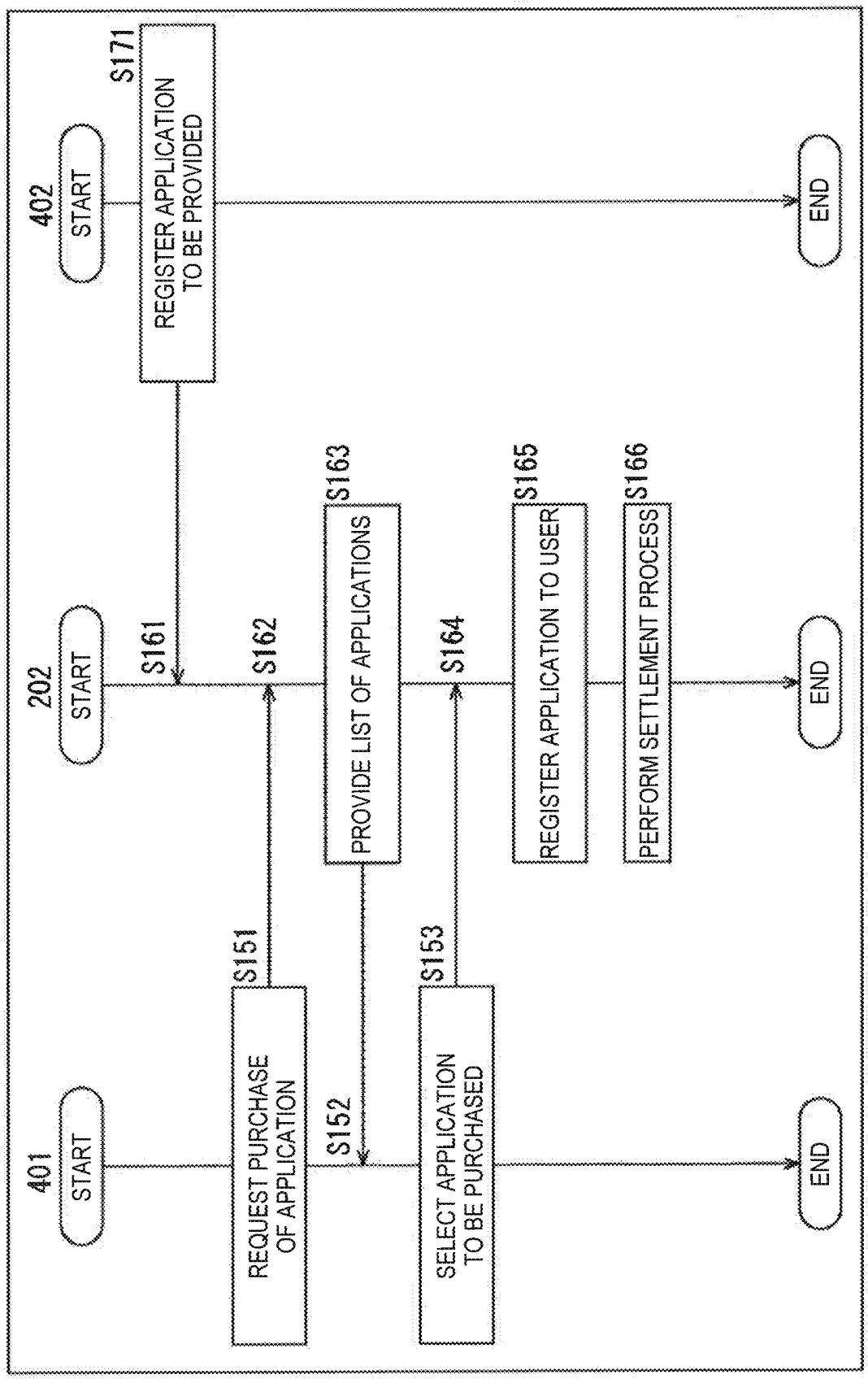
FIG. 18 is a flow chart which shows another example of the flow of a multi-viewpoint image use service provision process.

The terminal apparatus 401, the server 202, and the application provision server 402 of the multi-viewpoint image use service provision system of a configuration such as described above perform a provision of a service which uses a multi-viewpoint image, or in the case of the present embodiment, a provision of a service such as a sale of an application, by executing a multi-viewpoint image use service provision process. An example of the flow of the multi-viewpoint image use service provision process executed by these apparatuses will be described, by referring to the flow chart of FIG. 18.

In step S171, the application provision processing unit 461 of the application provision server 402 supplies an application to be provided to the server 202 by controlling the communication unit 424 or the like, and performs registration.

In step S161, the data management unit 453 of the server 202 acquires the application supplied from the application provision server 402, by controlling the communication unit 264 or the like, causes this to be stored in the storage unit 263, and manages this application so as to be able to perform a sale to the terminal apparatus 401.

In step S151, the application purchase processing unit 441 of the terminal apparatus 401 controls the communication unit 234, and requests a purchase of the application to the server 202.

In step S162, the application sales processing unit 452 of the server 202 acquires this request, by controlling the communication unit 264 or the like.

In step S163, the application sales processing unit 452 coordinates with the user management unit 451 or the data management unit 453, and creates a list of applications which can be sold to this user. Then, the application sales processing unit 452 provides this list of applications to the terminal apparatus 401, by controlling the communication unit 264 or the like.

In step S152, the application purchase processing unit 441 of the terminal apparatus 401 acquires this list of applications. The application purchase processing unit 441 presents this list of applications to a user by displaying on a monitor or the like, by controlling the output unit 232 or the like, and receives an instruction from the user.

For example, a Graphical User Interface (GUI) 471 shown in A of FIG. 19 is displayed on a monitor of the terminal apparatus 401. The user narrows down a desired application from among several, based on such a GUI. For example, in the case where an application of lens simulation is selected, a GUI 472 such as shown in B of FIG. 19 is additionally displayed, and a selection of a virtual lens is performed. Further, for example, in the case where an application which edits an image is selected, a GUI 473 such as shown in C of FIG. 19 is additionally displayed, and a selection of this editing function is performed, such as a decoration stamp or the like.

Returning to FIG. 18, in step S153, when the user selects an application to be purchased from among this list, the application purchase processing unit 441 receives this selection instruction, and supplies control information which selects the application to be purchased to the server 202, by controlling the communication unit 234 or the like.

In step S164, the application sales processing unit 452 of the server 202 acquires this control information by controlling the communication unit 264 or the like. In step S165, the application sales processing unit 452 coordinates with the user management unit 451 or the data management unit 453, and registers the selected application (the application for which a purchase has been instructed by the user) to this user, by associating with the user management information 301 of this user.

In step S166, the application sales processing unit 452 performs a settlement process related to a sale of the application. The user management unit 451 causes this settlement information to be reflected in the user management information 301 of this user (for example, the price, or points corresponding to the price, is subtracted from points or money of this user. Or, the sale of this time is added to a purchase history of the application).

When the process of step S166 ends, the multi-viewpoint image use service provision process ends.

By executing such a multi-viewpoint image use service provision process, a user can more easily perform a purchase of an application which performs a process by using a multi-viewpoint image. Further, since a purchased application is registered to a user and managed in the server 202, a user can more easily use an application purchased by himself or herself. Namely, the multi-viewpoint image use service provision system 200 (the multi-viewpoint image use service platform 100) can improve convenience of a service using a multi-viewpoint image.

Note that, an application may not be sold, or may be provided free of charge. In this case, the settlement process can be omitted.

4. Fourth Embodiment

<Virtual Lens Process>

By executing an application provided to a user such as described above, the multi-viewpoint image use service platform 100 can provide, to a user, various services which use a multi-viewpoint image.

In the present embodiment, the state of the execution of an application which performs the lens simulation (a virtual lens process) described in the first embodiment will be described, as an example of this application.

<Multi-Viewpoint Image Use Service Provision System>

Figure 20:
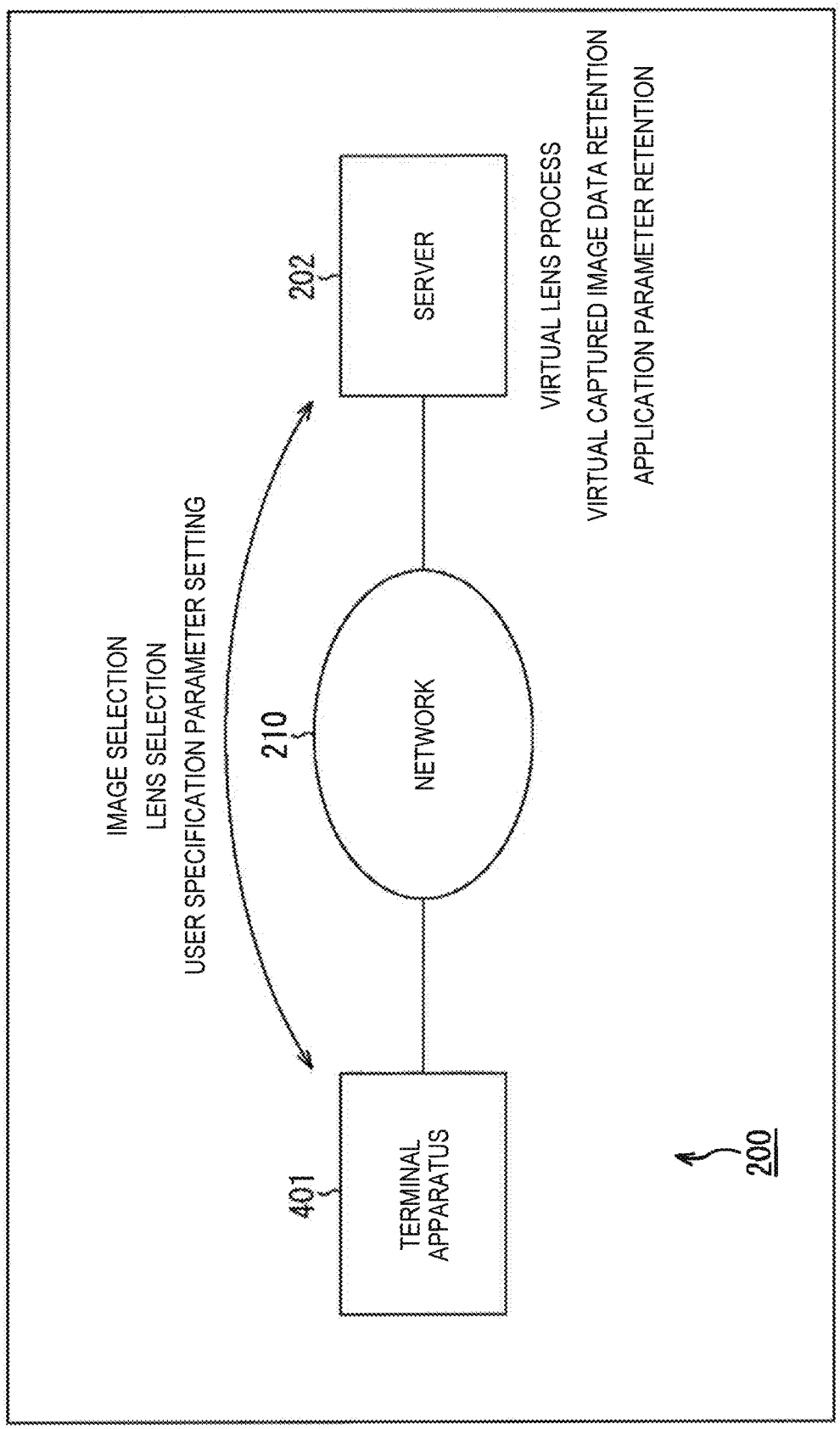
FIG. 20 is a figure which shows an additional another configuration example of a multi-viewpoint image use service provision system.

FIG. 20 is a figure which shows a main configuration example of the multi-viewpoint image use service provision system. The multi-viewpoint image use service provision system 200 shown in FIG. 20 is an example of a system to which the present disclosure is applied, and is a system in which the server 202 provides a service using a multi-viewpoint image to the terminal apparatus 201 connected via the network 210. Namely, the multi-viewpoint image use service provision system 200 is an example of a configuration which implements the multi-viewpoint image use service platform 100.

FIG. 20 shows an example of a configuration related to the provision of a service related to lens simulation (a virtual lens process), from among the services provided by the multi-viewpoint image use service platform 100. In FIG. 20, the multi-viewpoint image use service provision system 200 has the terminal apparatus 401 and the server 202 connected to the network 210.

The terminal apparatus 401 connected by wires or wirelessly to the network 210 performs communication with the server 202, and performs a selection of a multi-viewpoint image to be used for lens simulation, a selection of a virtual lens to be simulated, a setting of a user specification parameter which is a parameter related to imaging for which a user specifies a value, such as a focal position or a photographic field depth or the like.

The server 202 executes a virtual lens process which simulates a virtual lens, and generates virtual captured image data which is virtual captured image data obtained by imaging using the virtual lens, based on these processes. Further, the server 202 retains (stores, manages) this virtual captured image data. In addition, in the above described lens simulation, the server 202 has some value set for some parameter, has some operation (instruction) performed by a user, and generates and retains (stores, manages) history information showing what process has been performed or the like as an application parameter of an application which performs this lens simulation.

<Outline of the Virtual Lens Process>

Next, an outline of the virtual lens process will be described. In the virtual lens process, such as shown in A of FIG. 2, a virtual lens 150 specified by a user is set, an optical ray vector 151 which is incident light from a photographic subject incident on this virtual lens 150, an optical ray vector 152 which is incident light after permeating the virtual lens 150, a virtual image sensor 153 which obtains a virtual captured image from the optical ray vector 152 or the like are simulated (imitated appearance), and a virtual captured image is generated from a multi-viewpoint image, based on this simulation.

Figure 21:
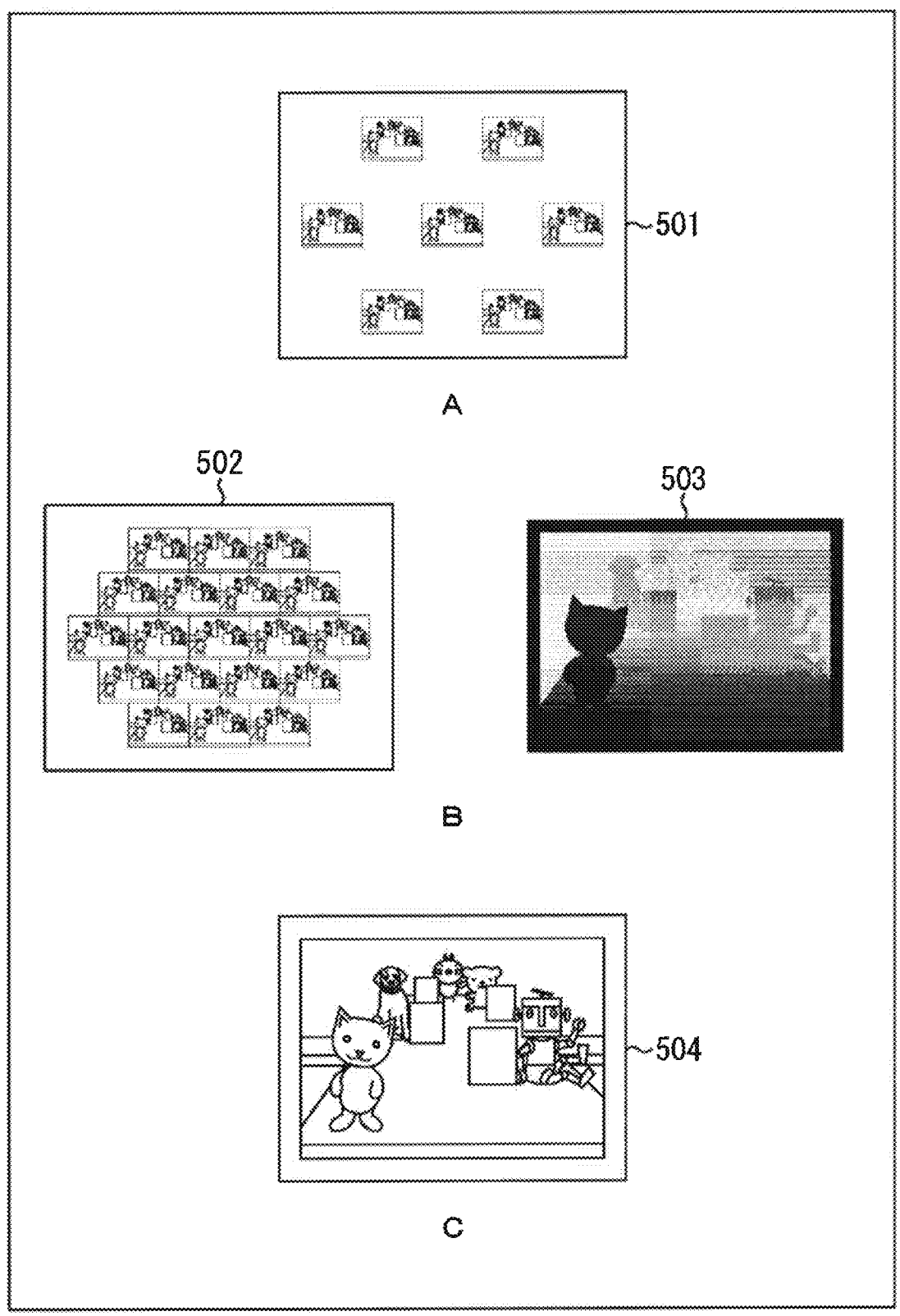
FIG. 21 is a figure which describes an example of the state of the flow of a virtual lens process.

For example, an interpolation image 502 and depth data 503 such as shown in B of FIG. 21 are generated, from a multi-viewpoint image 501 such as shown in A of FIG. 21, and by using these, a virtual captured image 504 obtained by imaging using the virtual lens 150 (the virtual optical system shown in A of FIG. 2) is generated, such as shown in C of FIG. 21.

By such a setting, the virtual captured image 504 is obtained, which is larger than each of the captured images of the multi-viewpoint image 501, and in which is reflected an optical effect given by the virtual lens 150. An optical system such as the virtual lens 150 is simulated by using profile information unique to this virtual optical system, constituted by a parameter which reproduces an optical effect by this virtual optical system. Therefore, the server 202 can easily reproduce various optical systems, from realistic ones to unrealistic ones. Namely, by this service, a user can cheaply obtain various captured images. That is, the multi-viewpoint image use service provision system 200 (the multi-viewpoint image use service platform 100) can improve convenience of a service using a multi-viewpoint image.

<Function Blocks>

Figure 22:
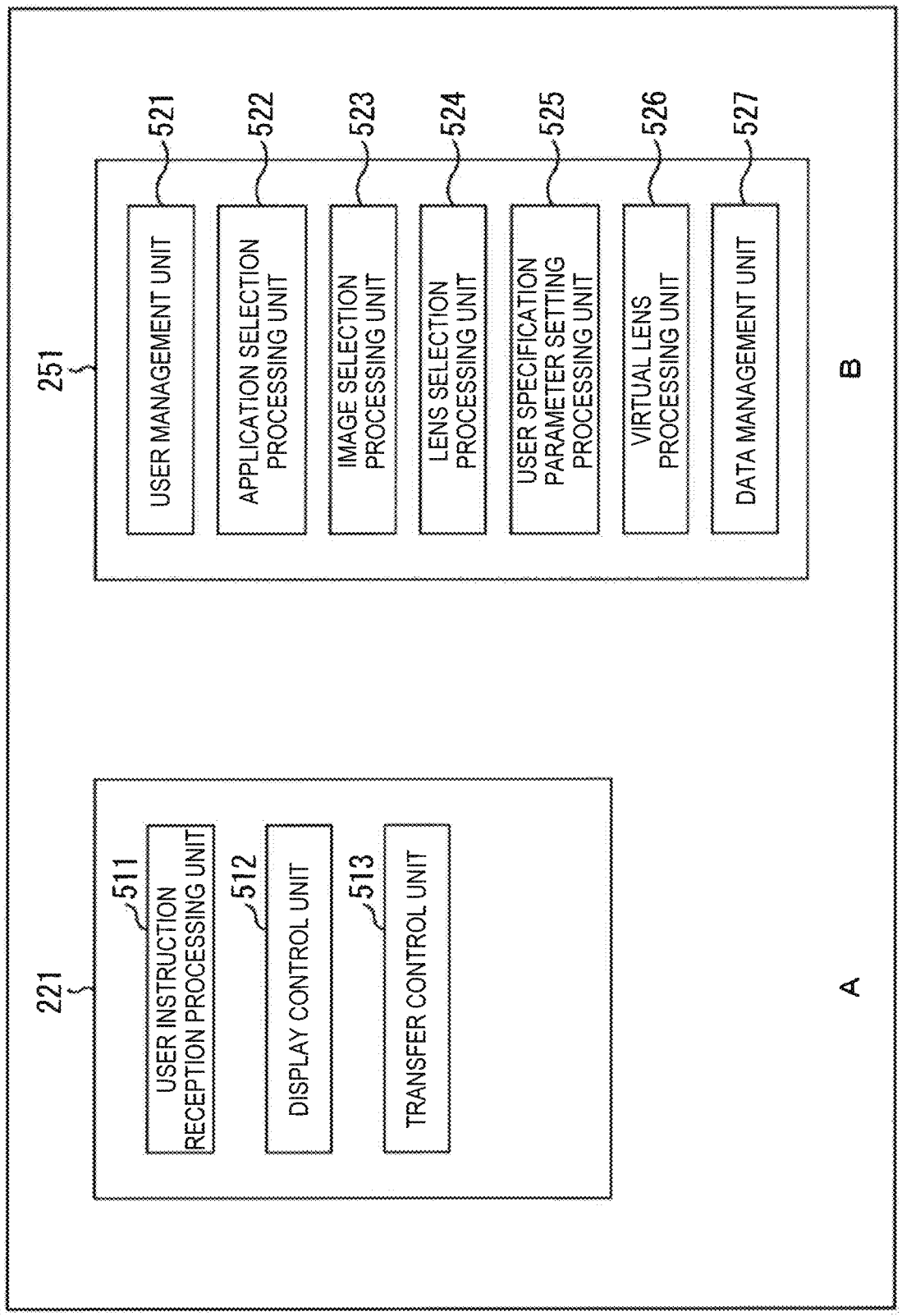
FIG. 22 is a function block diagram which describes the functions of the terminal apparatus and the server.

The terminal apparatus 401 has functions shown as the function blocks in A of FIG. 22, by having the CPU 221 execute a prescribed program. As shown in A of FIG. 22, the CPU 221 has function blocks such as a user instruction reception processing unit 511, a display control unit 512, and a transfer control unit 513.

The user instruction reception processing unit 511 performs a process related to a reception of a user instruction, by controlling the input unit 231 or the like. The display control unit 512 performs a process related to a display control such as displaying an image such as a GUI or guidance on a monitor, by controlling the output unit 232 or the like. The transfer control unit 513 performs a process related to a transfer of various types of information such as a user instruction received in the user instruction reception processing unit 511, by controlling the communication unit 234 or the like.

Further, the server 202 has functions shown as the function blocks in B of FIG. 22, by having the CPU 251 execute a prescribed program. As shown in B of FIG. 22, the CPU 251 has function blocks such as a user management unit 521, an application selection processing unit 522, an image selection processing unit 523, a lens selection processing unit 524, a user specification parameter setting processing unit 525, a virtual lens processing unit 526, and a data management unit 527.

The user management unit 521 performs a process related to management of a user for whom a multi-viewpoint image use service is to be provided, similar to the user management unit 291. The application selection processing unit 522 performs a process related to a selection of an application to be executed, by performing communication with the terminal apparatus 401 or the like by controlling the communication unit 264. The image selection processing unit 523 performs a process related to a selection of a multi-viewpoint image to be a processing target of lens simulation (a virtual lens process), by performing communication with the terminal apparatus 401 or the like by controlling the communication unit 264. The lens selection processing unit 524 performs a process related to a selection of profile information of a virtual lens to be simulated, by performing communication with the terminal apparatus 401 or the like by controlling the communication unit 264. The user specification parameter setting processing unit 525 performs a process related to a setting of a user specification parameter transferred from the terminal apparatus 401, by performing communication with the terminal apparatus 401 or the like by controlling the communication unit 264. The virtual lens processing unit 526 performs a process related to a simulation (imitated appearance) of a virtual optical system. The data management unit 527 performs a process related to management of data such as a multi-viewpoint image file, or management of an application and data related to this application or the like, similar to the data management unit 295.

<Flow of the Multi-Viewpoint Image Use Service Provision Process>

The terminal apparatus 401 and the server 202 of the multi-viewpoint image use service provision system of a configuration such as described above perform a provision of a service which uses a multi-viewpoint image, or in the case of the present embodiment, a provision of a service of lens simulation, by executing a multi-viewpoint image use service provision process. An example of the flow of the multi-viewpoint image use service provision process executed by these apparatuses will be described, by referring to the flow chart of FIG. 23.

In step S201, the user instruction reception processing unit 511 of the terminal apparatus 401 receives an instruction which requests a start of an application from a user, by controlling the input unit 231 or the like. The transfer control unit 513 supplies the start request of an application received by this user instruction reception processing unit 511 to the server 202, by controlling the communication unit 234 or the like.

In step S221, the application selection processing unit 522 of the server 202 acquires this request, by controlling the communication unit 264 or the like. In response to this request, in step S222, the application selection processing unit 522 generates a list of applications capable of being used by this user, based on user management information managed by the user management unit 521, and supplies this list to the terminal apparatus 401, by controlling the communication unit 264 or the like.

In step S202, the transfer control unit 513 of the terminal apparatus 401 acquires this list, by controlling the communication unit 234 or the like. The display control unit 512 controls the output unit 232, and displays this acquired list on a monitor as an image. The user selects an application to be started based on this list.

In step S203, the user instruction reception processing unit 511 receives the selection instruction of an application to be started from the user, by controlling the input unit 231 or the like. The transfer control unit 513 supplies the selection instruction of an application to be started, received by this user instruction reception processing unit 511, to the server 202, by controlling the communication unit 234 or the like.

In step S223, the application selection processing unit 522 of the server 202 acquires this selection instruction, by controlling the communication unit 264 or the like. Next, in step S224, the image selection processing unit 523 generates a list of multi-viewpoint images of this user, based on the user management information managed by the user management unit 521, and supplies this list to the terminal apparatus 401, by controlling the communication unit 264 or the like.

In step S204, the transfer control unit 513 of the terminal apparatus 401 acquires this list, by controlling the communication unit 234 or the like. The display control unit 512 controls the output unit 232, and displays this acquired list on a monitor as an image. The user selects a multi-viewpoint image to be a processing target based on this list.

In step S205, the user instruction reception processing unit 511 receives the selection instruction of a processing target image from the user, by controlling the input unit 231 or the like. The transfer control unit 513 supplies the selection instruction of a processing target image received by this user instruction reception processing unit 511 to the server 202, by controlling the communication unit 234 or the like.

In step S225, the image selection processing unit 523 of the server 202 acquires this selection instruction, by controlling the communication unit 264 or the like. Next, in step S226, the lens selection processing unit 524 generates a list of lenses registered to this user, based on the user management information managed by the user management unit 521, and supplies this list to the terminal apparatus 401, by controlling the communication unit 264 or the like.

In step S206, the transfer control unit 513 of the terminal apparatus 401 acquires this list, by controlling the communication unit 234 or the like. The display control unit 512 controls the output unit 232, and displays this acquired list on a monitor as an image. The user selects a virtual lens to be simulated based on this list.

In step S207, the user instruction reception processing unit 511 receives the selection instruction of a lens from the user, by controlling the input unit 231 or the like. The transfer control unit 513 supplies the selection instruction of a lens received by this user instruction reception processing unit 511 to the server 202, by controlling the communication unit 234 or the like.

In step S227, the lens selection processing unit 524 of the server 202 acquires this selection instruction, by controlling the communication unit 264 or the like.

Further, in step S208, the user instruction reception processing unit 511 of the terminal apparatus 401 receives a user specification parameter, which is a parameter related to imaging for which a user specifies a value, such as an imaging condition, for example, by controlling the input unit 231 or the like. The transfer control unit 513 supplies the user specification parameter received by this user instruction reception processing unit 511 to the server 202, by controlling the communication unit 234 or the like.

In step S228, the user specification parameter setting processing unit 525 of the server 202 acquires this user specification parameter, by controlling the communication unit 264 or the like.

In step S229, the virtual lens processing unit 526 executes a virtual lens process, and generates a virtual captured image obtained by capturing a photographic subject of the multi-viewpoint image selected in step S225 by using the virtual lens selected in step S227, by using multi-viewpoint image data, and profile information including a parameter which reproduces an optical effect by a virtual optical system. At this time, the virtual lens processing unit 526 more accurately reproduces an optical influence by the virtual lens, by using the user specification parameter acquired in step S228. Further, at this time, the virtual lens processing unit 526 generates an interpolation image of the multi-viewpoint image, in accordance with the camera sequence information 342, the eye number information 343, and the depth data 332 included in the multi-viewpoint image file of the multi-viewpoint image selected in step S225. The details of the virtual lens process will be described below.

In step S230, the virtual lens processing unit 526 supplies data of the virtual captured image (virtual captured image) generated by the process of step S229 to the terminal apparatus 401, by controlling the communication unit 264 or the like.

In step S209, the transfer control unit 513 of the terminal apparatus 401 acquires the data of this virtual captured image. The display control unit 512 controls the output unit 232, and displays this acquired virtual captured image on a monitor. The user selects whether or not to retain this virtual captured image, based on this virtual captured image.

In step S210, the user instruction reception processing unit 511 receives the retention instruction of data of the virtual captured image from the user, by controlling the input unit 231 or the like. The transfer control unit 513 supplies the retention instruction of data of the virtual captured image received by this user instruction reception processing unit 511 to the server 202, by controlling the communication unit 234 or the like.

In step S231, the data management unit 527 of the server 202 acquires this retention instruction of data of the virtual image, by controlling the communication unit 264 or the like. In step S232, the data management unit 527 generates an application parameter for this lens simulation. The data management unit 527 stores and manages the data of the virtual captured image generated by the process of step S229, and this application parameter, and additionally performs registration to this user (updates the user management information of this user).

When the process of step S232 ends, the multi-viewpoint image use service provision process ends.

By executing such a multi-viewpoint image use service provision process, a user can more easily perform a simulation of a virtual lens (that is, the generation of a virtual captured image obtained by imaging using a virtual lens) by using a multi-viewpoint image. Further, since the generated virtual captured image data is registered to a user and managed in the server 202, a user can more easily use this virtual captured image data. Further, since this virtual captured image data is managed by associating with a multi-viewpoint image, an application parameter or the like used for the generation of this virtual captured image, a user can use this virtual captured image data, along with other related data. Namely, the multi-viewpoint image use service provision system 200 (the multi-viewpoint image use service platform 100) can improve convenience of a service using a multi-viewpoint image.

<Example of a Screen>

Figure 24:
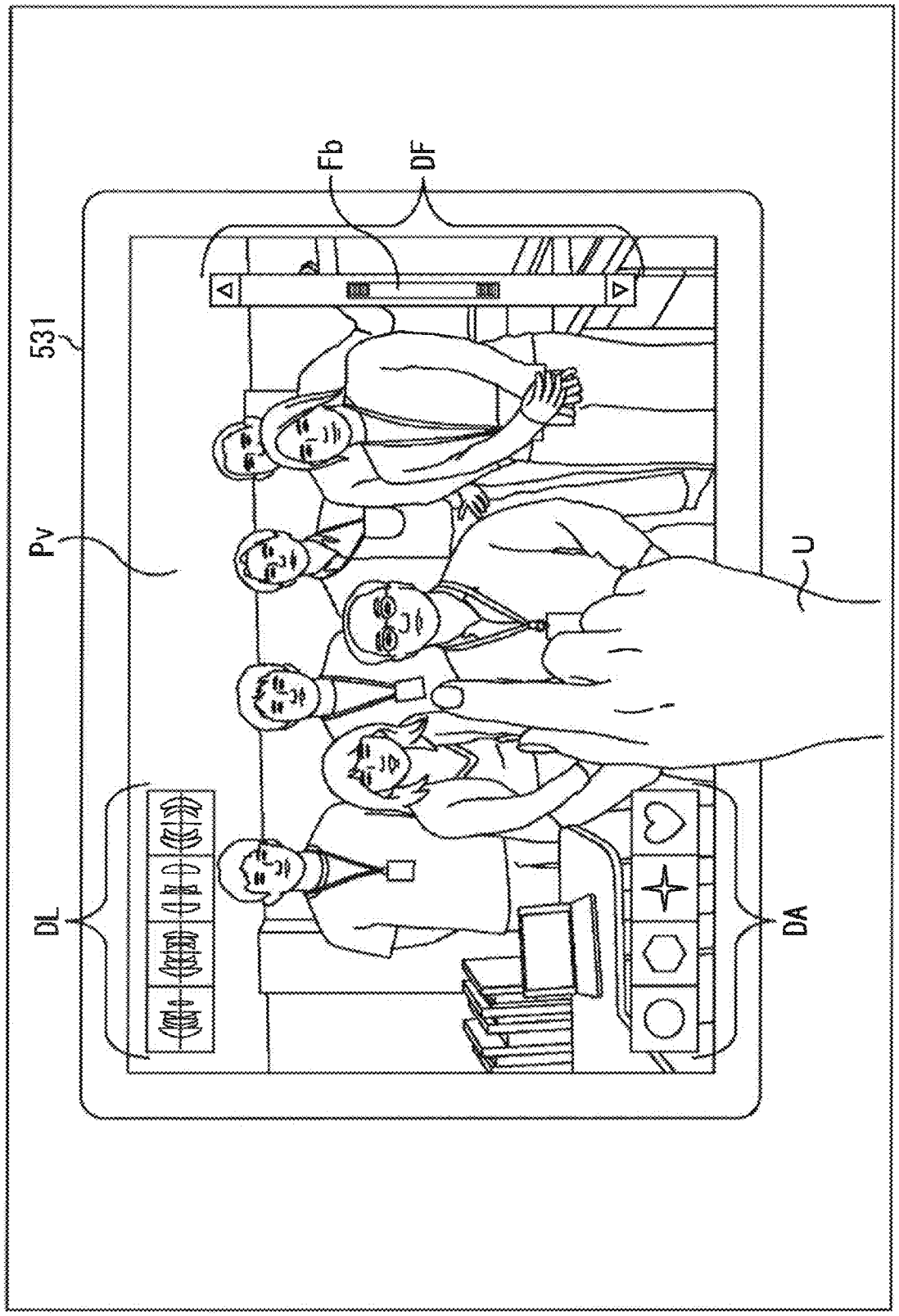
FIG. 24 is a figure which describes an example of the state of a virtual lens selection.

FIG. 24 is a schematic diagram which shows an example of a setting GUI displayed on the display unit 531.

On the screen of FIG. 24, a setting GUI is displayed, along with a preview image Pv. In the example of FIG. 24, a development parameter is constituted by design information of a lens, a diaphragm shape, and a focus position.

In this case, a lens unit selection unit DL, a diaphragm shape selection unit DA, and a focus position selection unit DF are displayed, as the setting GUI, by overlapping on the preview image Pv, on the display unit 531.

Figures representing lens units based on selection candidates of design information of a lens of the development parameter are displayed on the lens unit selection unit DL. Figures representing selection candidates of diaphragm shapes of the development parameter are displayed on the diaphragm shape selection unit DA. A setting bar Fb representing, by a position, selection candidates of the focus position is displayed on the focus position selection unit DF.

A user selects a selection candidate of the setting information of a lens which corresponds to this lens unit, by touch operating, by a finger U, the figure representing a desired lens unit displayed on the lens unit selection unit DL. Further, a user selects a selection candidate of this diaphragm shape, by touch operating, by a finger U, the figure representing a desired diaphragm shape displayed on the diaphragm shape selection unit DA.

Further, a user causes the setting bar Fb to move to a position which corresponds to a desired focus position, by touch operating, by a finger U, the setting bar Fb of the focus position selection unit DF, and moving the finger U in an up-down direction. In this way, a user can select a selection candidate of a desired focus position.

Note that, the setting bar Fb may move to this position, not only by moving by having a user touch operate, by a finger U, the setting bar Fb and afterwards move the finger U, but also by having a user touch operate a desired position on the focus position selection unit DF. Further, the selection candidates of a focus position may not be displayed, and the selection candidate of a focus position the closest to a photographic subject of a touch position of the finger U within the screen may be selected.

Further, in the example of FIG. 24, while the lens unit selection unit DL is arranged on the top left of the preview screen Pv, the diaphragm shape selection unit DA is arranged on the bottom left, and the focus position selection unit DF is arranged on the right side, the arrangement position is not limited to this.

While an illustration is omitted, the selection candidates of other development parameters, such as white balance or exposure correction, can also be displayed similar to the lens unit selection unit DL, the diaphragm shape selection unit DA, the focus position selection unit DF or the like.

Further, while the display unit 531 is integrated with a touch panel in the second embodiment, in the case where it is not integrated with a touch panel, a user causes a pointer displayed within the screen to be moved by an operation of a mouse or the like, which is not illustrated, and performs a selection operation which corresponds to a touch operation.

<Flow of the Virtual Lens Process>

Figure 25:
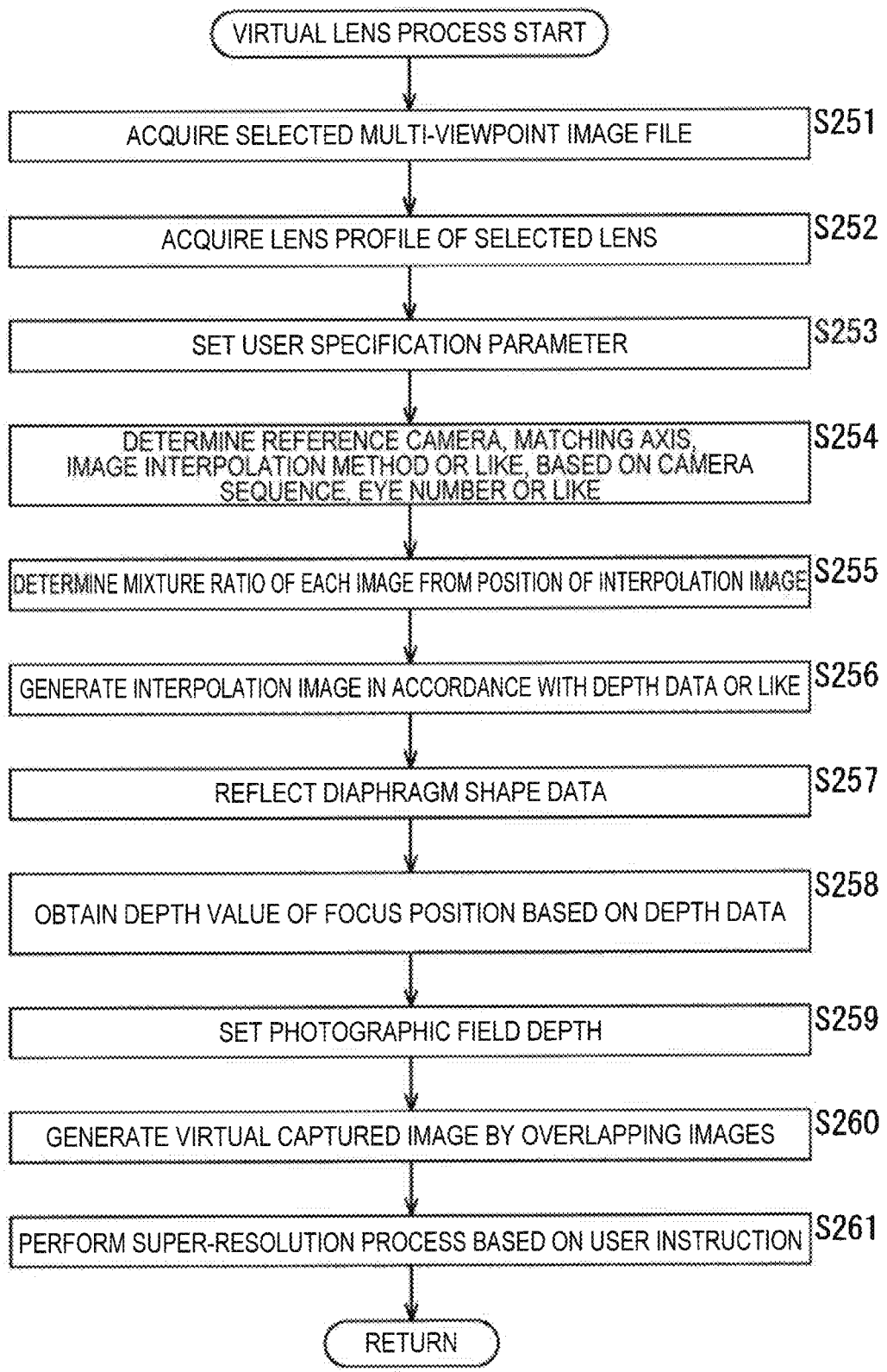
FIG. 25 is a flow chart which describes an example of the flow of a virtual lens process.

Next, an example of the detailed flow of the virtual lens process executed in step S229 of FIG. 23 will be described, by referring to the flow chart of FIG. 25.

When the virtual lens process is started, in step S251, the virtual lens processing unit 526 acquires the selected multi-viewpoint image file from the storage unit 263. In step S252, the virtual lens processing unit 526 acquires profile information of the selected lens from the storage unit 263.

Note that, the location where the multi-viewpoint image file and the profile information are stored and managed is arbitrary, and may be other than the storage unit 263. For example, the multi-viewpoint image file and the profile information may be stored and managed in an apparatus other than the server 202 such as the terminal apparatus 401 or the like. In this case, the virtual lens processing unit 526 acquires the multi-viewpoint image file and the profile information from the apparatus where these are stored, for example, by controlling the communication unit 264. Note that, the location where the multi-viewpoint image file is stored, and the location where the profile information is stored, may be mutually different.

The profile information is information unique to this virtual optical system, constituted by a parameter which reproduces an optical effect by a virtual optical system. Point Spread Function (PSF) data for each RGB, a diaphragm shape, interpolation number specification information or the like are included, for example, in the profile information.

Figure 26:
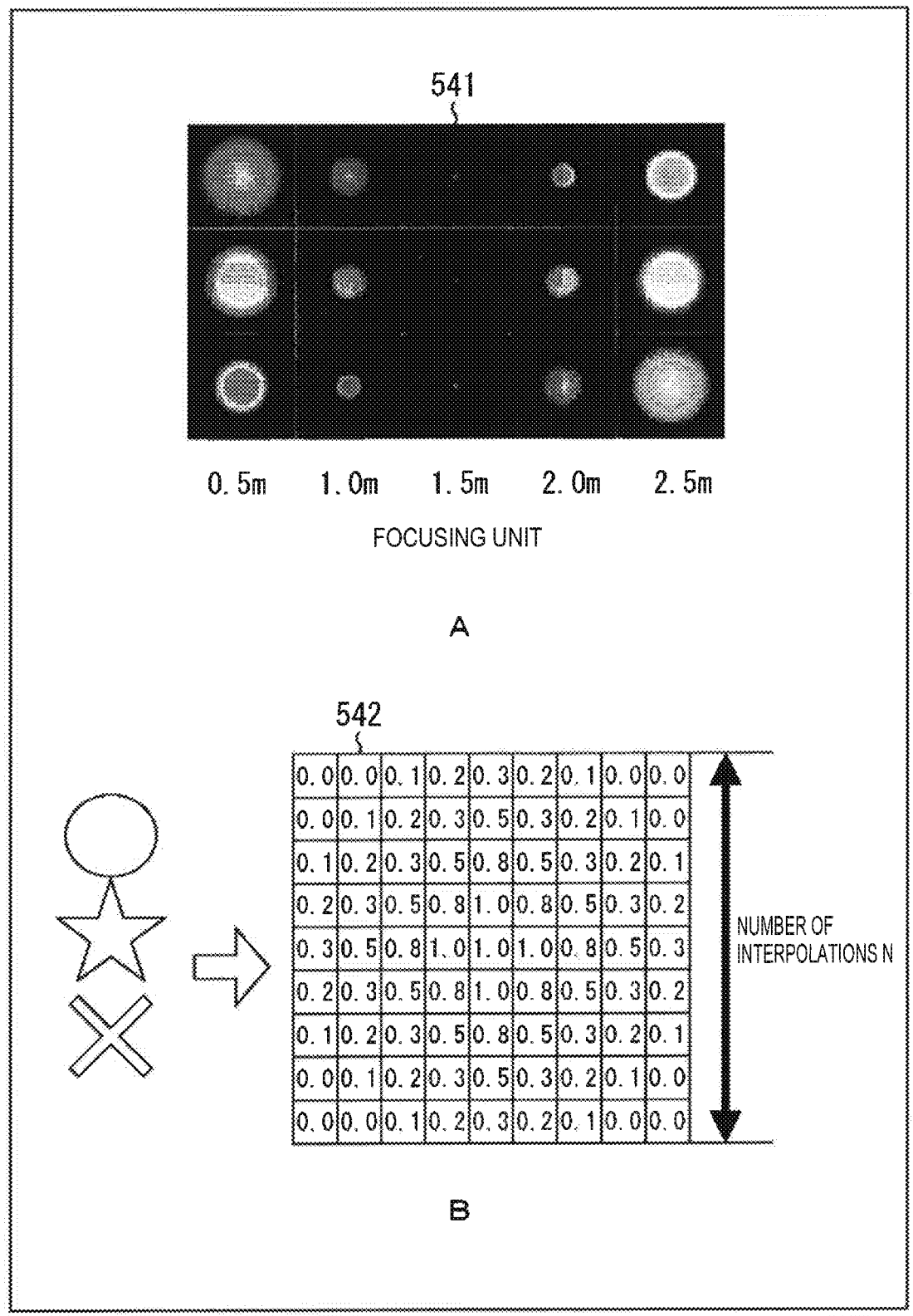
FIG. 26 is a figure which describes an example of a lens profile.

PSF data is also called a point spread function or a point distribution function, and is a function representing a response to a point light source of a virtual lens included in a virtual optical system. Namely, PSF data is data representing an influence of a virtual lens on an optical ray permeating a virtual lens. An example of this PSF data is shown in A of FIG. 26. In the case of this example, PSF data corresponding to a distance to a focusing unit (that is, a point light source) is shown for each color (each row).

The diaphragm shape is information showing a shape of a virtual diaphragm included in a virtual optical system. This diaphragm shape may be a shape of a diaphragm actually present, or may be an arbitrary shape, for example, which is not actually present, such as the round-type, the star-type, the X-type or the like shown on the left of B of FIG. 26. Note that, this diaphragm shape can be specified by an arbitrary method. For example, a predetermined shape may be specified by identification information (an ID) or the like. Further, for example, it may be expressed by a strength distribution 542, such as shown on the right of B of FIG. 26. The size (number of the strength) of this strength distribution depends on the number of interpolation images (number of interpolations) specified by interpolation number specification information. For example, when the number of interpolations is N, the diaphragm shape is expressed by the N×N strength distribution 542.

The interpolation number specification information is information which specifies the number of interpolation images to be generated at the time when creating a virtual captured image. Namely, in a virtual lens process, the virtual lens processing unit 526 generates interpolation images specified in number by this interpolation number specification information. A higher definition virtual captured image can be obtained as the number of interpolation images increases. Generally, the number of interpolation images increases as the virtual lens becomes a higher-grade (higher-efficiency) lens.

As described above, the lens profile information is constituted by information showing characteristics of a virtual lens. Note that, the contents of the lens profile information are arbitrary, and a part may be omitted, or information other than the above described information may be included, within each of the above described information. For example, physical design information of a lens used for simulating a virtual lens may be included in the lens profile information.

Figure 23:
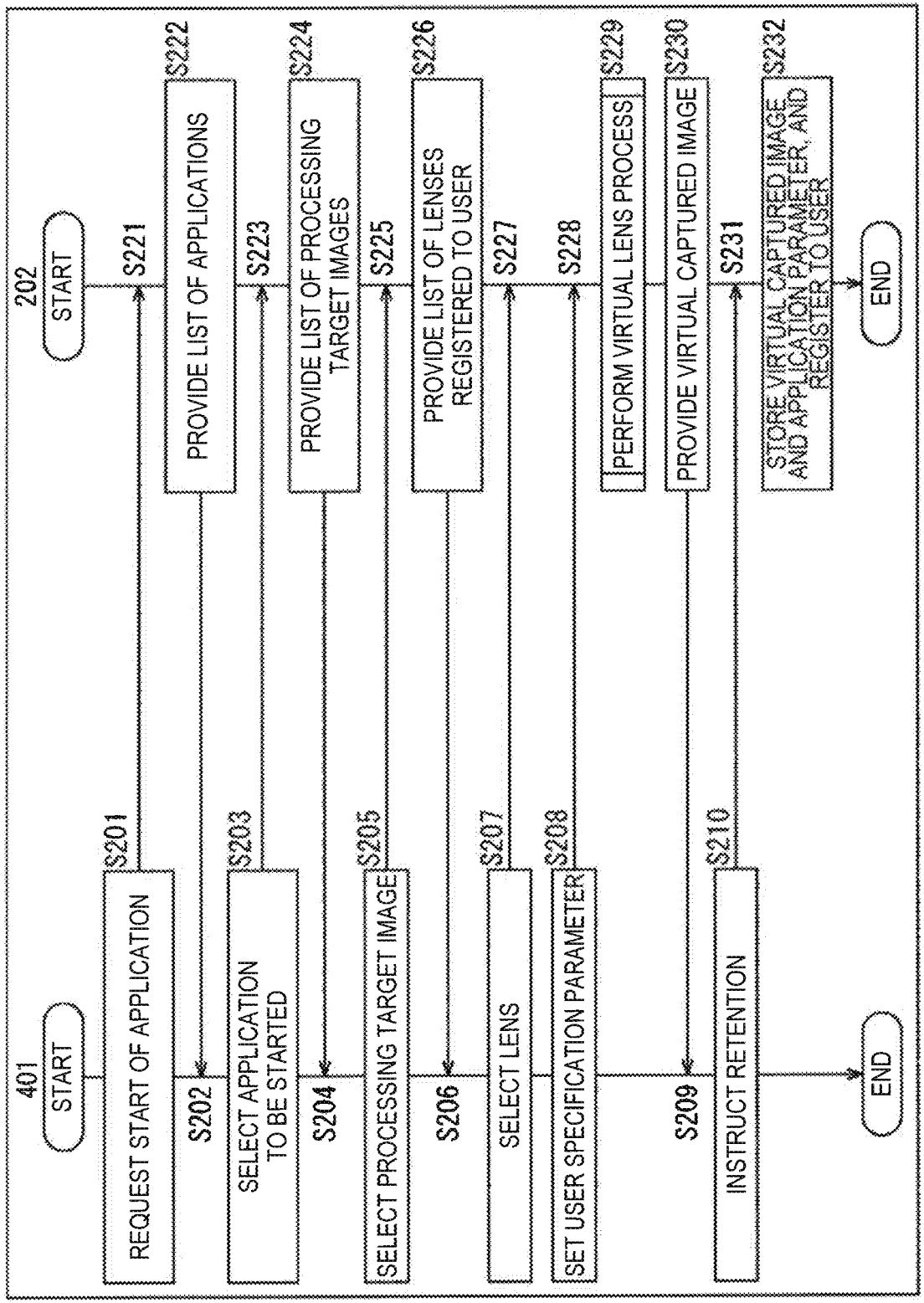
FIG. 23 is a flow chart which shows an additional another example of the flow of a multi-viewpoint image use service provision process.

Returning to FIG. 25, in step S253, the virtual lens processing unit 526 sets the user specification parameter acquired in step S228 of FIG. 23.

The user specification parameter is a parameter related to imaging for which a user specifies a value. The virtual lens processing unit 526 generates a virtual captured image, in accordance with this user specification parameter. For example, focal position specification information, photographic field depth specification information, super-resolution processing execution instruction information or the like are included in the user specification parameter.

The focal position specification information (focus position specification information) is information which specifies a region (or point) at which a photographic subject is positioned for focusing within a captured image. Namely, when a user specifies an arbitrary position of a captured image as a focal position, a virtual captured image is generated so that a focus is performed at (a distance of) a photographic subject of this focal position.

Further, the photographic field depth specification information is information which specifies a photographic field depth (a size of a diaphragm). In addition, the super-resolution processing execution instruction information is information which includes an instruction related to a super-resolution process, such as the extent of the process to be performed in some range, in the case where whether or not to perform, or performing, a super-resolution process, at the time when overlapping each of the captured images of a multi-viewpoint image for generating a virtual captured image. The super-resolution process at the time of an overlap of each of the captured images of a multi-viewpoint image is performed based on this super-resolution processing execution instruction information.

It is needless to say that the contents of the user specification parameter are arbitrary, and a part may be omitted, or information other than the above described information may be included, within each of the above described information.

In step S254, the virtual lens processing unit 526 determines a reference camera (an image of a viewpoint serving as a reference), a matching axis, an image interpolation method or the like, based on camera sequence information, eye number information or the like included in the metadata associated with multi-viewpoint image data of a processing target.

In step S255, the virtual lens processing unit 526 determines a mixture ratio of each of the images (that is, each of the overlapping images) used for an interpolation of an image, in accordance with a position of the interpolation image to be generated.

In step S256, the virtual lens processing unit 526 generates an interpolation image, in accordance with depth data, or various types of parameters set such as described above. For example, the virtual lens processing unit 526 generates an interpolation image, by overlapping images specified by the interpolation method determined in step S254 in accordance with depth data, by using the image of a viewpoint serving as a reference determined in step S254, and the matching axis determined in step S254. The virtual lens processing unit 526 generates interpolation images specified in number by the interpolation number specification information of the profile information.

In step S257, the virtual lens processing unit 526 reflects diaphragm shape data of the profile information, for each of the interpolation images.

In step S258, the virtual lens processing unit 526 obtains a depth value of a focal position (focus position) specified by a user, based on the depth data. Namely, the virtual lens processing unit 526 obtains a depth value of a photographic subject (a distance to a photographic subject) of a position (coordinates) specified in the focal position specification information (focus position specification information) included in the user specification parameter acquired in step S228, for example, of a virtual captured image to be generated.

In step S259, the virtual lens processing unit 526 sets a photographic field depth specified by the photographic field depth specification information of the user specification parameter.

In step S260, the virtual lens processing unit 526 generates a virtual captured image by overlapping multi-viewpoint images or interpolation images by repeating stereo matching or the like. At this time, the virtual lens processing unit 526 causes PSF data, corresponding to the depth data (a depth value of the photographic subject), of a virtual lens to be reflected. Further, the virtual lens processing unit 526 generates a virtual captured image, so as to focus on the depth value (distance) obtained in step S258. In addition, the virtual lens processing unit 526 can cause a virtual diaphragm shape to be reflected in the virtual captured image, by reflecting diaphragm shape data for each of the interpolation images in step S257. Further, the virtual lens processing unit 526 generates a virtual captured image, so that it becomes the photographic field depth set in step S259.

In step S261, the virtual lens processing unit 526 performs a super-resolution process for the virtual captured image, in accordance with the super-resolution processing execution instruction information of the user specification parameter. For example, in the case where it is instructed so as not to perform a super-resolution process by the super-resolution processing execution instruction information, the virtual lens processing unit 526 does not perform a super-resolution process. Further, for example, in the case where it is instructed so as to perform a super-resolution process by the super-resolution processing execution instruction information, the virtual lens processing unit 526 performs a super-resolution process.

Note that, the super-resolution process may be performed for an entire virtual captured image, or may be performed for only the portion of a depth value of a prescribed range which includes a depth value of a focal position. The obtained effect (an improvement of the image quality) will be small, even if performing a super-resolution process for the portion of a photographic subject which is not focused. Therefore, by performing a super-resolution process for only the portion where such a focal position and depth value match or are approximately the same, the load of the process can be reduced, while suppressing a reduction of the image quality. Note that, the portion for which such a super-resolution process is to be performed can be instructed by the super-resolution process execution instruction information.

When the process of step S261 ends, the virtual lens process ends, and the process returns to FIG. 23.

By performing a virtual lens process such as described above, a user can more easily obtain a virtual captured image.

Note that, the virtual lens process described above is not limited to the server 202, and may be implemented in an arbitrary apparatus. For example, the CPU 221 of the terminal apparatus 401 may have the virtual lens processing unit 526 or the like, and a virtual lens process may be performed in the terminal apparatus 401. In this case, the virtual lens process can be executed basically the same as in the above described example. Note that, information stored (managed) in the server 202, which is information used for a virtual lens process, such as a multi-viewpoint image file or profile information of a virtual lens, may be suitably transferred to the terminal apparatus 401 as necessary.

5. Fifth Embodiment

<Product Sales Support>

In the present embodiment, the state of the execution of an application which performs the product sales support described in the first embodiment will be described, as another example of this application. Note that, in the present embodiment, an application which supports a sale of furniture, such as described in the first embodiment, will be described, as an example of a product sales support.

<Multi-Viewpoint Image Use Service Provision System>

Figure 27:
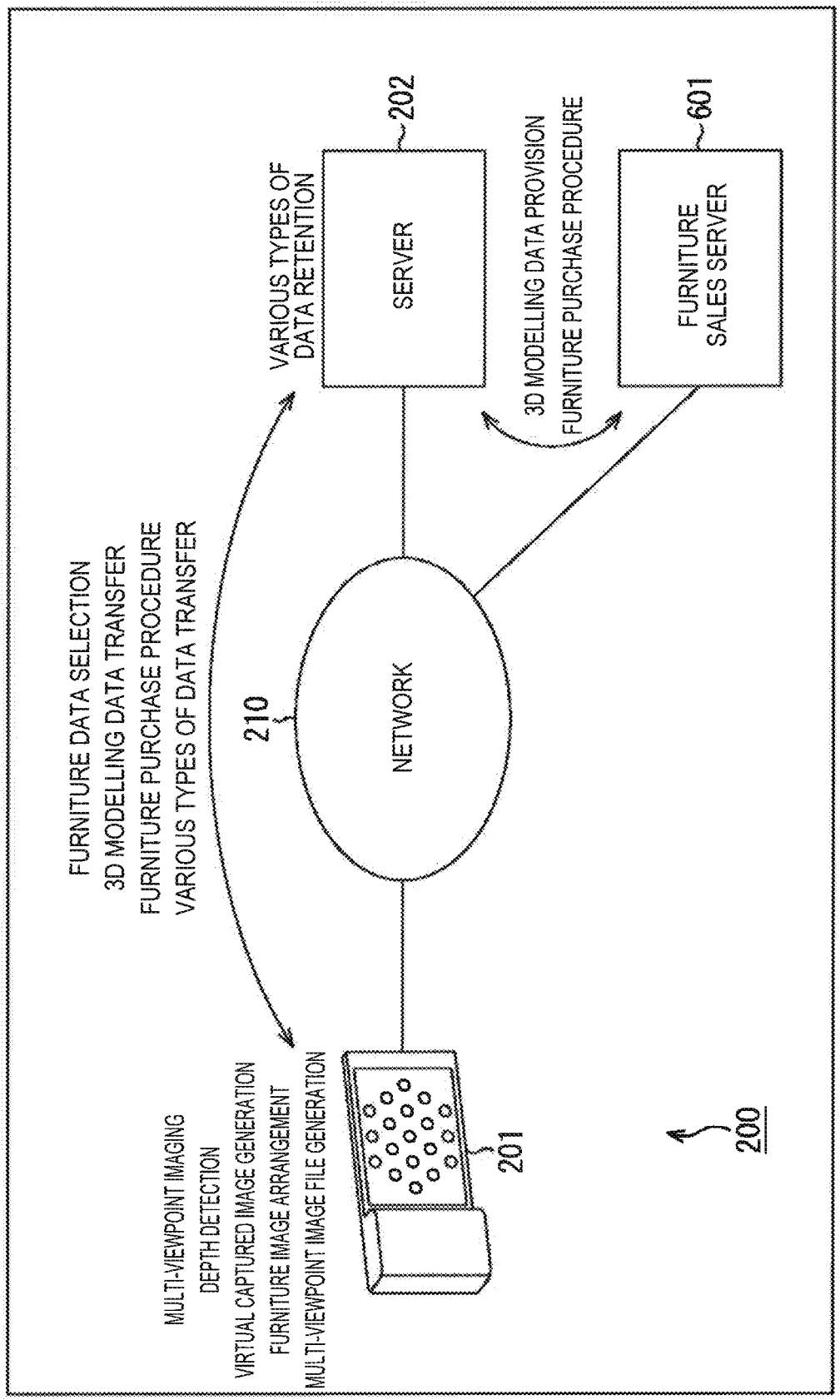
FIG. 27 is a figure which shows an additional another configuration example of a multi-viewpoint image use service provision system.

FIG. 27 is a figure which shows a main configuration example of a multi-viewpoint image use service provision system. The multi-viewpoint image use service provision system 200 shown in FIG. 27 is an example of a system to which the present disclosure is applied, and is a system in which the server 202 provides a service using a multi-viewpoint image to the terminal apparatus 201 connected via the network 210. Namely, the multi-viewpoint image use service provision system 200 is an example of a configuration which implements the multi-viewpoint image use service platform 100.

FIG. 27 shows an example of a configuration related to the provision of a service related to a product sales support (furniture sales support), from among the services provided by the multi-viewpoint image use service platform 100. In FIG. 27, the multi-viewpoint image use service provision system 200 has the terminal apparatus 201, the server 202, and a furniture sales server 601 connected to the network 210.

The terminal apparatus 201 performs multi-viewpoint imaging which obtains a multi-viewpoint image by capturing a photographic subject. Further, the terminal apparatus 201 detects a depth of the multi-viewpoint image obtained by multi-viewpoint imaging. In addition, the terminal apparatus 201 generates 1 virtual captured image, by using multi-viewpoint imaging. Further, the terminal apparatus 201 performs a process related to an arrangement of a furniture image to a virtual captured image. In addition, the terminal apparatus 201 makes into a file multi-viewpoint image data or the like, and generates a multi-viewpoint image file.

Further, the terminal apparatus 201 and the server 202 connected by wires or wirelessly to the network 210 perform processes, such as a selection of furniture data, a transfer of 3-dimensional modelling data (3D modelling data), a furniture purchase procedure, and a transfer of various types of data, by mutually performing communication.

The server 202 performs a process such as a retention of various types of data supplied from the terminal apparatus 201.

The server 202 and the furniture sales server 601 connected by wires or wirelessly to the network 210 perform processes such as a provision of 3-dimensional modelling data (3D modelling data), or a furniture purchase procedure, by mutually performing communication.

The furniture sales server 601 is a server which performs a process related to a sale of furniture or a support of a sale. Specifically, the furniture sales server 601 performs a settlement of a furniture sale, a provision of a furniture image or this 3D modelling data used for a sales support or the like, such as described above.

The furniture sales server 601 basically has a configuration the same as the application provision server 402. Therefore, the configuration shown in FIG. 15 can also be applied to the furniture sales server 601.

<Furniture Sales Support>

Next, a support method of a sale in a furniture sales support service provided by the multi-viewpoint image use service provision system 200 such as described above will be more specifically described. A product sales support service provided by the multi-viewpoint image use service platform 100 to which the present disclosure is applied is a service which causes a user to assume a state at the time when using a product, by causing an object, which is an image of a product of a sales support target, to be virtually arranged on a desired background image. The furniture sales support service provided by the multi-viewpoint image use service provision system 200 of FIG. 27 adopts an image of furniture (a furniture image) of a sales support target as an example of an object, and adopts a virtual captured image as an example of a background image. That is, this furniture sales support service is a service which causes a user to assume a state at the time when arranging this furniture in a room or the like, by arranging the furniture image on the virtual captured image. Note that, at this time, the furniture sales support service not only simply combines the furniture image with the virtual captured image, but also sets a size and orientation of the furniture image in accordance with the arrangement position of this furniture image, by using depth data of the virtual captured image. In this way, an accurate state can be assumed by a user.

Figure 28:
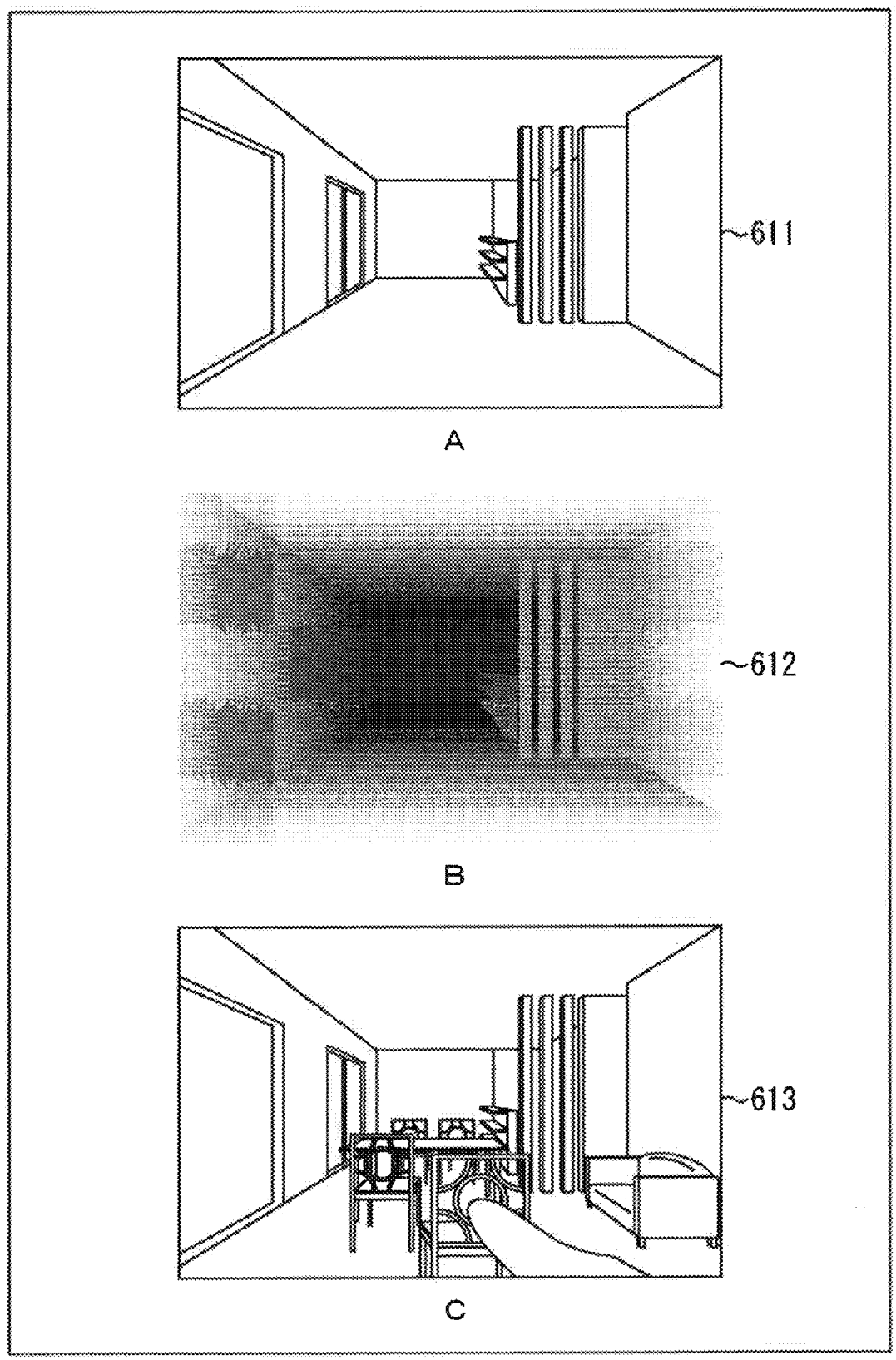
FIG. 28 is a figure which describes an example of the state of a layout of furniture.

More specifically, the terminal apparatus 201 generates a virtual captured image 611 such as shown in A of FIG. 28, from a multi-viewpoint image obtained by multi-viewpoint imaging. For example, a user multi-viewpoint captures a room in which purchased furniture is wanted to be installed, and generates the virtual captured image 611 of this room. Further, the terminal apparatus 201 generates depth data (a depth map) 612 of the virtual captured image 611 such as shown in B of FIG. 28, from a multi-viewpoint image obtained by multi-viewpoint imaging.

Also, the terminal apparatus 201 acquires, from the server 202, an image of furniture (a furniture image) to be purchased by the furniture sales server 601 and this 3D modelling data, and arranges this furniture image on the virtual captured image 611 (an image of the room), such as a combined image 613 shown in C of FIG. 28. The arrangement of a furniture image is performed by using the depth data 612, and a size and orientation of the furniture image are suitably set, in accordance with a distance of a depth direction of this arrangement position or the like.

Further, the context relationship with other photographic subjects within an image (an overlapping condition) is accurately reproduced, in accordance with the distance of the depth direction of the arrangement position, such as arranging a Christmas tree such as in the image shown in B of FIG. 29, behind a person of the image shown in A of FIG. 29.

In addition, the arrangement position can be specified by a user, and the user can cause the furniture image to be freely moved within the room displayed as this virtual captured image 611. Further, the furniture image to be arranged can be arbitrarily selected by the user from among furniture images provided to the user by the furniture sales server 601 (server 202). For example, the user can change the color or size of the furniture. Further, for example, the type of furniture can be changed, such as changing from a chair to a sofa.

The number of furniture to be combined is arbitrary, and may be a single number, or may be a plurality. Further, the terminal apparatus 201 can cause image data of a combined image showing an arrangement result of a furniture image to be record in the server 202 or the like. Therefore, a user can easily reconfirm an arrangement result of a furniture image afterwards.

By executing an application of a furniture sales support, for example, in the terminal apparatus 201, a user can receive such a furniture sales support. That is, a user can virtually arrange virtual furniture (a furniture image) at a planned location (a room or the like) where furniture is to be arranged, prior to purchasing the furniture (a simulation of a furniture arrangement can be performed). Therefore, a user can remove uncertainty related to a furniture purchase, prior to a furniture purchase, and a buying intention can be increased. That is, by providing a furniture sales support service such as described above, the multi-viewpoint image use service provision system 200 can support a sale of furniture.

<Function Blocks>

Figure 30:
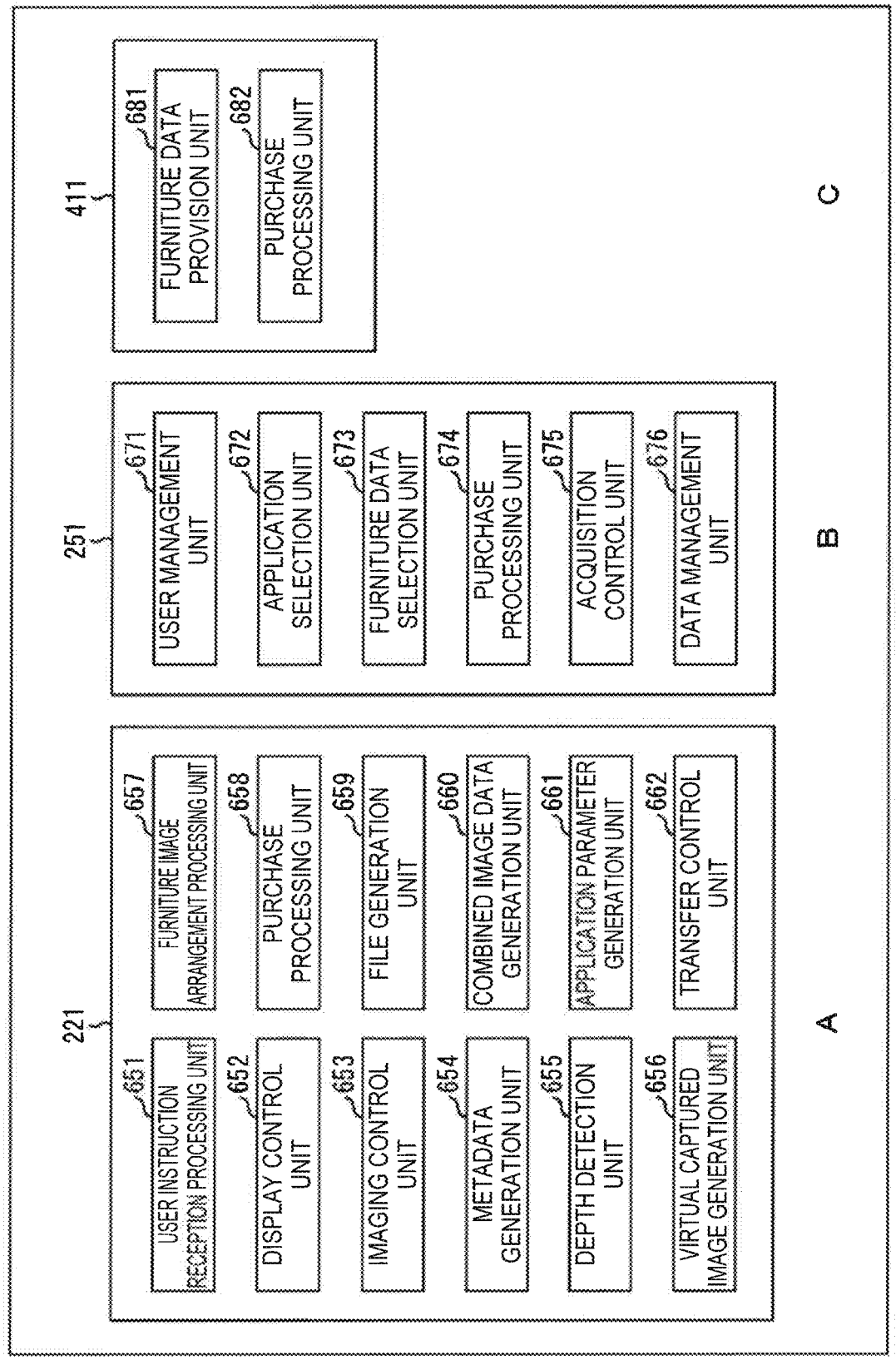
FIG. 30 is a function block diagram which describes the functions of the terminal apparatus, the server, and a furniture sales server.

The terminal apparatus 201 has functions shown as the function blocks in A of FIG. 30, by having the CPU 221 execute a prescribed program. As shown in A of FIG. 30, the CPU 221 has function blocks such as a user instruction reception processing unit 651, a display control unit 652, an imaging control unit 653, a metadata generation unit 654, a depth detection unit 655, a virtual captured image generation unit 656, a furniture image arrangement processing unit 657, a purchase processing unit 658, a file generation unit 659, a combined image data generation unit 660, an application parameter generation unit 661, and a transfer control unit 662.

The user instruction reception processing unit 651 performs a process related to a reception of a user instruction, by controlling the input unit 231 or the like. The display control unit 652 performs a process related to a display control such as displaying an image such as a GUI or guidance on a monitor, by controlling the output unit 232 or the like. The imaging control unit 653 performs a process related to a control of multi-viewpoint imaging. The metadata generation unit 654 performs a process related to a generation of metadata of a multi-viewpoint image obtained by multi-viewpoint imaging. The depth detection unit 655 performs a process related to a detection of a depth of a multi-viewpoint image. The virtual captured image generation unit 656 performs a process related to a generation of a virtual captured image. The furniture image arrangement processing unit 657 performs a process related to an arrangement of a furniture image to a virtual captured image. The purchase processing unit 658 performs a process related to a purchase of furniture. The file generation unit 659 performs a process related to a generation of a multi-viewpoint image file. The combined image data generation unit 660 performs a process related to a generation of combined image data in which a furniture image is combined with a virtual captured image. The application parameter generation unit 661 performs a process related to a generation of an application parameter for this application. The transfer control unit 662 performs a process related to a transfer of various types of information, by controlling the communication unit 234 or the like.

Further, the server 202 has functions shown as the function blocks in B of FIG. 30, by having the CPU 251 execute a prescribed program. As shown in B of FIG. 30, the CPU 251 has function blocks such as a user management unit 671, an application selection unit 672, a furniture data selection unit 673, a purchase processing unit 674, an acquisition control unit 675, and a data management unit 676.

The user management unit 521 performs a process related to management of a user for whom a multi-viewpoint image use service is to be provided, similar to the user management unit 291. The application selection unit 672 performs a process related to a selection of an application to be executed, by performing communication with the terminal apparatus 201 or the like by controlling the communication unit 264. The furniture data selection unit 673 performs communication with the terminal apparatus 201 by controlling the communication unit 264 or the like, and performs a process related to a selection of furniture (a furniture image) to be arranged in a virtual captured image. The purchase processing unit 674 performs communication with the terminal apparatus 201 or the furniture sales server 601, by controlling the communication unit 264 or the like, and performs a process related to a purchase of furniture. The acquisition control unit 675 performs a process related to an acquisition of various types of data transferred from the terminal apparatus 201 or the like, by controlling the communication unit 264 or the like. The data management unit 676 performs a process related to management of data such as a multi-viewpoint image file, or management of an application and data related to this application or the like, similar to the data management unit 295.

In addition, the furniture sales server 601 has functions shown as the function blocks in C of FIG. 30, by having the CPU 411 execute a prescribed program. As shown in C of FIG. 30, the CPU 411 has function blocks such as a furniture data provision unit 681 and a purchase processing unit 682.

The furniture data provision unit 681 performs a process related to a provision of data to be used for a sales support of furniture, such as a furniture image or this 3D modelling data, for example. The purchase processing unit 682 performs communication with the server 202, by controlling the communication unit 424 or the like, and performs a process related to a procedure of a furniture purchase.

<Flow of the Multi-Viewpoint Image Use Service Provision Process>

Figure 31:
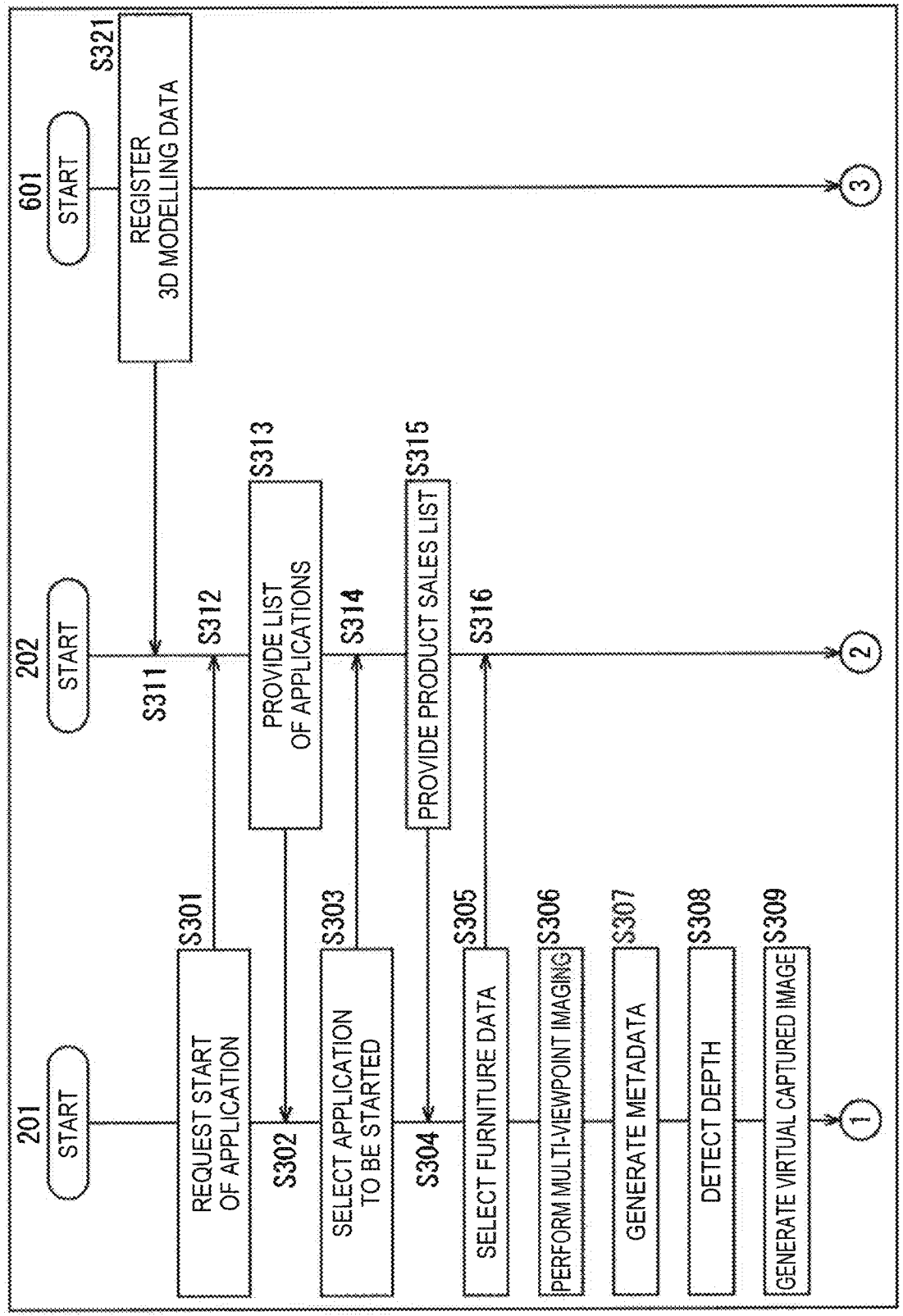
FIG. 31 is a flow chart which shows an additional another example of the flow of a multi-viewpoint image use service provision process.

The terminal apparatus 201, the server 202, and the furniture sales server 601 of the multi-viewpoint image use service provision system of a configuration such as described above perform a provision of a service which uses a multi-viewpoint image, or in the case of the present embodiment, a provision of a service of a product sales support, by executing a multi-viewpoint image use service provision process. An example of the flow of the multi-viewpoint image use service provision process executed by these apparatuses will be described, by referring to the flow charts of FIG. 31 through to FIG. 33.

In step S321, the furniture data provision unit 681 of the furniture sales server 601 supplies image data of a furniture image and this 3D modelling data to the server 202, and performs registration. In step S311, the data management unit 676 of the server 202 acquires these data, and performs registration and management as furniture for which a sale is to be supported.

In step S301, the user instruction reception processing unit 651 of the terminal apparatus 201 receives an instruction which requests a start of an application from a user, by controlling the input unit 231 or the like. The transfer control unit 662 supplies the start request of an application received by this user instruction reception processing unit 651 to the server 202, by controlling the communication unit 234 or the like.

In step S312, the application selection unit 672 of the server 202 acquires this request, by controlling the communication unit 264 or the like. In response to this request, in step S313, the application selection unit 672 generates a list of applications capable of being used by this user, based on user management information managed by the user management unit 671, and supplies this list to the terminal apparatus 201, by controlling the communication unit 264 or the like.

In step S302, the transfer control unit 662 of the terminal apparatus 201 acquires this list, by controlling the communication unit 234 or the like. The display control unit 652 controls the output unit 232, and displays this acquired list on a monitor as an image. The user selects an application to be started based on this list.

In step S303, the user instruction reception processing unit 651 receives the selection instruction of an application to be started from the user, by controlling the input unit 231 or the like. The transfer control unit 662 supplies the selection instruction of an application to be started, received by this user instruction reception processing unit 651, to the server 202, by controlling the communication unit 234 or the like.

In step S314, the application selection unit 672 of the server 202 acquires this selection instruction, by controlling the communication unit 264 or the like. Next, in step S315, the furniture data selection unit 673 generates a product sales list which is a list of furniture capable of being sold to this user, based on the user management information managed by the user management unit 521, and supplies this list to the terminal apparatus 401, by controlling the communication unit 264 or the like.

In step S304, the transfer control unit 662 of the terminal apparatus 401 acquires this list, by controlling the communication unit 234 or the like. The display control unit 652 controls the output unit 232, and displays this acquired list on a monitor as an image. The user selects furniture (furniture data) to be a processing target based on this list.

In step S305, the user instruction reception processing unit 651 receives the selection instruction of furniture data from the user, by controlling the input unit 231 or the like. The transfer control unit 662 supplies the selection instruction of furniture data received by this user instruction reception processing unit 651 to the server 202, by controlling the communication unit 234 or the like.

In step S316, the furniture data selection unit 673 of the server 202 acquires this selection instruction, by controlling the communication unit 264 or the like.

Incidentally, in step S306, the imaging control unit 653 of the terminal apparatus 201 supplying the selection instruction of furniture data performs multi-viewpoint imaging by controlling the imaging unit 236. In step S307, the metadata generation unit 654 generates metadata associated with the multi-viewpoint image generated in step S306. While the contents of the metadata are arbitrary, for example, it may include information such as the camera sequence information 342 or the eye number information 343 such as described with reference to FIG. 11.

In step S308, the depth detection unit 655 detects a depth value for the multi-viewpoint image, and generates depth data (a depth map). For example, the depth detection unit 655 generates depth data by performing the depth detection process described with reference to FIG. 14 or the like. In step S309, the virtual captured image generation unit 656 generates a virtual captured image by using the multi-viewpoint image.

Figure 32:
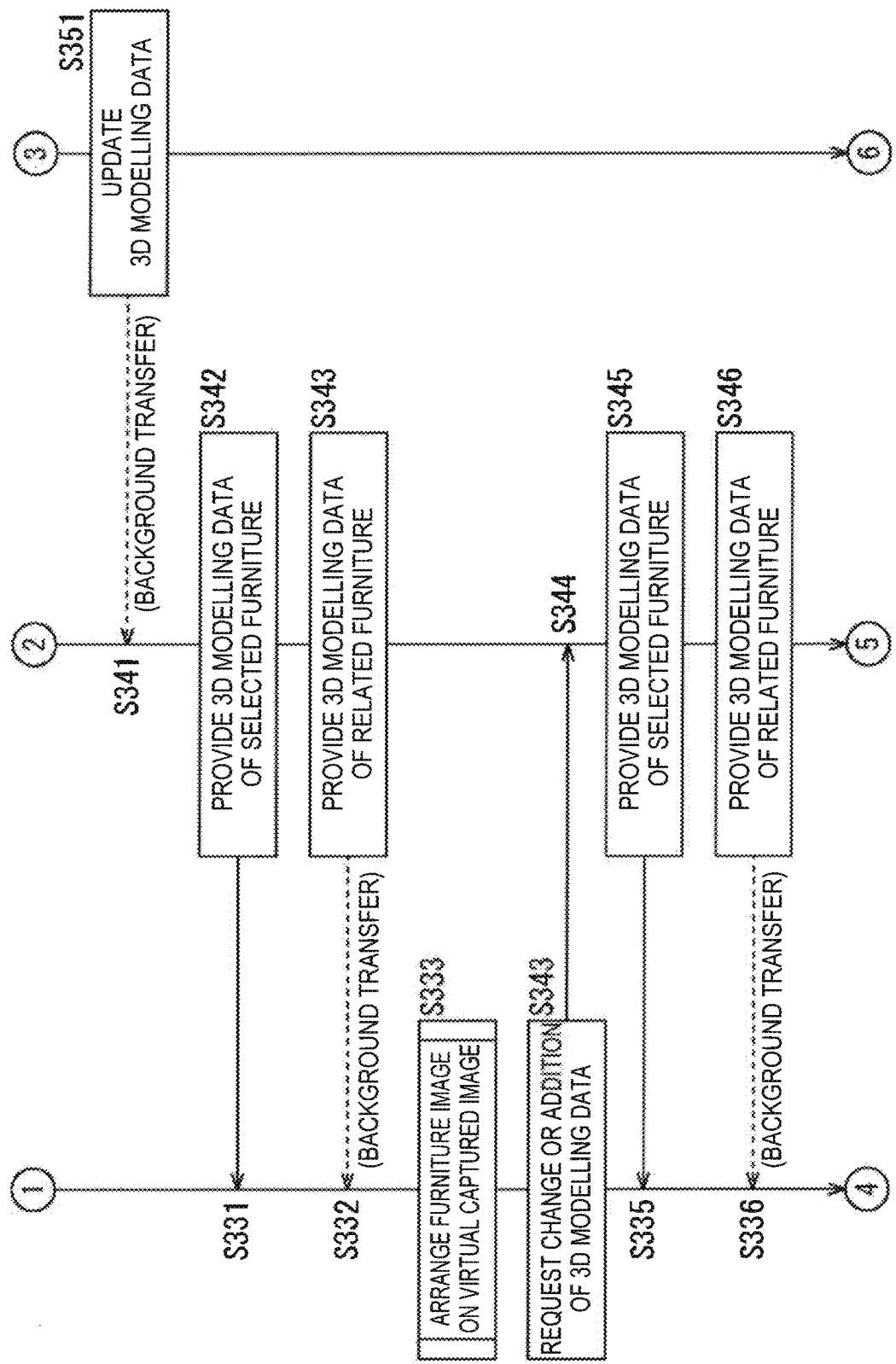
FIG. 32 is a flow chart, continuing from FIG. 31, which shows an additional another example of the flow of a multi-viewpoint image use service provision process.

Advancing to FIG. 32, in step S351, in the case where image data of the furniture image or this 3D modelling data has been updated, the furniture data provision unit 681 of the furniture sales server 601 controls the communication unit 424 or the like, and suitably supplies these data to the server 202 by a background transfer. In step S341, the data management unit 676 of the server 202 acquires these data, and updates the registered information.

In step S342, the furniture data selection unit 673 of the server 202 provides the image data of the selected furniture and 3D modelling data to the terminal apparatus 201, by controlling the communication unit 264 or the like, based on the selection instruction of the furniture data acquired in step S316. In step S331, the transfer control unit 662 of the terminal apparatus 201 acquires this image data of the furniture and 3D modelling data, by controlling the communication unit 234.

Further, in step S343, the furniture data selection unit 673 of the server 202 selects furniture having a high relevance with furniture of the furniture data provided in step S342 (for example, furniture having a different color, furniture having a different size or the like), and suitably supplies this furniture image, 3D modelling data or the like to the terminal apparatus 201 by a background transfer, by controlling the communication unit 264 or the like. In step S332, the transfer control unit 662 of the terminal apparatus 201 acquires this image data of the furniture and 3D modelling data, by controlling the communication unit 234.

By causing such data of related furniture to be transferred to the terminal apparatus 201 by a background process without a request from the terminal apparatus 201, the user of the terminal apparatus 201 can replace a furniture image to be arranged on a virtual captured image with an image of other furniture having a high relevance, without a time lag of communication related to data acquisition.

In step S333, the furniture image arrangement processing unit 657 of the terminal apparatus 201 executes a furniture image arrangement process, and arranges the furniture image, which is an example of an object, on the virtual captured image, which is an example of a background image. At this time, the furniture image arrangement processing unit 657 performs an arrangement by suitably setting a size and orientation of the furniture image, in accordance with a position arrangement of the furniture image. In the case where a change or addition of the furniture image or 3D modelling data may become necessary, as a result of the furniture image arrangement process, in step S334, the furniture image arrangement processing unit 657 requests a change or addition of the furniture image or 3D modelling data to the server 202, by controlling the communication unit 234 or the like.

In step S344, when this request is acquired, by controlling the communication unit 264 or the like, in response to this request, in step S345, the furniture data selection unit 673 of the server 202 provides the selected image data of the furniture and 3D modelling data to the terminal apparatus 201, by controlling the communication unit 264 or the like. In step S335, the transfer control unit 662 of the terminal apparatus 201 acquires this image data of the furniture and 3D modelling data, by controlling the communication unit 234.

Further, in step S345, the furniture data selection unit 673 of the server 202 selects furniture having a high relevance with furniture of the furniture data provided in step S344 (for example, furniture having a different color, furniture having a different size or the like), and suitably supplies this furniture image, 3D modelling data or the like to the terminal apparatus 201 by a background transfer, by controlling the communication unit 264 or the like. In step S336, the transfer control unit 662 of the terminal apparatus 201 acquires this image data of the furniture and 3D modelling data, by controlling the communication unit 234.

By causing such data of related furniture to be transferred to the terminal apparatus 201 by a background process without a request from the terminal apparatus 201, the user of the terminal apparatus 201 can replace a furniture image to be arranged on a virtual captured image with an image of other furniture having a high relevance, without a time lag of communication related to data acquisition.

Figure 33:
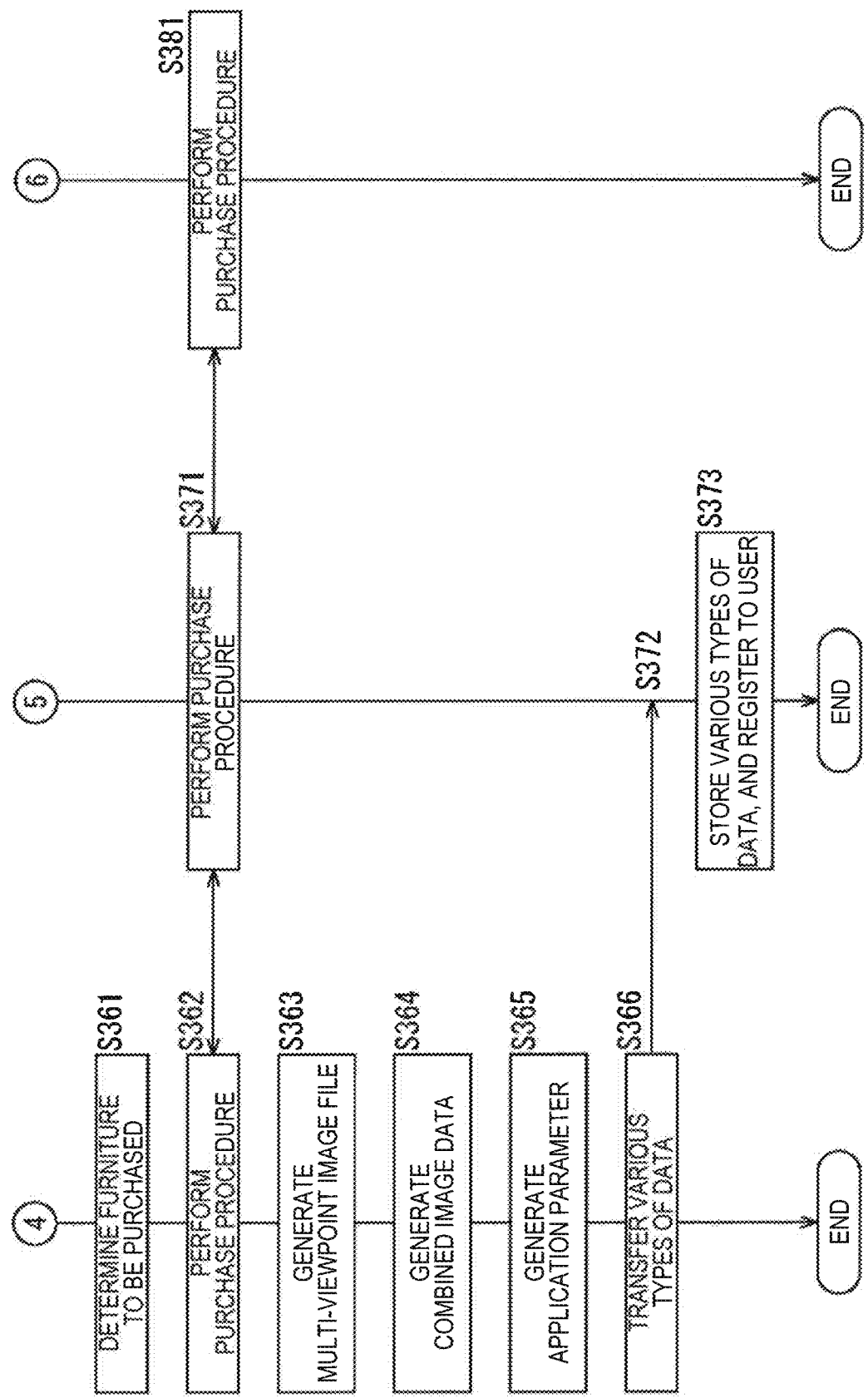
FIG. 33 is a flow chart, continuing from FIG. 32, which shows an additional another example of the flow of a multi-viewpoint image use service provision process.

Advancing to FIG. 33, the user of the terminal apparatus 201 determines whether or not to purchase furniture, by a simulation of a furniture arrangement such as described above. In step S361, the user instruction reception processing unit 651 receives a user instruction, by controlling the input unit 231 or the like, and determines furniture to be purchased in accordance with this instruction.

In step S362, the purchase processing unit 658 of the terminal apparatus 201 performs communication with the server 202, by controlling the communication unit 234 or the like, and performs a process related to a purchase, such as a settlement process. In step S371, the purchase processing unit 674 of the server 202 performs communication with the terminal apparatus 201 or the furniture sales server 601, by controlling the communication unit 264 or the like, and performs a process related to a purchase, such as a settlement process. In step S381, the purchase processing unit 682 of the furniture sales server 601 performs communication with the terminal apparatus 201 or the server 202, by controlling the communication unit 424 or the like, and performs a process related to a purchase, such as a settlement process.

In step S363, the file generation unit 659 of the terminal apparatus 201 generates a multi-viewpoint image file. Note that, the format form of this multi-viewpoint image file is arbitrary. For example, in the case where the multi-viewpoint image is a still image, it may be made into a file in an EXIF file format. Further, for example, in the case where the multi-viewpoint image is a moving image, it may be made into a file in an MP4 file format. It is needless to say that it may be made into a file in a format form other than these.

In step S364, the combined image data generation unit 660 generates data of a combined image (combined image data) in which the furniture image is combined with the virtual captured image by performing an arrangement according to an instruction of the user.

In step S365, in this furniture sales support, the application parameter generation unit 661 has some value set for some parameter, has some operation (instruction) performed by a user, and generates history information showing what process has been performed or the like as an application parameter of an application which performs this product sales support.

In step S366, the transfer control unit 662 supplies various types of data (a multi-viewpoint image file (multi-viewpoint image data, depth data, metadata or the like), combined image data, an application parameter or the like), generated such as described above, to the server 202, by controlling the communication unit 234.

In step S372, the acquisition control unit 675 of the server 202 controls the communication unit 264, and acquires this various types of data.

In step S373, the data management unit 676 stores the various types of data acquired in step S372, and performs registration to the user (reflects in the user management information).

When the process of step S373 ends, the multi-viewpoint image use service provision process ends.

By executing such a multi-viewpoint image use service provision process, a user can more easily perform a simulation of a lens of a furniture arrangement by using a multi-viewpoint image. Further, since the generated combined image data is registered to a user and managed in the server 202, a user can easily reconfirm an arrangement result of furniture. Namely, the multi-viewpoint image use service provision system 200 (the multi-viewpoint image use service platform 100) can improve convenience of a service using a multi-viewpoint image.

<Flow of the Furniture Image Arrangement Process>

Figure 34:
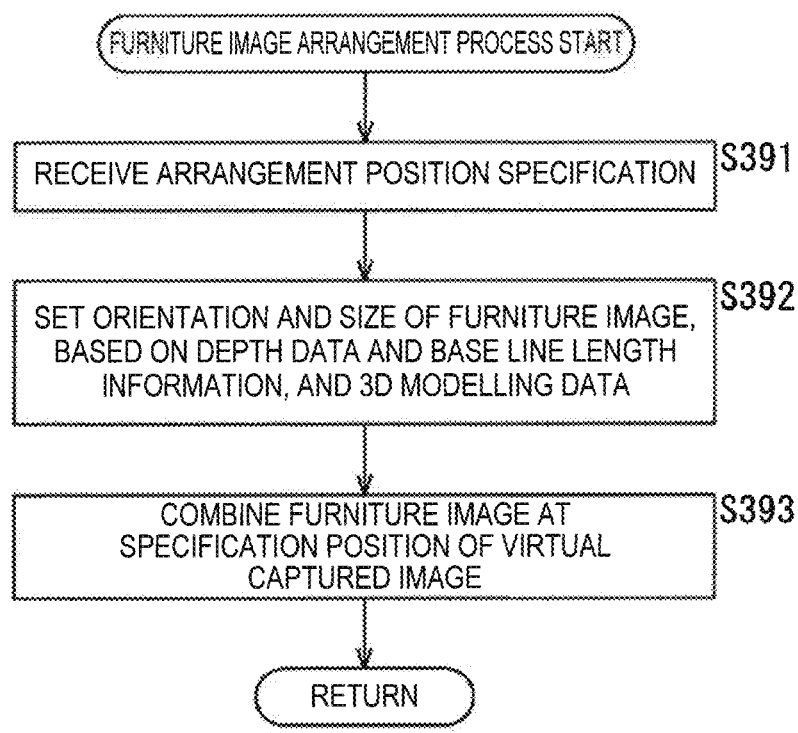
FIG. 34 is a flow chart which describes an example of the flow of a furniture image arrangement process.

Next, an example of the detailed flow of the furniture image arrangement process executed in step S333 of FIG. 32 will be described, by referring to the flow chart of FIG. 34.

When the furniture image arrangement process is started, in step S391, the furniture image arrangement processing unit 657 receives an arrangement position specification from a user or the like, for example, by controlling the input unit 231 or the like.

In step S392, the furniture image arrangement processing unit 657 sets an orientation and size of a furniture image at the position where the furniture image is to be arranged on a virtual captured image, based on depth data and base line length information of the virtual captured image (multi-viewpoint image), which is an example of a background image, and 3D modelling data of the furniture image, which is an example of an object.

In step S393, the furniture image arrangement processing unit 657 performs a combination by arranging the furniture image, with the orientation and size set in step S392, at the specified position (for example, by the arrangement position specification received in step S391), for the virtual captured image.

When the process of step S393 ends, the furniture image arrangement process ends, and the process returns to FIG. 32.

By performing a furniture image arrangement process such as described above, a user can more easily perform a simulation of a furniture arrangement.

Note that, the above described furniture image arrangement process is not limited to the terminal apparatus 201, and may be executed in an arbitrary apparatus. For example, the furniture image arrangement process may be performed in the server 202. In this case, the CPU 251 of the server 202 may suitably have necessary function blocks, such as the furniture image arrangement processing unit 657. Also in this case, the furniture image arrangement process can be executed basically the same as in the above described example. Note that, information obtained in the terminal apparatus 201, which is information used for a furniture image arrangement process such as a multi-viewpoint image file, may be suitably transferred to the server 202 as necessary, under a control of the transfer control unit 662.

Similarly, it is needless to say that this furniture image arrangement process may be performed, for example, in an apparatus other than the terminal apparatus 201 or the server 202 (for example, the terminal apparatus 401) or the like, which performs multi-viewpoint imaging. In this case, the CPU of this apparatus may suitably have necessary function blocks such as the furniture image arrangement processing unit 657. Also in this case, the furniture image arrangement process can be executed basically the same as in the above described example. Note that, information obtained in the terminal apparatus 201 or the server 202, which is information used for a furniture image arrangement process such as a multi-viewpoint image file or furniture data, may be suitably transferred to this apparatus as necessary, under a control of the transfer control unit 662, the furniture data selection unit 673 or the like.

<Furniture Arrangement Update Process>

Figure 35:
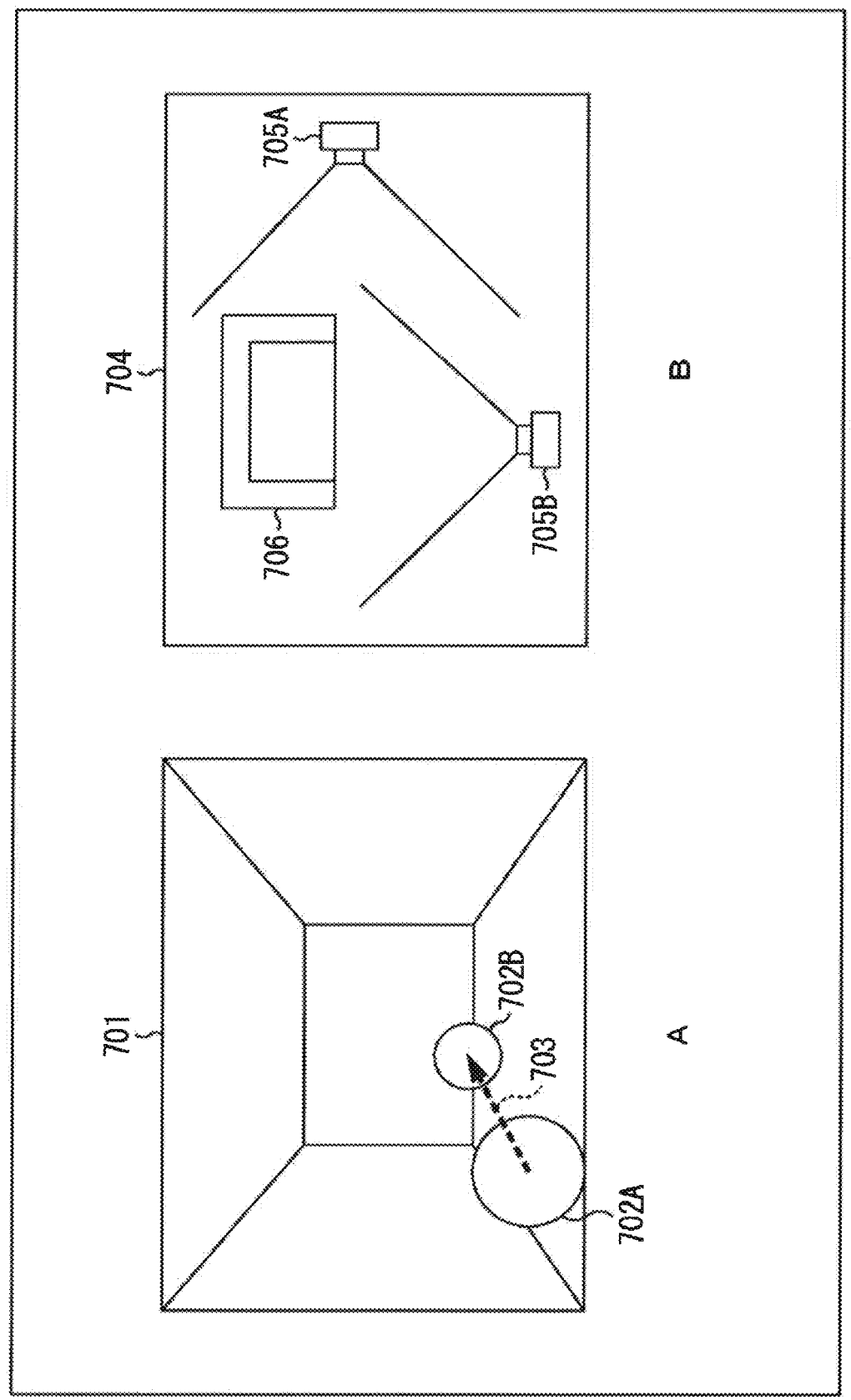
FIG. 35 is a figure which describes an example of the state of a furniture arrangement update.

In an application of a product sales support such as described above, when an arrangement position specification has been updated, a combination position of the furniture image may be changed, in accordance with this update. For example, as shown in A of FIG. 35, in the case where an arrangement position specification of a furniture image 702A arranged on a virtual captured image 701 is updated such as a dotted-line arrow 703, the furniture image 702A has a size and orientation reset in accordance with the arrangement position after this update (a furniture image 702B).

Further, in the case where the viewpoint of a virtual captured image is updated, the position of the arranged furniture image may not be updated, or this furniture image may be rearranged with a size and orientation appropriate for the original position, in the virtual captured image of this new viewpoint. For example, as shown in B of FIG. 35, in a virtual captured image in which a room 704 is captured from a viewpoint 705A, a sofa 706 is arranged such as in B of FIG. 35. Afterwards, in the case where the viewpoint of the virtual captured image is moved to a viewpoint 705B, the sofa 706 is also expected to be reflected in the virtual captured image after this viewpoint update. Therefore, in the virtual captured image after the viewpoint update, the sofa 706 is arranged at this position. At this time, the orientation and size of the sofa 706 are appropriately adjusted for the virtual captured image after the viewpoint update.

Figure 36:
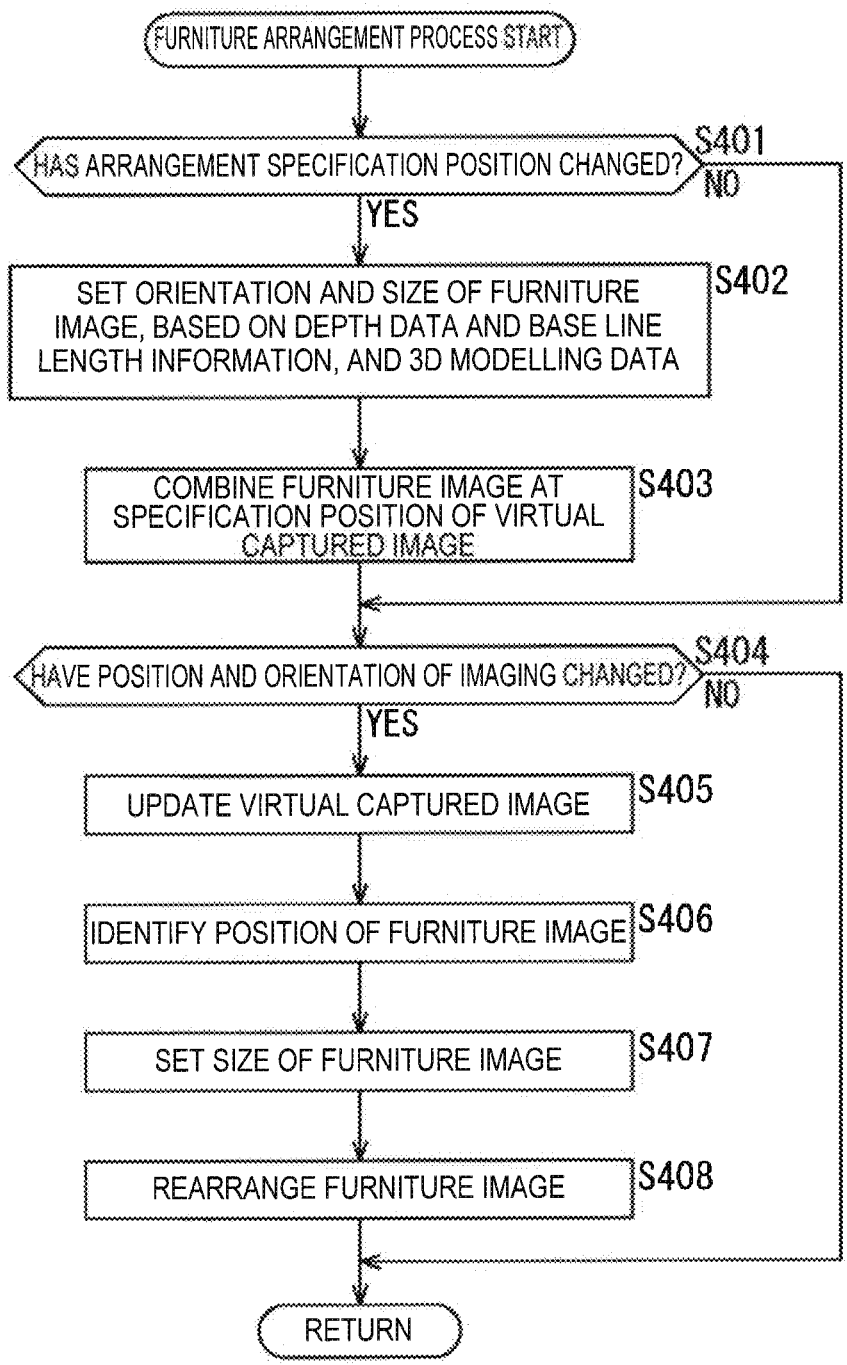
FIG. 36 is a flow chart which describes an example of the flow of a furniture arrangement update process.

In order to implement such a function, the furniture image arrangement processing unit 657 executes a furniture arrangement update process. An example of the flow of this furniture arrangement update process will be described by referring to the flow chart of FIG. 36. When the furniture arrangement update process is started, in step S401, the furniture image arrangement processing unit 657 decides whether or not the arrangement specification position has been changed. For example, in the case where a new arrangement position specification has been received from a user via the input unit 231, and it is decided that the arrangement position specification has been changed, the process proceeds to step S402.

In step S402, the furniture image arrangement processing unit 657 sets an orientation and size of a furniture image, based on depth data and base line length information, and 3D modelling data. In step S403, the furniture image arrangement processing unit 657 combines the furniture image at the specification position after the update of the virtual captured image.

When the process of step S403 ends, the process proceeds to step S404. Further, in step S401, in the case where it is decided that the arrangement specification position has not changed, the process proceeds to step S404.

In step S404, the furniture image arrangement processing unit 657 decides whether or not the position and orientation of imaging have changed. For example, 26 in the case where it is decided that the position and orientation of imaging have changed, such as in the case where new multi-viewpoint imaging is performed and a new virtual captured image is generated, or in the case where multi-viewpoint imaging of a moving image is performed while moving, the process proceeds to step S405.

In step S405, the furniture image arrangement processing unit 657 updates the virtual captured image, by recreating a captured image virtually by a new multi-viewpoint image. In step S406, the furniture image arrangement processing unit 657 identifies a position of the furniture image arranged prior to the virtual captured image update, in this updated virtual captured image. In step S407, the furniture image arrangement processing unit 657 sets a size and orientation of the furniture image at the position identified in step S406, of the updated virtual captured image. In step S408, the furniture image arrangement processing unit 657 rearranges the furniture image, with the size and orientation set in step S407, at the position identified in step S406, of the updated virtual captured image.

When the process of step S408 ends, the furniture arrangement update process ends. Further, in step S404, in the case where it is decided that the position and orientation of imaging has not been changed, the furniture arrangement update process ends.

The furniture image is arranged on the virtual captured image, and afterwards this furniture arrangement update process is repeatedly executed, up until a simulation of a furniture arrangement is ended. In this way, a furniture image can be usually combined with a virtual captured image with an appropriate size and orientation at an appropriate position.

<Grounding Decision>

Further, in the arrangement of a furniture image, it may be decided whether or not the furniture image is grounded to the floor or the like of a virtual captured image. For example, in a virtual captured image 711 shown in A of FIG. 37, a light stand 712 has an arrangement specification at a position such as shown in A of FIG. 37. In this case, the light stand 712 is separated from a floor 714, such as shown by a dotted-line double arrow 713, is arranged in a state of floating in the air, and is not a realistic arrangement position, and so is inappropriate and undesirable as a simulation of a furniture arrangement.

Figure 37:
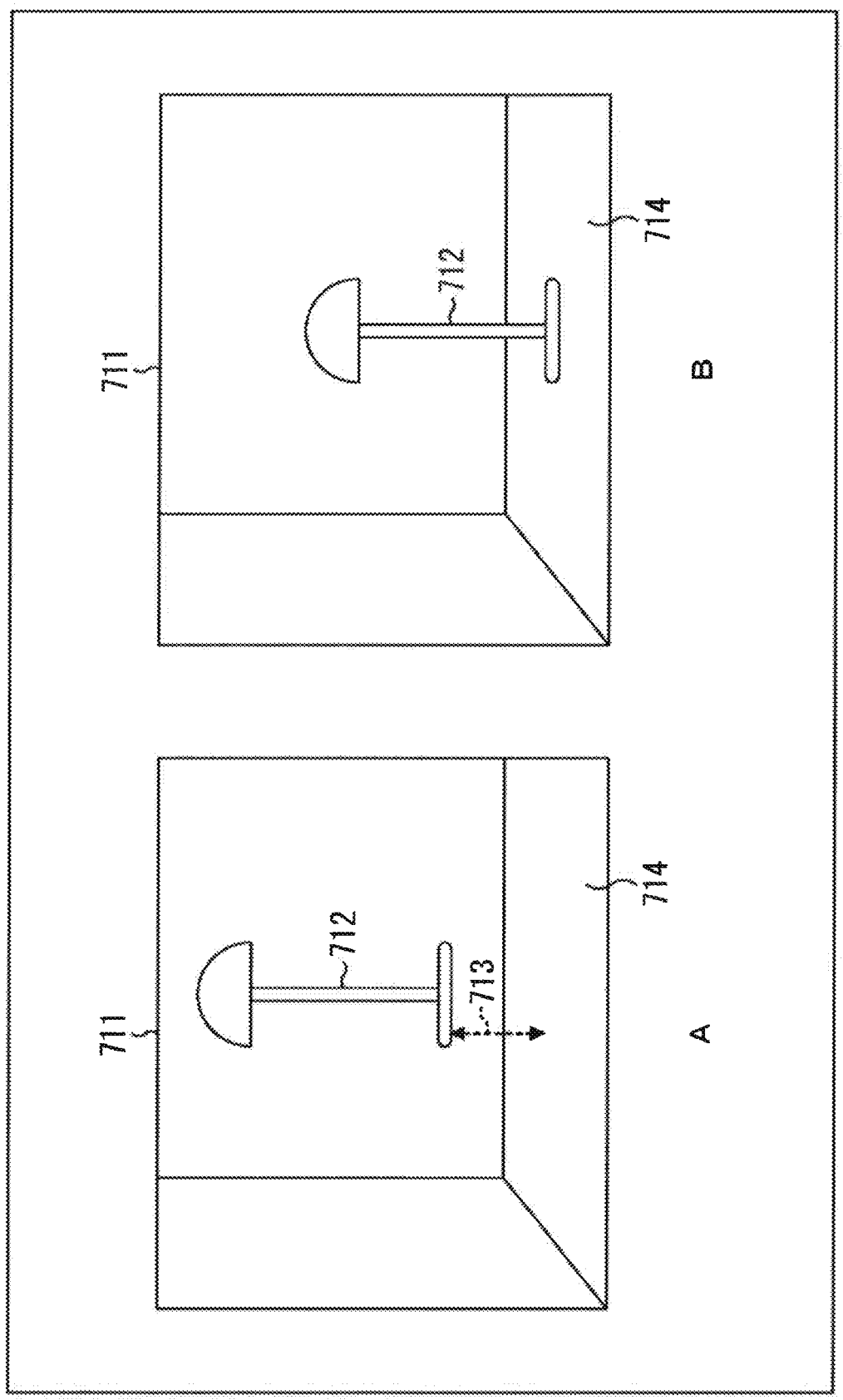
FIG. 37 is a figure which describes an example of the state of a grounding decision.

Accordingly, in such a case, as shown in B of FIG. 37, the arrangement position of the light stand 712 may be changed, so that the light stand 712 is grounded to the floor 714 of the virtual captured image 711. Further, the position may not be changed, and a warning may be given to a user or the like.

Figure 38:
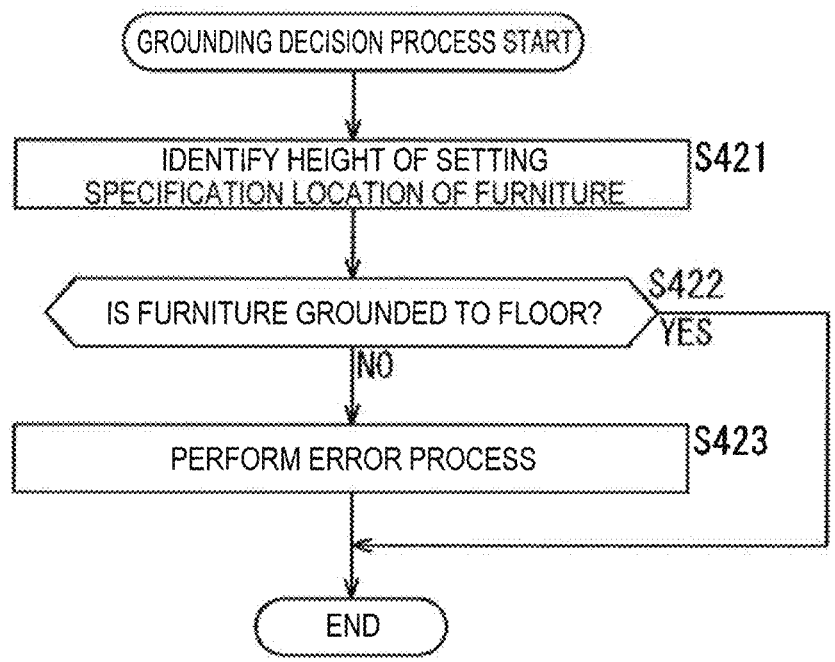
FIG. 38 is a flow chart which describes an example of the flow of a grounding decision process.

In order to implement such a function, the furniture image arrangement processing unit 657 executes a grounding decision process. An example of the flow of this grounding decision process will be described, by referring to the flow chart of FIG. 38.

When the grounding decision process is started, in step S421, the furniture image arrangement processing unit 657 identifies a height from a location where an arrangement of the furniture is possible, such as the floor, of an arrangement specification position of the furniture. In step S422, the furniture image arrangement processing unit 657 decides whether or not this furniture image is grounded to a location where an arrangement of the furniture is possible, such as the floor, from 3D modelling data of the arranged furniture image. In the case where it is decided that it is not grounded, the process proceeds to step S423.

In step S423, the furniture image arrangement processing unit 657 performs an error process. The contents of this error process are arbitrary, and any process may be performed. For example, as described above, the furniture image may be moved so that the furniture image is grounded, or the arrangement position of the furniture image may not be updated, and a warning may be given to a user or the like.

When the process of step S423 ends, the grounding decision process ends. Further, in step S422, in the case where it is decided that the furniture image is grounded to a location where an arrangement of the furniture is possible, such as the floor, the grounding decision process ends.

This grounding decision process is executed, each time an arrangement of furniture is performed. In this way, a user can perform a simulation of a furniture arrangement which is more realistic.

Further, not only an adjustment of a height direction of an arrangement position of an object such as described above, but also an arrangement position of a horizontal direction of an object (a left-right direction, or a front-behind (depth) direction) may be suitably adjusted, based on the contents of a background image (the position of an object included in a background image or the like).

For example, a background image (a virtual captured image) will be assumed which is an image of a room with a large pillar nearest to the front, a space behind this pillar, and a wall behind this space. In front of this wall (within the room), the portion of the pillar is set as a region not capable of an arrangement of an object (a furniture image), and the space between the rear of the pillar and the wall is set as a region capable of an arrangement of an object (a furniture image). Also, in the case where an instruction is performed so that a furniture image is arranged in a region not capable of this arrangement, this furniture image is arranged by moving to the space between the rear of the pillar and the wall, which is a region capable of the arrangement. At this time, the furniture image is combined with the virtual captured image, by not only having a size and orientation set in accordance with the arrangement position after this movement, but also by performing processing so as to have a part or all of the furniture image hidden at the rear of the pillar as necessary.

By such a setting, a user can perform a simulation of a furniture arrangement which is more realistic.

<Length Measurement>

Figure 39:
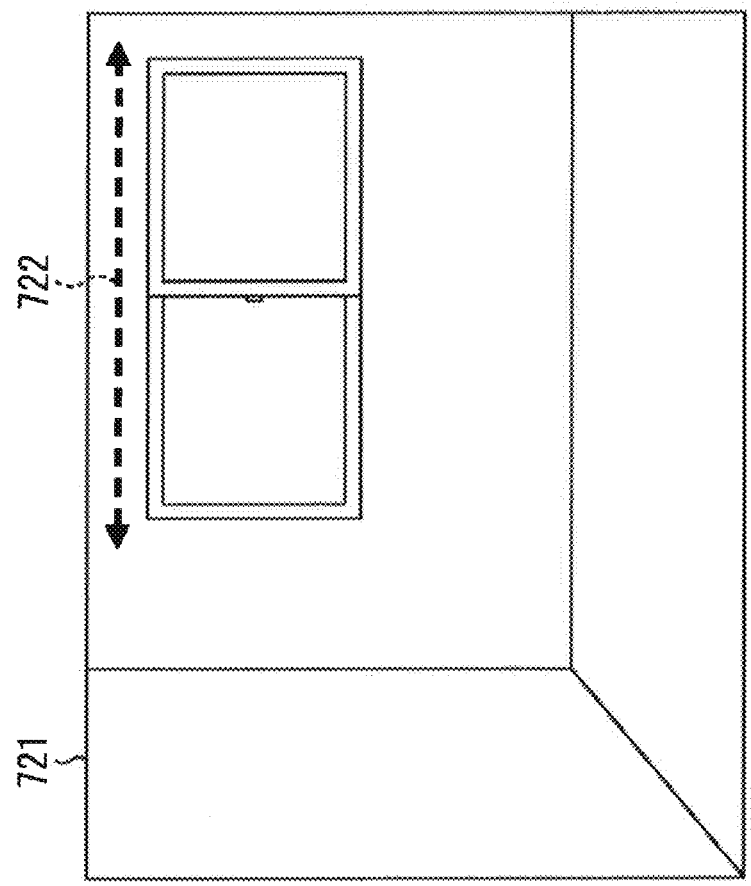
FIG. 39 is a figure which describes an example of the state of a measurement.

Further, a length on a virtual captured image can be measured. For example, as shown in FIG. 39, in a virtual captured image 721, a horizontal width of a window, such as a dotted-line double arrow 722, is measured. Within the virtual captured image 721, the size of the window will change according to the distance of the depth direction of this window or the like. Accordingly, the measured length may be corrected in accordance with this distance of the depth direction, by using depth data, base line length information or the like of a multi-viewpoint image.

Figure 40:
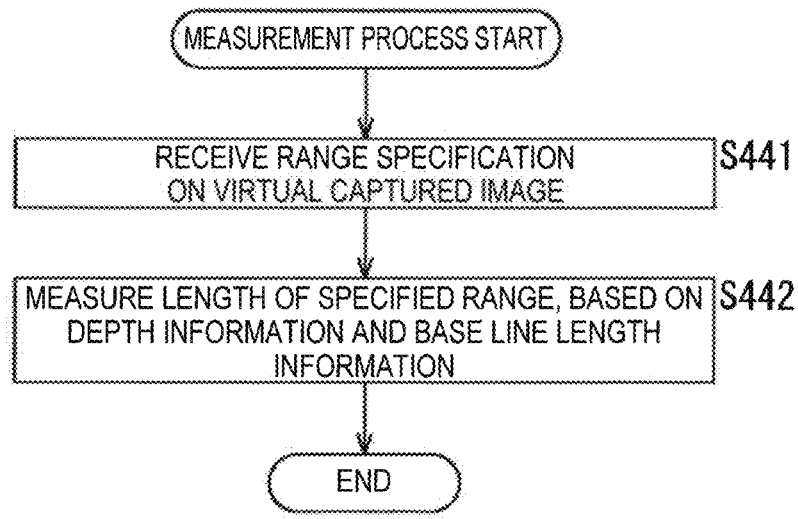
FIG. 40 is a flow chart which describes an example of the flow of a measurement process.

In order to implement such a function, the furniture image arrangement processing unit 657 executes a measurement process. An example of the flow of this measurement process will be described, by referring to the flow chart of FIG. 40.

When the measurement process is started, in step S441, the furniture image arrangement processing unit 657 receives a range specification on a virtual captured image. When a range specification is performed, in step S442, the furniture image arrangement processing unit 657 measures a length of the specified range, based on depth data or base line length information of a multi-viewpoint image used for the generation of the virtual captured image. When the process of step S442 ends, the measurement process ends.

In this way, for example, in the virtual captured image 721 of FIG. 39, the length of the horizontal width of the window (the dotted-line double arrow 722) can be more accurately measured. Therefore, for example, at the time of a purchase of a curtain or the like for this window, the generation of a mistake such as a wrong measurement of the dimensions of the curtain can be suppressed, and a reduction of a buying intention of a user can be suppressed. That is, a sale can be supported by such a service.

<Lighting Process>

Figure 41:
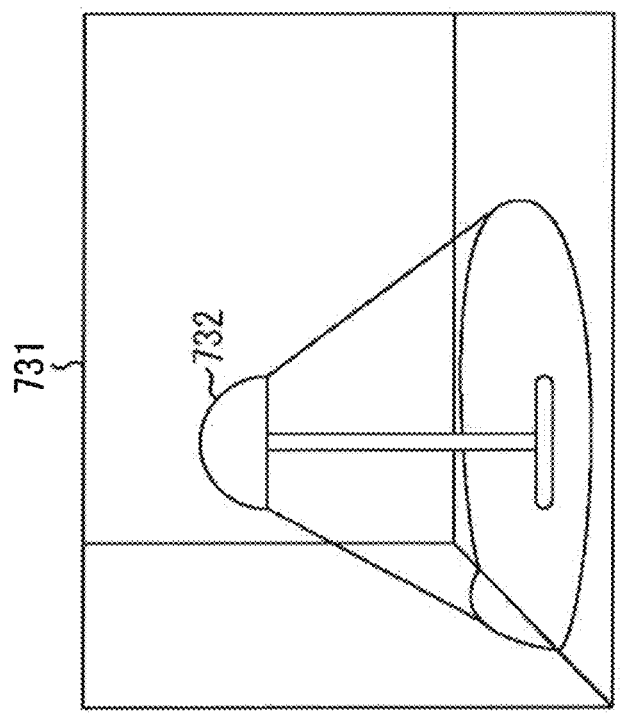
FIG. 41 is a figure which describes an example of the state of a simulation of lighting.

Further, the striking way of lighting (a light ray) on a virtual captured image may be reproduced. For example, as shown in FIG. 41, at the time when a light stand 732 is arranged on a virtual captured image 731, a state in which the lighting of this light stand 732 is lit may be reproduced.

Figure 42:
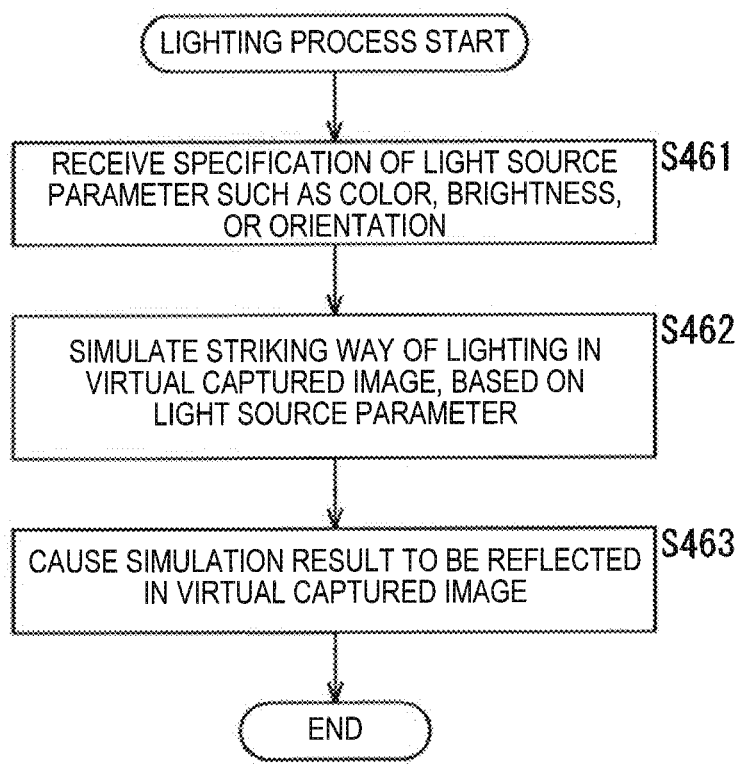
FIG. 42 is a flow chart which describes an example of the flow of a lighting process.

In order to implement such a function, the furniture image arrangement processing unit 657 executes a lighting process. An example of the flow of this lighting process will be described, by referring to the flow chart of FIG. 42.

When the lighting process is started, in step S461, the furniture image arrangement processing unit 657 receives a specification of a light source parameter which includes parameters related to a light source such as color, brightness, or orientation. The value of each parameter included in this light source parameter may be specified by a user, or may be provided as furniture data associated with a furniture (lighting device) image. In step S462, the furniture image arrangement processing unit 657 simulates (imitated appearance) the striking way of lighting (light from a light source) in the virtual captured image, based on this specified light source parameter. In step S463, the furniture image arrangement processing unit 657 causes this simulation result to be reflected in the virtual captured image. For example, the portion where the lighting strikes is lit, the portion where it does not strike is darkened, and a shadow is applied.

By such a setting, a user can perform a simulation of an arrangement of a lighting device which is more realistic. Therefore, at the time of a lighting device purchase, the generation of inconvenience, such as the color or brightness of lighting of the lighting device actually purchased being significantly different to that estimated when viewed in a shop, a catalogue or the like, can be suppressed, and a reduction of a buying intention of a user can be suppressed. That is, a sale can be supported by such a service.

<Moving Line Guidance Process>

Figure 43:
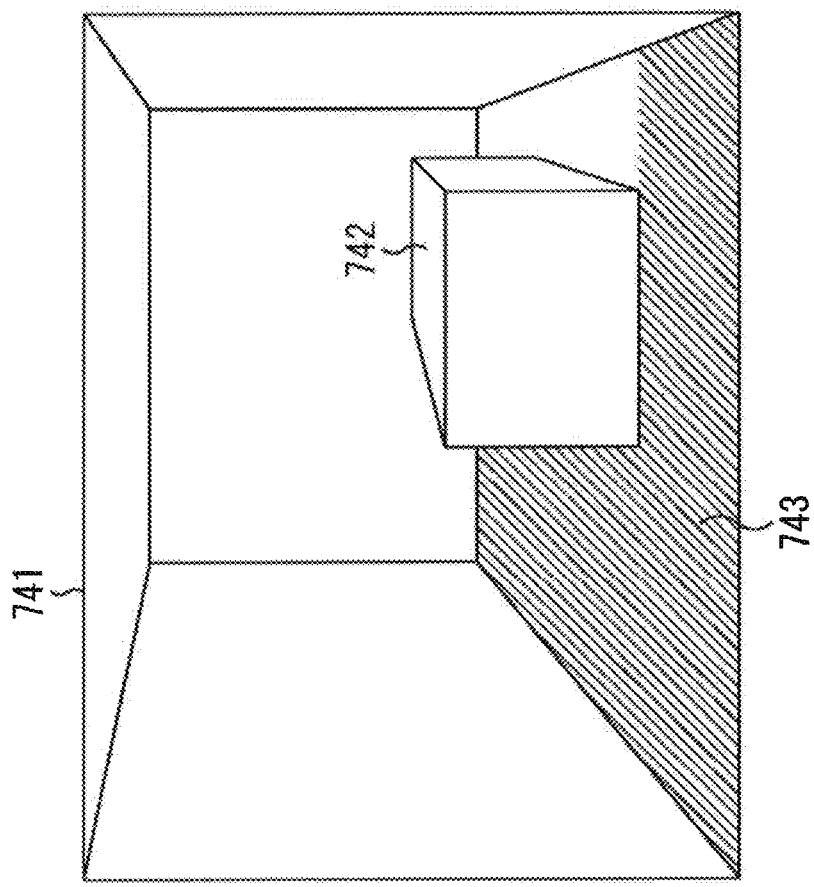
FIG. 43 is a figure which describes an example of the state of a moving line guidance.

Further, a portion which becomes a moving line may be highlighted on a virtual captured image. For example, as shown in FIG. 43, in a state in which a table 742 is arranged on a virtual captured image 741, a portion 743 which satisfies a condition as a moving line may be identified, and this portion may be guided. In the case of the example of FIG. 43, the portion 743 which satisfies the condition as a moving line is displayed so as to be emphasized by diagonal patterned lines or the like. While the condition as a moving line is arbitrary, for example, a person being able to stand on the floor or the like, a width to the extent of a person passing being secured or the like can also be considered.

A display method showing the portion 743 which satisfies the condition as a moving line may be by a color or brightness, or may use symbols or figures such as arrows or stars.

Figure 44:
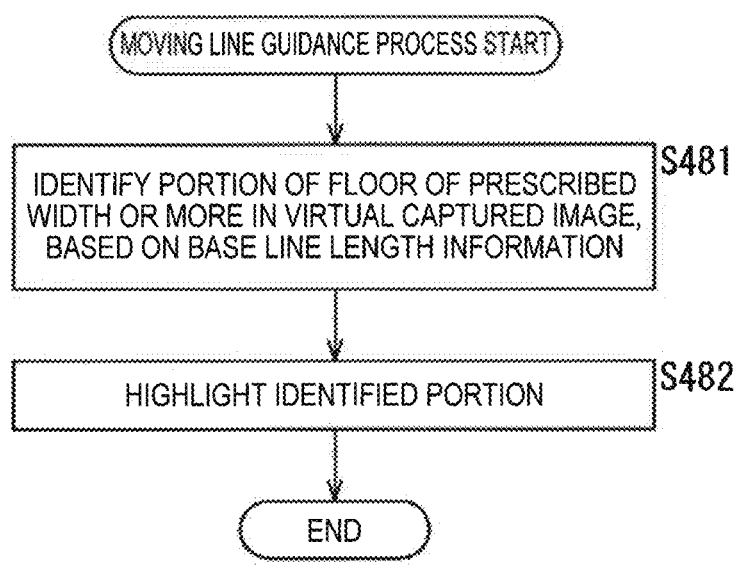
FIG. 44 is a flow chart which describes an example of the flow of a moving line guidance process.

In order to implement such a function, the furniture image arrangement processing unit 657 executes a moving line guidance process. An example of the flow of this moving line guidance process will be described, by referring to the flow chart of FIG. 44.

When the moving line guidance process is started, in step S481, the furniture image arrangement processing unit 657 identifies a portion of the floor of a prescribed width or more in a virtual captured image, that is, a portion which satisfies a condition as a moving line, based on base line length information. In step S482, the furniture image arrangement processing unit 657 highlights this identified portion by a pattern, color, brightness or the like. When the process of step S482 ends, the moving line guidance process ends.

By such a setting, a user can simulate an arrangement of furniture so as to secure a moving line, at the time of a furniture arrangement. Therefore, for example, the generation of inconvenience, such as only installing in a space where furniture is too large and people are not able to pass through, can be suppressed. Further, for example, a confirmation, such as whether or not a moving line can be secured where a wheelchair passes through, can be performed prior to a furniture purchase. Therefore, a buying intention of a user can be improved, and a sale can be supported, by such a service.

<Person Image Arrangement>

Figure 45:
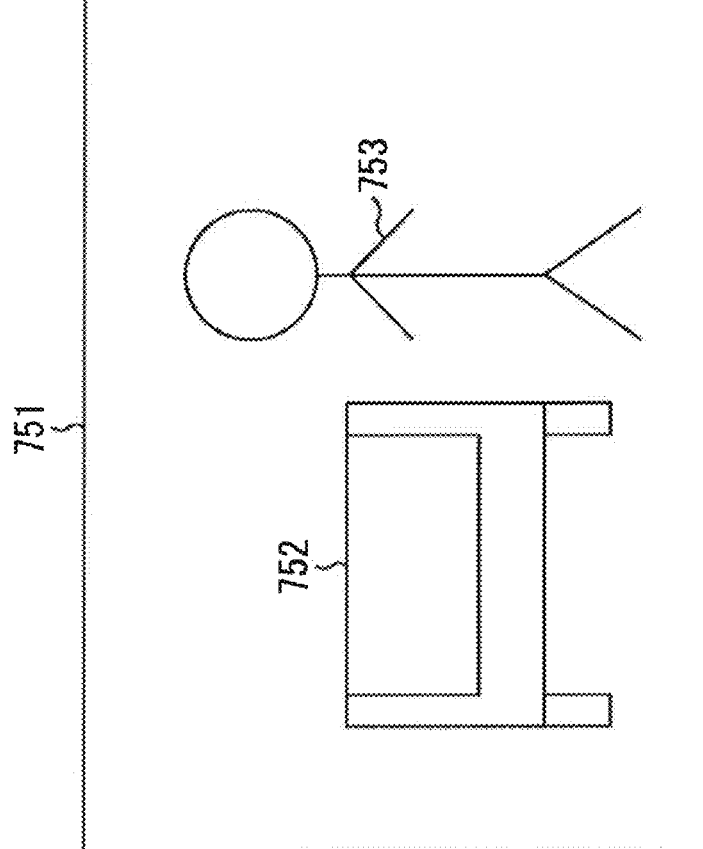
FIG. 45 is a figure which describes an example of a person image arrangement.

Further, at the time when arranging furniture, a person image may be arranged on a virtual captured image. For example, as shown in FIG. 45, a chair 752 can be arranged on a virtual captured image 751, and close to this, a person image 753 can be arranged. This person image may be a captured image of an actual person, or may be an image of an imaginary person. For either of these, 3D modelling data similar to that of a furniture image can be associated with this person image.

Figure 46:
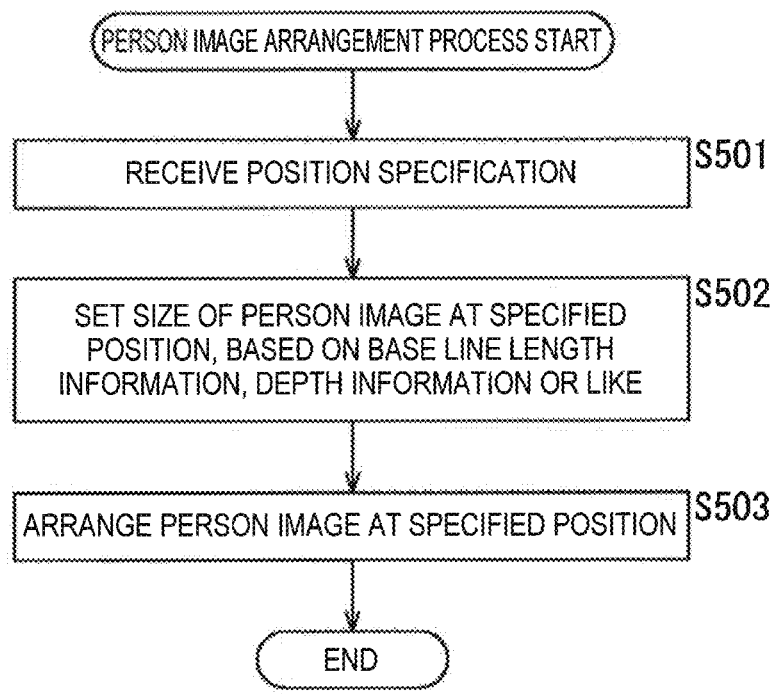
FIG. 46 is a flow chart which describes an example of the flow of a person image arrangement process.

In order to implement such a function, the furniture image arrangement processing unit 657 executes a person image arrangement process. An example of the flow of this person image arrangement process will be described, by referring to the flow chart of FIG. 46.

When the person image arrangement process is started, in step S501, the furniture image arrangement processing unit 657 receives a position specification of an arrangement position of a person image from a user or the like, via the input unit 231 or the like. In step S502, the furniture image arrangement processing unit 657 sets a size and orientation of the person image at the specified position, based on base line length information, depth data or the like of a captured image used for generating a virtual captured image, similar to the case of a furniture image. In step S503, the furniture image arrangement processing unit 657 arranges the person image with the size and orientation set in step S502, at the specified position (for example, in step S501). When the process of step S503 ends, the person image arrangement process ends.

By such a setting, a user can arrange not only a furniture image, but also a person image in a virtual captured image. Therefore, the arranged furniture and person image can be compared, and the size of the arranged furniture or the atmosphere can be more accurately expressed. Therefore, for example, the generation of inconvenience, such as purchased furniture being larger than thought, or being different than a thought impression, can be suppressed. Therefore, a buying intention of a user can be improved, and a sale can be supported, by such a service.

Note that, the setting method of the position of a person image is arbitrary. For example, an arrangement position of a person image may be determined in accordance with a position of a furniture image, such as on or close to the arranged furniture image. Further, for example, a user may specify a furniture image, and a person image may be arranged at a position corresponding to this specified furniture image. Note that, the person image to be arranged may be an image of 1 person, or may be an image of a plurality of people.

Note that, the person image here is not an object which is a target for supporting a sale (for example, a furniture image), and is an example of an image to be combined (arranged) with a background image (for example, a virtual captured image). Namely, an arbitrary image other than a person image may be arranged, by a method similar to the above described case of a person image. For example, it may be an image of an animal such as a dog or a cat (an animal image), it may be an image of a product which is not a sales (support) target (a product image), or it may be an image in which these are combined, such as an image which includes both a person and an animal (a mixed image).

In addition, at the time when arranging an image such as described above, a user or the like can select an image to be arranged. For example, it can be selected whether to arrange a person image, whether to arrange an animal image, whether to arrange a product image, whether to arrange a mixed image or the like. In addition, a detailed selection can be performed. For example, in the case of a person image, male, female, an adult, a child, a posture (standing, sitting or the like), clothing, race or the like can be selected. Similarly for the cases of an animal image, a product image, and a mixed image, arbitrary parameters such as the type, gender, age, size, or color can be selected. Note that, the selection method of such an image is arbitrary. For example, a user or the like can select a desired image from among a plurality of candidates prepared beforehand. Further, a user or the like may create an image to be combined such as this person image, by creating, processing, and combining an image.

<Furniture List Limitation>

Further, as described above, at the time when a user selects furniture to be arranged, while a list of furniture is presented, at this time, it may be presented to the user by listing only furniture capable of being arranged within a virtual captured image. Namely, furniture not capable of being arranged may be omitted from a list, and a user or the like may select a furniture image to be arranged on a virtual captured image (a background image) from among the furniture images (objects) capable of being arranged.

Figure 47:
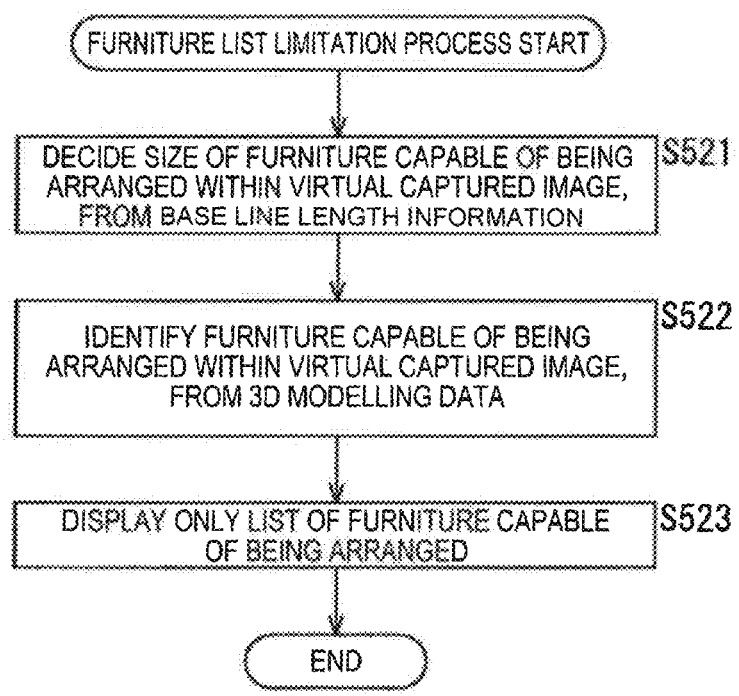
FIG. 47 is a flow chart which describes an example of the flow of a furniture list limitation process.

In order to implement such a function, the furniture image arrangement processing unit 657 executes a furniture list limitation process. An example of the flow of this furniture list limitation process will be described, by referring to the flow chart of FIG. 47.

When the furniture list limitation process is started, in step S521, the furniture image arrangement processing unit 657 decides the size of furniture capable of being arranged within a virtual captured image, from base line length information of a multi-viewpoint image used for the generation of a virtual captured space. In step S522, the furniture image arrangement processing unit 657 identifies furniture capable of being arranged within the virtual captured image, from 3D modelling data of the furniture images of a list supplied from the server 202. In step S523, the furniture image arrangement processing unit 657 creates a list of only the furniture identified in step S522. The display control unit 652 controls the output unit 232, and displays this list created by the furniture image arrangement processing unit 657 on a monitor as an image. When the process of step S523 ends, the furniture list limitation process ends.

By such a setting, unnecessary furniture can be removed from a list presented to a user. Therefore, a user can refer to a more useful list, and can select furniture. In particular, in the case where there is present a large number or types of furniture to be sold, there is the possibility that a selection of furniture from the list by a user will become difficult, and so it will be desirable for unnecessary information to be removed from the list as much as possible. Therefore, a furniture selection of a user can be easily set, a reduction of a buying intention can be suppressed, and a sale can be supported, by such a service.

Note that, while an example has been described heretofore in which a virtual captured image obtained by multi-viewpoint imaging and a furniture image are combined, as an example of image combination, the images to be combined may be anything. For example, captured images may be combined, artificial images such as computer graphic images may be combined, or a captured image and an artificial image may be combined. Further, images in which a part of a captured image becomes an artificial image may be combined. In addition, moving images may be combined, still images may be combined, or a moving image and a still image may be combined.

Further, while a description has been made heretofore in which an object is combined with a background image, as a product sales support service, this object may be anything if it is an image of a product which becomes a target of a sales support, or may have 3D modelling data. For example, 3D modelling data may be provided from a location separate from an object. Further, for example, it may not be 3D modelling data, and may be simple information showing the size or the like.

Further, the background image shows that it is an image on which an object is arranged, and does not show a relationship (position relationship) of overlapping with an object. For example, a foreground overlapping in front of an object may be included in the background image. Further, the background image may be constituted by only this foreground (that is, overlapping is performed so that the entire background image is positioned in front of an object). In addition, the background image may become a foreground or become a background of an object, in accordance with the position at which an object is to be arranged. That is, the background image may be constituted by a plurality of images (the plurality of images may overlap). Further, heretofore, while the background image is constituted by 1 captured image (a virtual captured image), the object and the background image may be suitably processed and combined, so that a part of this background image is positioned in front of the object, in accordance with an arrangement position (in particular, a position of the depth direction) of the object (a furniture image).

<6. Other>

The above described series of processes can be executed by hardware, or can be executed by software. In the case where the above described series of processes are executed by software, a program constituting this software is installed from a network or a recording medium.

This recording medium is constituted, for example, by a removable media (for example, the removable media 241, the removable media 271, the removable media 431) in which a program is recorded, distributed for delivering the program to a user, separately from an apparatus main body, such as shown in FIG. 4, FIG. 6, and FIG. 16. A magnetic disk (including a flexible disk) and an optical disk (including a CD-ROM and a DVD) are included in this removable media. In addition, a magneto-optical disk (including a Mini Disc (MD)), a semiconductor memory or the like are also included.

In this case, by mounting these removable media in a drive, a program can be installed in a storage unit, via an input/output interface.

Further, this program can be provided via a wired or wireless transfer medium, such as a local area network, the Internet, or a digital satellite broadcast. In this case, the program can be received by a communication unit of each apparatus (for example, the communication unit 234, the communication unit 264, the communication unit 424), and can be installed in a storage unit (for example, the storage unit 233, the storage unit 263, the storage unit 423).

Other than this, this program can be installed beforehand in a ROM (for example, the ROM 222, the ROM 252, the ROM 412), or a storage unit (for example, the storage unit 233, the storage unit 263, the storage unit 423) of each apparatus.

Note that, the program executed by the computer may be a program in which processes are performed in a time series in the order described in the present disclosure, or may be a program in which processes are performed in parallel or at a necessary timing, such when called to be performed.

Further, in the present disclosure, the steps which describe a program recorded in a recording medium include processes performed in a time series in the described order, and also include processes executed in parallel or individually, without necessarily being processed in a time series.

Further, the processes of each of the above described steps can be executed in each of the above described apparatuses, or in an arbitrary apparatus other than each of the above described apparatuses. In this case, the apparatus executing these processes may have the necessary functions (function blocks or the like) for executing these processes, which are described above. Further, information necessary for the processes may be suitably transferred to this apparatus.

Further, in the present disclosure, a system means a set of a plurality of constituent elements (apparatuses, modules (parts) or the like), and it is not taken into account whether or not all of the constituent elements are within a same housing. Therefore, a plurality of apparatuses, stored in separate housings and connected via a network, and 1 apparatus in which a plurality of modules are stored within 1 housing, are both a system.

Further, the configurations described heretofore as 1 apparatus (or processing unit) may be divided, and may be configured as a plurality of apparatuses (or processing units). Conversely, the configurations described heretofore as a plurality of apparatuses (or processing units) may be configured collectively as 1 apparatus (or processing unit). Further, it is needless to say that a configuration other than that described above may be added to the configuration of each apparatus (or each processing unit). In addition, a part of the configuration of some apparatus (or processing unit) may be included in the configuration of another apparatus (or another processing unit), if the configuration and operation as the entire system are substantially the same.

It should be understood by those skilled in the art that various modifications, combinations, sub-combinations and alterations may occur depending on design requirements and other factors insofar as they are within the scope of the technical idea of the appended claims or the equivalents thereof.

For example, the present disclosure can take a configuration of cloud computing which performs, for 1 function, allotting and joint processing with a plurality of apparatuses via a network.

Further, other than being executed by 1 apparatus, each of the steps described in the above described flow charts can be allotted and executed by a plurality of apparatuses.

In addition, in the case where a plurality of processes are included in 1 step, other than being executed by 1 apparatus, the plurality of processes included in this 1 step can be allocated and executed by a plurality of apparatuses.

The image processing apparatus according to the above described embodiments can be applied, for example, to various types of electronic devices, such as a satellite broadcast, a wired broadcast such as cable TV, a transmission device or reception device in distribution on the Internet, distribution to a terminal by cellular communication or the like, a recording medium which records an image to a medium such as an optical disk, a magnetic disk, and a flash memory, or a reproduction apparatus which reproduces an image from these storage mediums.

Further, the present disclosure is not limited to this, and can be executed as any configuration installed in an apparatus which configures such an apparatus or system, for example, a processor as a system Large Scale Integration (LSI) or the like, a module using a plurality of processors or the like, a unit using a plurality of modules or the like, a set for which functions other than this are additionally added to a unit (that is, a part of the configuration of an apparatus) or the like.

Additionally, the present technology may also be configured as below.

(1)

An image processing apparatus, including:
a virtual captured image generation unit which generates, by using multi-viewpoint image data, depth data showing a distance to a photographic subject in the multi-viewpoint image, and profile information including a parameter which reproduces an optical effect by a virtual optical system, a virtual captured image obtained by capturing the photographic subject of the multi-viewpoint image by using the virtual optical system.

(2)

The image processing apparatus according to any of (1), and (3) to (19),
wherein the virtual captured image generation unit generates interpolation images specified in number by the profile information based on the multi-viewpoint image, and generates the virtual captured image by using the multi-viewpoint image and the interpolation images.

(3)

The image processing apparatus according to any of (1), (2), and (4) to (19),
wherein the virtual captured image generation unit generates the interpolation images in accordance with sequence information showing a relative position relationship of each viewpoint of the multi-viewpoint image, eye number information showing a number of viewpoints of the multi-viewpoint image, and the depth data.

(4)

The image processing apparatus according to any of (1) to (3), and (5) to (19),
wherein the sequence information includes information showing a distance from a viewpoint serving as a reference to each viewpoint, and information showing an orientation of each viewpoint from the viewpoint serving as a reference.

(5)

The image processing apparatus according to any of (1) to (4), and (6) to (19),
wherein the virtual captured image generation unit determines an image serving as a reference, a matching axis, and an interpolation method based on the sequence information and the eye number information.

(6)

The image processing apparatus according to any of (1), to (5), and (7) to (19)
wherein the virtual captured image generation unit generates the interpolation images by overlapping images specified by the interpolation method in accordance with the depth data by using the determined image serving as a reference and matching axis.

(7)

The image processing apparatus according to any of (1) to (6), and (8) to (19),
wherein the virtual captured image generation unit determines a mixture ratio of each overlapping image in accordance with a position of an interpolation image to be generated.

(8)

The image processing apparatus according to any of (1) to (7), and (9), to (19)
wherein the virtual captured image generation unit generates the virtual captured image by overlapping the multi-viewpoint image and the interpolation image.

(9)

The image processing apparatus according to any of (1) to (8), and (10) to (19),
wherein the profile information includes PSF data of a virtual lens included in the virtual optical system, diaphragm shape information showing a virtual diaphragm shape included in the virtual optical system, and interpolation image number information showing a number of the interpolation images.

(10)

The image processing apparatus according to any of (1) to (9), and (11) to (19), wherein, at a time when overlapping the multi-viewpoint image and the interpolation image, the virtual captured image generation unit causes PSF data of the virtual lens corresponding to the depth data to be reflected.

(11)

The image processing apparatus according to any of (1) to (10), and (12) to (19),
wherein, at a time when overlapping the multi-viewpoint image and the interpolation image, the virtual captured image generation unit causes the virtual diaphragm shape shown by the diaphragm shape information to be reflected in the multi-viewpoint image and the interpolation image.

(12)

The image processing apparatus according to any of (1) to (11), and (13) to (19),
wherein the virtual captured image generation unit generates the virtual captured image in accordance with a user specification parameter which is a parameter related to the virtual optical system specified by a user.

(13)

The image processing apparatus according to any of (1) to (12), and (14) to (19),
wherein the user specification parameter includes focal position specification information which specifies a focal position within the virtual captured image, photographic field depth specification information which specifies a photographic field depth of the virtual captured image, and super-resolution specification information which performs a specification for a super-resolution process at a time when generating the virtual captured image.

(14)

The image processing apparatus according to any of (1) to (13), and (15) to (19), wherein the virtual captured image generation unit obtains a depth value of a focal position specified by the focal position specification information based on the depth data, and sets a focal distance of the virtual captured image to the depth value.

(15)

The image processing apparatus according to any of (1) to (14), and (16) to (19), wherein the virtual captured image generation unit sets a photographic field depth of the virtual captured image to a photographic field depth specified by the photographic field depth specification information.

(16)

The image processing apparatus according to any of (1) to (15), and (17) to (19), wherein the virtual captured image generation unit performs a super-resolution process for the virtual captured image in accordance with a specification of the super-resolution specification information.

(17)

The image processing apparatus according to any of (1) to (16), (18), and (19), wherein the virtual captured image generation unit performs a super-resolution process for only a portion of the virtual captured image where a depth value is the same as or close to a depth value of a focal position specified by the focal position specification information.

(18)

The image processing apparatus according to any of (1) to (17), and (19), wherein the virtual captured image generation unit acquires, from a storage unit, profile information unique to a virtual optical system selected by a user.

(19)

The image processing apparatus according to any of (1) to (18), wherein the virtual captured image generation unit acquires the profile information from another apparatus.

(20)

An image processing method, including:

generating, by using multi-viewpoint image data, depth data showing a distance to a photographic subject in the multi-viewpoint image, and profile information including a parameter which reproduces an optical effect by a virtual optical system, a virtual captured image obtained by capturing the photographic subject of the multi-viewpoint image by using the virtual optical system.

REFERENCE SIGNS LIST 100 multi-viewpoint image use service platform
200 multi-viewpoint image use service provision system
201 terminal apparatus
202 server
221 CPU
236 imaging unit
251 CPU
281 imaging control unit
282 metadata generation unit
283 encoding unit
284 transfer control unit
291 user management unit
292 acquisition control unit
293 depth detection unit
294 file generation unit
295 data management unit
321 multi-viewpoint image file
331 multi-viewpoint image encoding data
332 depth data
333 metadata
401 terminal apparatus
402 application provision server
411 CPU
441 application purchase processing unit
451 user management unit
452 application sales processing unit
453 data management unit
461 application provision processing unit
511 user instruction reception processing unit
512 display control unit
513 transfer control unit
521 user management unit
522 application selection processing unit
523 image selection processing unit
524 lens selection processing unit
525 user specification parameter setting processing unit
526 virtual lens processing unit
527 data management unit
601 furniture sales server
651 user instruction reception processing unit
652 display control unit
653 imaging control unit
654 metadata generation unit
655 depth detection unit
656 virtual captured image generation unit
657 furniture image arrangement processing unit
658 purchase processing unit
659 file generation unit
660 combined image data generation unit
661 application parameter generation unit
662 transfer control unit
671 user management unit
672 application selection unit
673 furniture data selection unit
674 purchase processing unit
675 acquisition control unit
676 data management unit
681 furniture data provision unit
682 purchase processing unit

The invention claimed is:

1. An image processing apparatus comprising:
an image generation unit which generates, using profile information, an image based on a plurality of captured images with mutually different viewpoints,
wherein the profile information includes lens parameters, each of which virtually simulates a respective physical lens of an image sensor that reproduces a respective optical effect,
wherein the profile information is specified by a user from a plurality of pieces of profile information, the specified profile information including a diaphragm shape,
wherein the lens parameters of the plurality of pieces of profile information are different from each other, and
wherein the image generation unit is implemented via at least one processor.

2. The image processing apparatus according to claim 1, wherein the profile information is information which simulates a virtual lens of the virtual optical system.

3. The image processing apparatus according to claim 1, wherein the generated image is a virtual image captured from the same position as the position captured by a reference camera among a plurality of cameras used to capture the plurality of captured images.

4. The image processing apparatus according to claim 1, wherein the plurality of captured images are captured by simulating a virtual image sensor of each virtual optical system obtaining an optical ray vector after permeating the one or more lenses specified by the user for the virtual optical system.

5. The image processing apparatus according to claim 1, wherein the image generation unit generates interpolation images specified in number by the profile information based on the plurality of captured images, and generates the virtual captured image by using the plurality of captured images and the interpolation images.

6. The image processing apparatus according to claim 5, wherein the image generation unit generates the interpolation images in accordance with sequence information showing a relative position relationship of each viewpoint of the plurality of captured images, eye number information showing a number of viewpoints of the plurality of captured images, and depth data.

7. The image processing apparatus according to claim 6, wherein the sequence information includes information showing a distance from a viewpoint serving as a reference to each different viewpoint, and information showing an orientation of each different viewpoint from the viewpoint serving as the reference.

8. The image processing apparatus according to claim 7, wherein the image generation unit determines the image serving as the reference, a matching axis, and an interpolation method based on the sequence information, and the eye number information.

9. The image processing apparatus according to claim 1, wherein the specified profile information further includes PSF data corresponding to a distance to a point light source for each color of a plurality of colors.

10. An image processing method comprising:
generating, by using profile information, an image based on a plurality of captured images with mutually different viewpoints,
wherein the profile information includes lens parameters, each of which virtually simulates a respective physical lens of an image sensor that reproduces a respective optical effect,
wherein the profile information is specified by a user from a plurality of pieces of profile information, the specified profile information including a diaphragm shape, and
wherein the lens parameters of the plurality of pieces of profile information are different from each other.

11. An image processing apparatus comprising:
a display unit configured to display a captured image and a plurality of icons corresponding to a plurality of lens units, each lens unit being defined by parameters related to lens information of one or more lenses and virtually simulating a respective physical lens of an image sensor that reproduces a respective optical effect,
wherein the parameters defining the plurality of lens units are different from each other,
wherein the display unit is further configured to display a modified image, based on the captured image, the modified image being generated using the parameters related to the lens information corresponding to one of the icons selected by a user and at least one different image of a plurality of captured images with mutually different viewpoints,
wherein the parameters defining each lens unit include a diaphragm shape, and wherein the display unit is implemented via at least one processor.

12. The image processing apparatus according to claim 11, wherein the plurality of icons corresponding to the plurality of lens units reproduce an optical effect corresponding to a virtual optical system when selected.

13. The image processing apparatus according to claim 12, wherein the plurality of captured images are captured by simulating a virtual image sensor of each virtual optical system obtaining an optical ray vector after permeating one or more lenses specified by the user for the selected virtual optical system.

14. An image processing method comprising:
displaying a captured image and a plurality of icons corresponding to a plurality of lens units, each lens unit being defined by parameters related to lens information of one or more lenses and virtually simulating a respective physical lens of an image sensor that reproduces a respective optical effect; and
displaying a modified image, based on the captured image, the modified image being generated using the parameters related to the lens information corresponding to one of the icons selected by a user and at least one different image of a plurality of captured images with mutually different viewpoints,
wherein the parameters defining the plurality of lens units are different from each other, and
wherein the parameters defining each lens unit include a diaphragm shape.

15. An image processing system comprising:
a transmitting unit configured to transmit at least one of profile information which is defined by lens parameters, each of which virtually simulates a respective physical lens of an image sensor that reproduces a respective optical effect, or image data generated using the profile information and a plurality of captured images with mutually different viewpoints; and
a receiving unit configured to receive the at least one of the profile information or the image data,
wherein the receiving unit is further configured to generate image data using the at least one of the profile information or the image data and the plurality of captured images with mutually different viewpoints,
wherein the lens parameters defining the plurality of lens units are different from each other,
wherein the lens parameters defining each lens unit include a diaphragm shape, and
wherein the transmitting unit and the receiving unit are each implemented via at least one processor.

16. An image processing method comprising:
transmitting at least one of profile information which is defined by lens parameters, each of which virtually simulates a respective physical lens of an image sensor that reproduces a respective optical effect or image data generated using the profile information and a plurality of captured images with mutually different viewpoints;
receiving the at least one of the profile information or the image data; and
generating image data using the at least one of the profile information or the image data and the plurality of captured images with mutually different viewpoints when the profile information is received, wherein the lens parameters defining the plurality of lens units are different from each other, and wherein the lens parameters defining each lens unit include a diaphragm shape.

\* \* \* \* \*